(12) United States Patent
Zedell, Jr. et al.

(10) Patent No.: US 9,711,001 B2
(45) Date of Patent: *Jul. 18, 2017

(54) CABINET AND PEDESTAL INTERFACE

(71) Applicant: Cadillac Jack, Inc., Duluth, GA (US)

(72) Inventors: Karl Frederick Zedell, Jr., Alpharetta, GA (US); Mark Andrew Thompson, Buford, GA (US)

(73) Assignee: Cadillac Jack, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/476,911

(22) Filed: Sep. 4, 2014

(65) Prior Publication Data
US 2015/0024853 A1 Jan. 22, 2015

Related U.S. Application Data

(63) Continuation-in-part of application No. 13/750,787, filed on Jan. 25, 2013, now Pat. No. 8,827,819, which is a continuation of application No. 13/719,760, filed on Dec. 19, 2012, now Pat. No. 8,651,963.

(51) Int. Cl.
*G07F 17/32* (2006.01)
*A63F 9/24* (2006.01)
*A63F 13/90* (2014.01)

(52) U.S. Cl.
CPC ............ *G07F 17/3216* (2013.01); *A63F 9/24* (2013.01); *A63F 13/90* (2014.09); *G07F 17/3206* (2013.01); *G07F 17/3211* (2013.01); *G07F 17/3223* (2013.01); *G07F 17/3227* (2013.01); *G07F 17/3239* (2013.01); *G07F 17/3241* (2013.01); *G07F 17/3244* (2013.01); *Y10T 29/49002* (2015.01)

(58) Field of Classification Search
CPC .................................. A63F 13/08; A63F 13/90
See application file for complete search history.

(56) References Cited

U.S. PATENT DOCUMENTS

| | | | |
|---|---|---|---|
| 6,514,145 B1 * | 2/2003 | Kawabata | A63F 13/08 273/143 R |
| 7,108,237 B2 | 9/2006 | Gauselmann | |
| 7,494,418 B2 * | 2/2009 | Rifkin | G07F 17/32 463/46 |
| 7,775,888 B2 * | 8/2010 | Wudtke | G07F 17/32 463/16 |
| 7,892,098 B2 | 2/2011 | Nguyen et al. | |
| 8,210,949 B2 * | 7/2012 | Graf | 463/46 |
| 2005/0215325 A1 * | 9/2005 | Nguyen | G07F 17/3202 463/46 |
| 2005/0277468 A1 * | 12/2005 | Fitzsimons | G07F 17/3211 463/31 |

(Continued)

*Primary Examiner* — Jay Trent Liddle
*Assistant Examiner* — Alex F. R. P. Rada, II
(74) *Attorney, Agent, or Firm* — Weide & Miller, Ltd.

(57) ABSTRACT

Examples disclosed herein relate to a movement interface utilized to enhance production of the electronic gaming device. The systems, devices, and methods may allow for the movement of the cabinet based on game data. Further, the systems, devices, and methods may allow for the movement of the cabinet based on a player's input. In addition, the systems, devices, and methods may allow for the movement of the cabinet based on a gaming mode, such as, an attraction mode.

5 Claims, 57 Drawing Sheets

(56) References Cited

U.S. PATENT DOCUMENTS

| | | | |
|---|---|---|---|
| 2006/0183544 A1* | 8/2006 | Okada | G07F 17/32 463/31 |
| 2008/0254862 A1* | 10/2008 | Mattice | G07F 17/32 463/25 |
| 2009/0057504 A1* | 3/2009 | Borissov | F16M 11/38 248/184.1 |
| 2009/0098925 A1* | 4/2009 | Gagner | G07F 17/32 463/20 |
| 2009/0209324 A1* | 8/2009 | Graf | G07F 17/32 463/25 |
| 2012/0122569 A1* | 5/2012 | Kowolik | G07F 17/3216 463/30 |
| 2012/0220363 A1* | 8/2012 | Bytnar | G07F 17/3213 463/25 |
| 2015/0243128 A1 | 8/2015 | Borissov et al. | |

\* cited by examiner

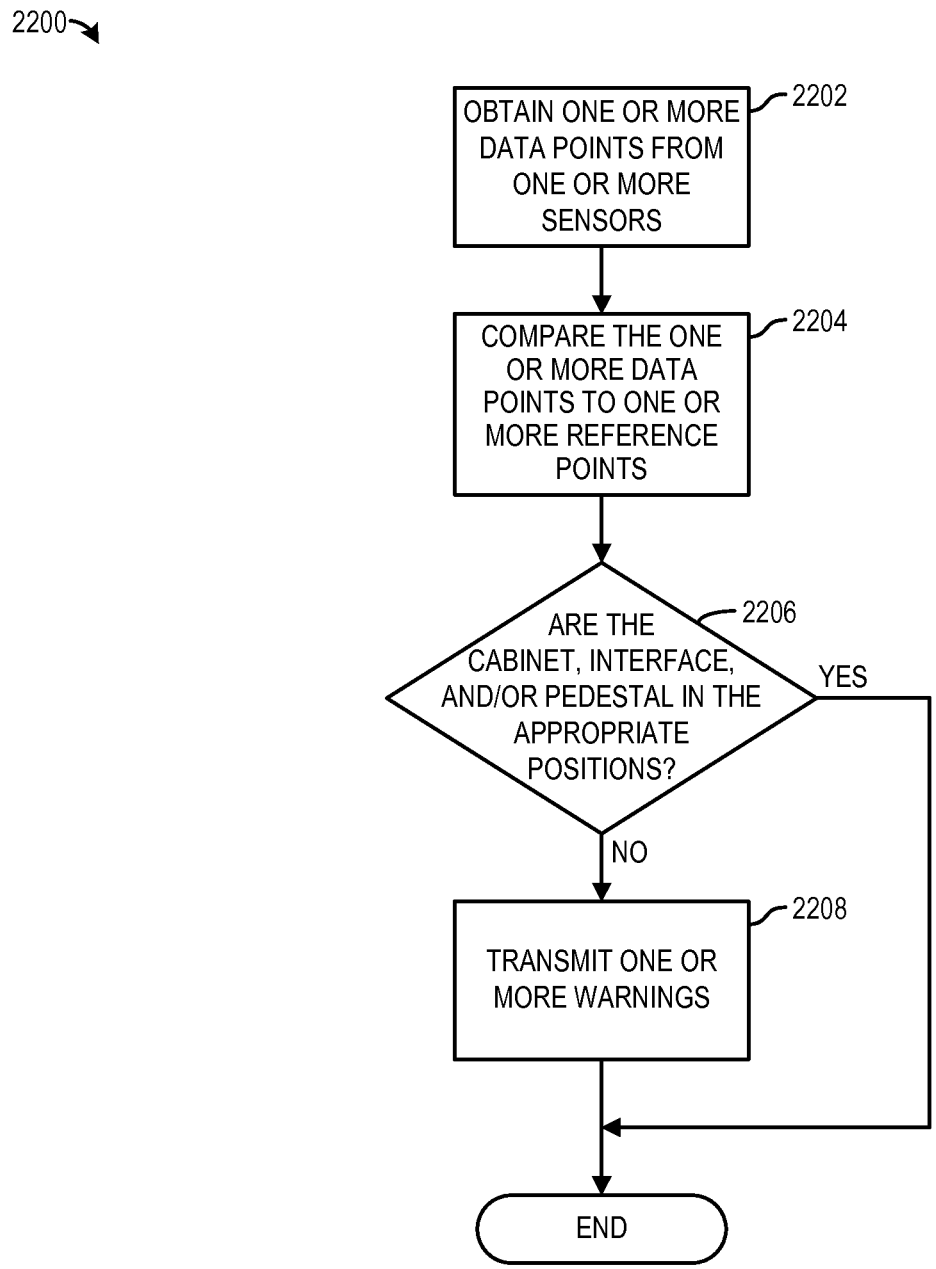

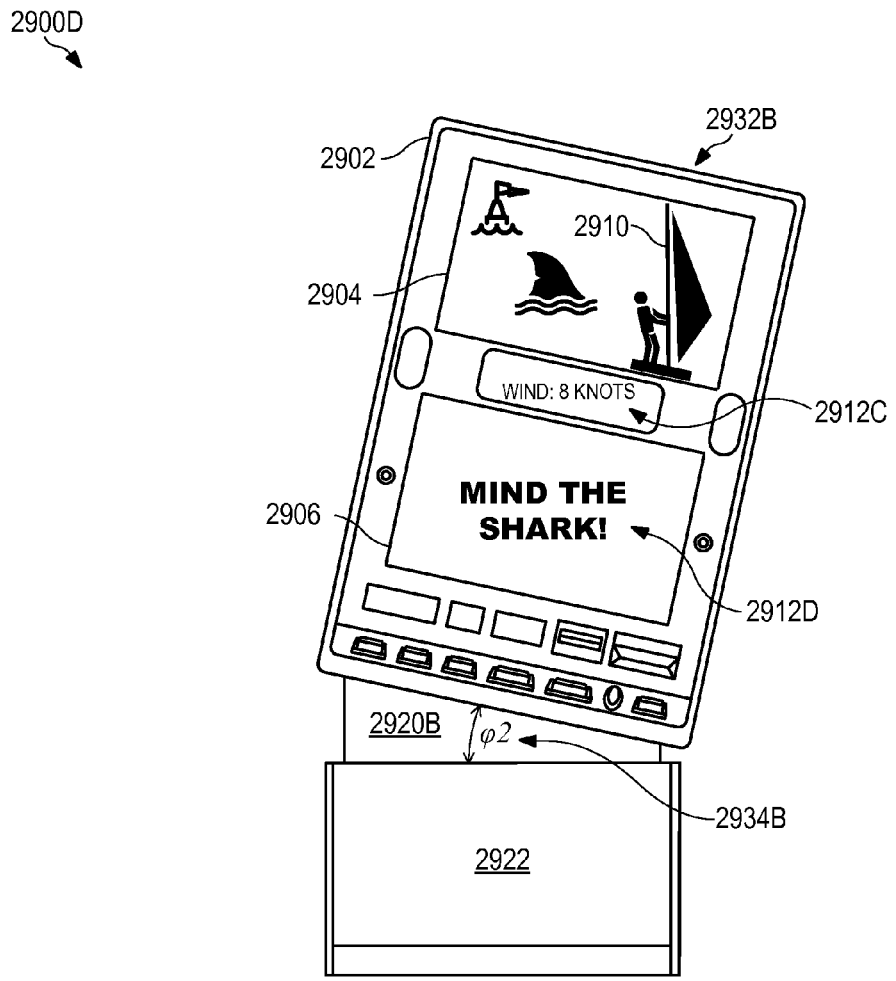
FIG. 29D
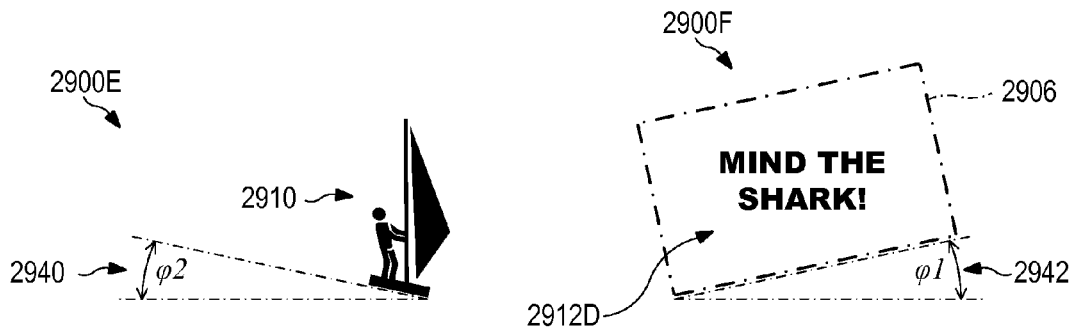
FIG. 29E
FIG. 29F

CABINET AND PEDESTAL INTERFACE

CROSS-REFERENCE TO RELATED PATENT APPLICATION

This application is a continuation-in-part application of prior application Ser. No. 13/750,787 entitled "CABINET AND PEDESTAL INTERFACE", filed on Jan. 25, 2013 which claims priority to and is a continuation application of prior application Ser. No. 13/719,760 entitled "CABINET AND PEDESTAL INTERFACE", filed on Dec. 19, 2012 (now U.S. Pat. No. 8,651,963) which are incorporated herein by reference in their entirety.

FIELD

The subject matter disclosed herein relates to an electronic gaming device. More specifically, the disclosure relates to an interface for a cabinet of the electronic gaming device and a pedestal of the electronic gaming device.

INFORMATION

The gaming industry has numerous casinos located both worldwide and in the United States. A client of a casino or other gaming entity can gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successful matches the pre-determined winning symbols in one of the predetermined patterns.

The electronic gaming device has two main structural parts (e.g., the cabinet and the pedestal). The interface showcased in this disclosure allows for enhanced production of the electronic gaming device.

BRIEF DESCRIPTION OF THE FIGURES

Non-limiting and non-exhaustive examples will be described with reference to the following figures, wherein like reference numerals refer to like parts throughout the various figures.

FIG. 22 is a flow diagram for verifying the installation of the cabinet, interface, and pedestal, according to one embodiment.

FIG. 29D is another illustration of an interface movement device, according to one embodiment.

FIG. 29E is another illustration of an interface movement device, according to one embodiment.

FIG. 29F is another illustration of an interface movement device, according to one embodiment.

DETAILED DESCRIPTION

Figure 1:
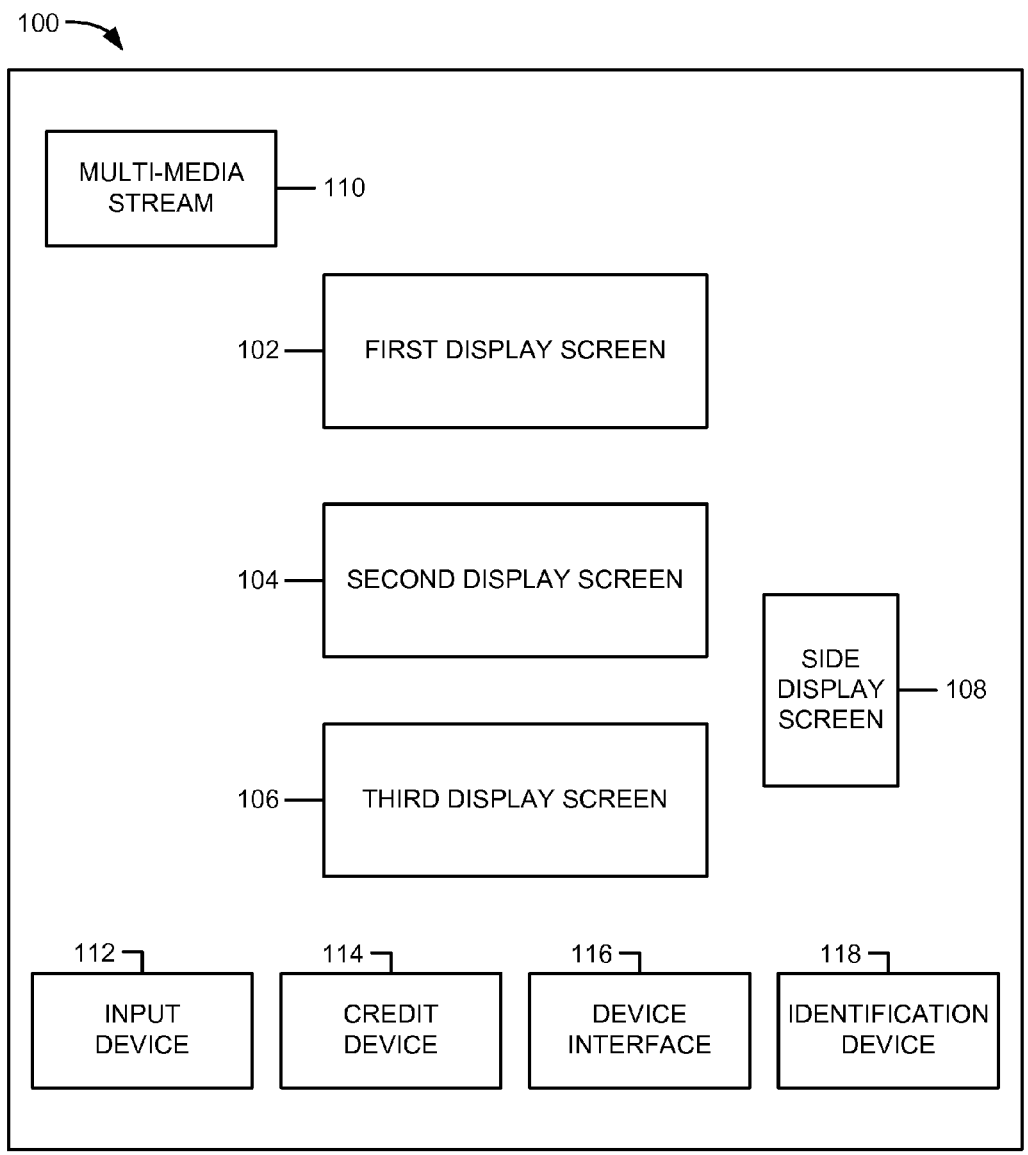
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to verify one or more parameters relating to the cabinet, the pedestal, and/or the interface, to lock one or more of the cabinet, the pedestal, and/or the interface, to unlock one or more of the cabinet, the pedestal, and/or the interface, to make a wager, to control any object (e.g., a tool, a person, an image, a selection option, one or more terrain characteristics, etc.), to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), to select a platform object, to select a platform gaming option, to select a platform image characteristic, and/or any combination thereof. These selections may occur via any other input device (e.g., a touch screen, voice commands, etc.). Input device 112 may be any control panel.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more platform based functionalities (e.g., platform game type 1, platform game type 2, platform game type 3, etc.) may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have game play which has only platform based functionality (or similar functionality). Therefore, no games without platform based functionality would be presented. In another example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player. These examples may be combined.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, to display one or more warnings relating to the cabinet, pedestal, and/or the interface, to display one or more statuses relating to the cabinet, the pedestal, and the interface, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

The presentations associated with game play may be presented on one, a few, and/or a plurality of screens. These presentations associated may be displayed on a portion of one, a few, and/or a plurality of these screens.

For example, a single large image could be partially displayed on second display screen 104 and partially displayed on third display screen 106, so that when both display screens are put together they complete one image. Electronic gaming device 100 may stream or play prerecorded multi-media data, which may be displayed on any display combination.

Figure 2:
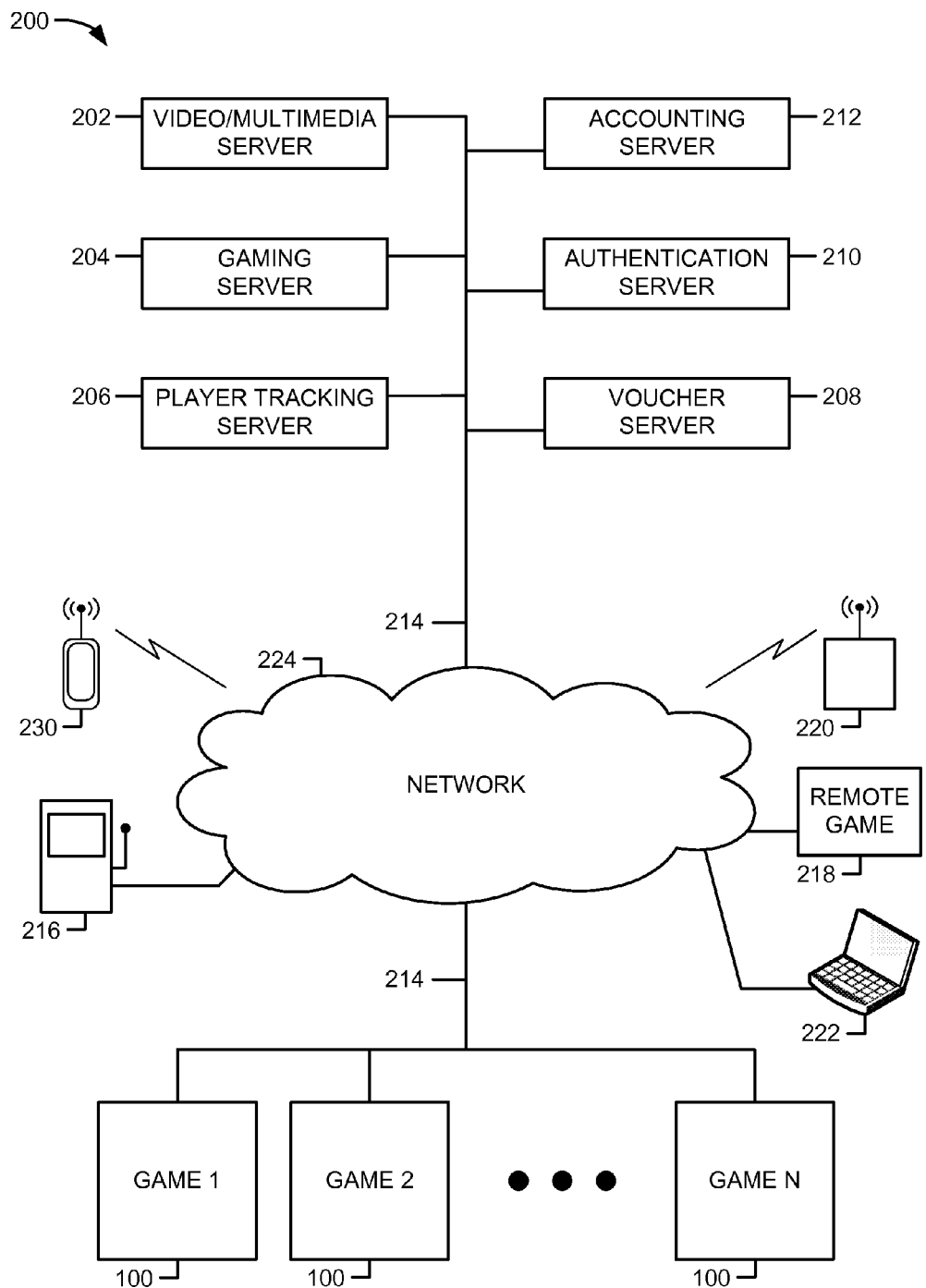
FIG. 2 is an illustration of an electronic gaming system, according to one embodiment.

In FIG. 2, an electronic gaming system 200 is shown. Electronic gaming system 200 may include a video/multi-media server 202, a gaming server 204, a player tracking server 206, a voucher server 208, an authentication server 210, and an accounting server 212.

Electronic gaming system 200 may include video/multi-media server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, a game play functionality, a game play evaluation functionality, other game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include game play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used to receive one or more warnings relating to the cabinet, the pedestal, and/or the interface, to receive one or more statuses relating to the cabinet, the pedestal, and/or the interface, for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server may be used to maintain data relating to historical game play for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Figure 3:
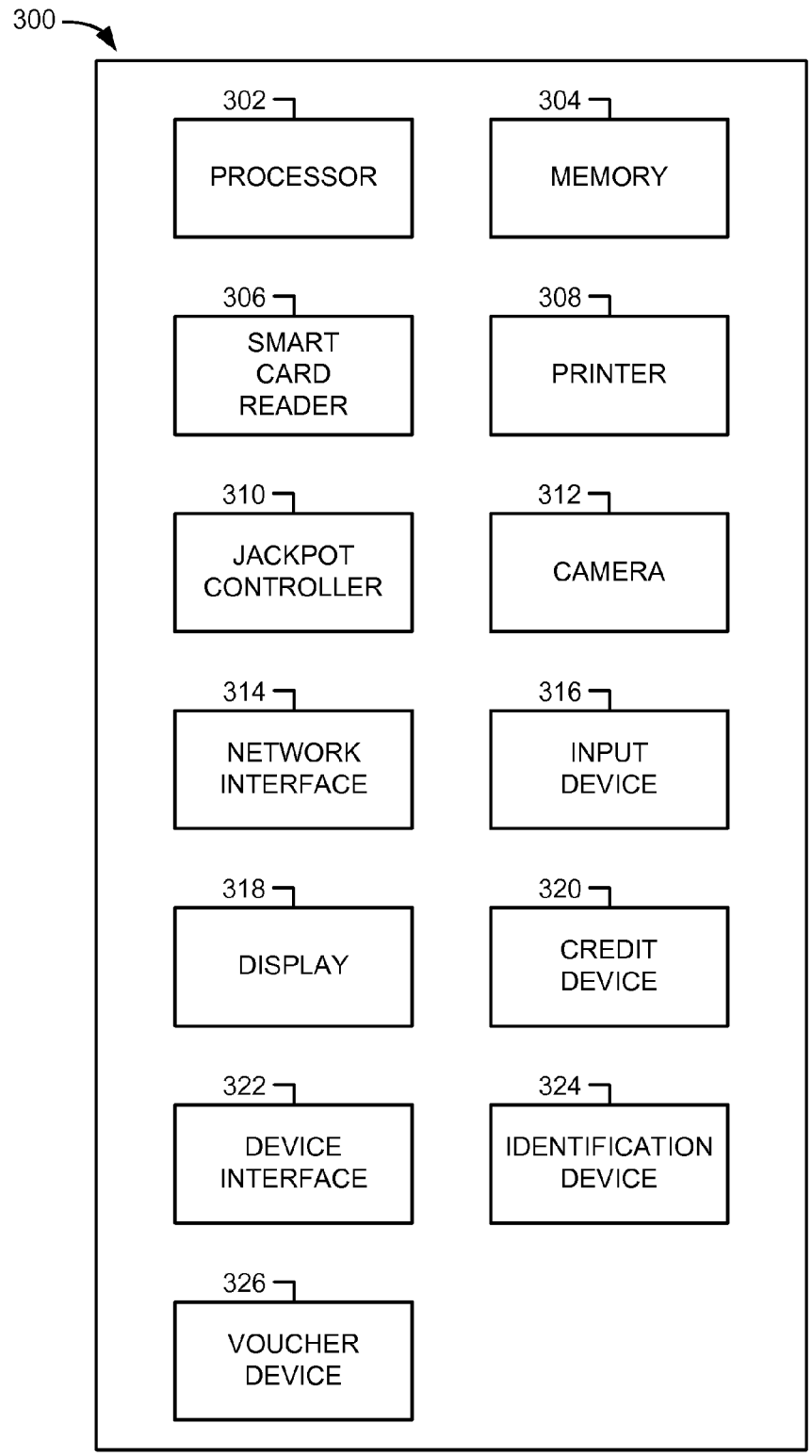
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, one or more sensors relating to one or more of the cabinet, the pedestal, and/or the interface, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, one or more sensors relating to one or more of the cabinet, the pedestal, and/or the interface, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to verify one or more parameters relating to the cabinet, the pedestal, and/or the interface, to lock one or more of the cabinet, the pedestal, and/or the interface, to unlock one or more of the cabinet, the pedestal, and/or the interface, to make a wager, to select one or more game elements, to select one or more platform based gaming options, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
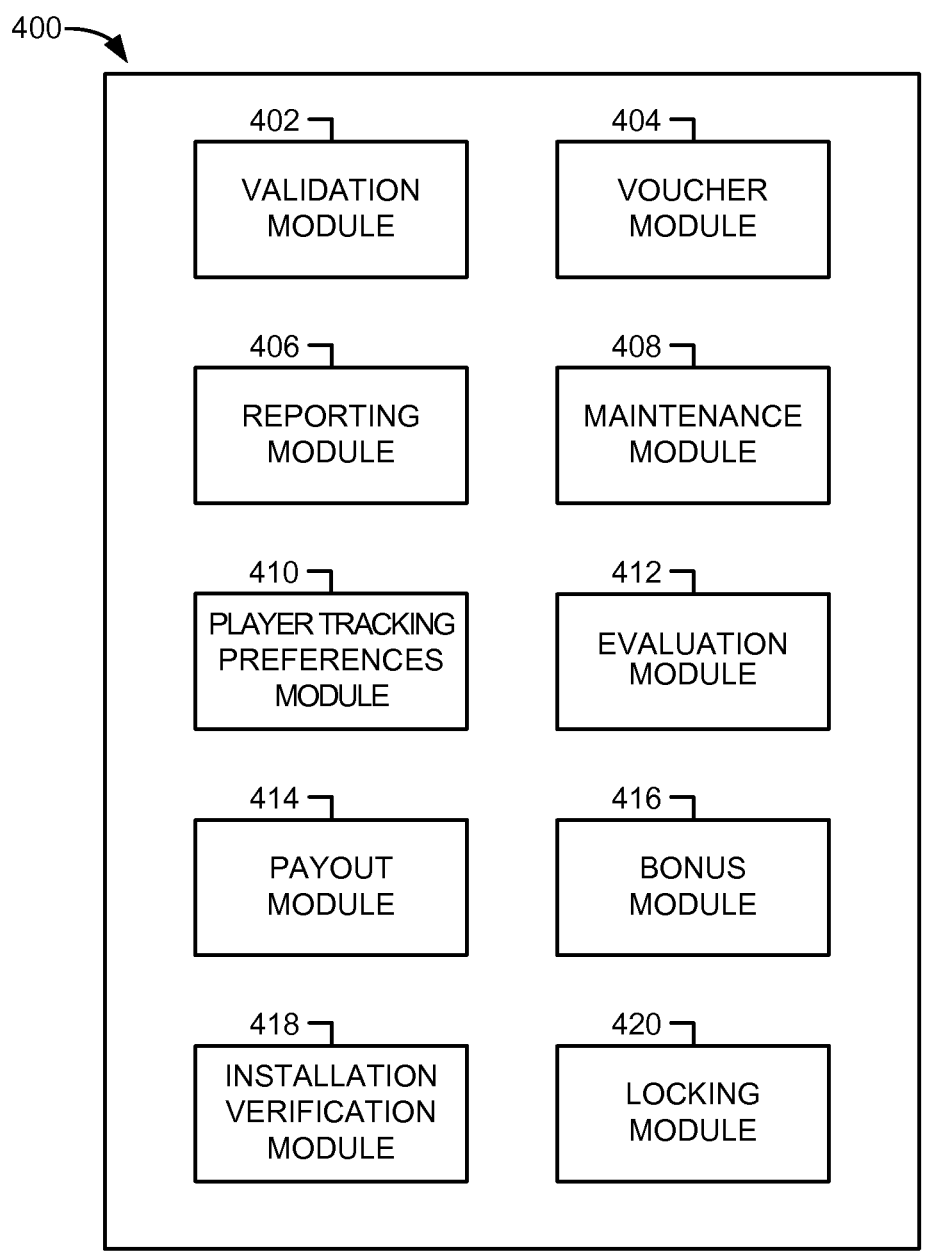
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an evaluation module 412, a payout module 414, a bonus module 416, an installation verification module 418, and a locking module 420.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Evaluation module 412 may evaluate one or more outcomes for one or more events relating to game play.

Payout module 414 may determine one or more payouts which may relate to one or more inputs received from the player, electronic gaming device 100, and/or electronic gaming system 200.

Bonus module 416 may generate a bonus game, evaluate the results of the bonus game, trigger bonus game presentations, generate bonus game payouts, and/or display any data relating to the bonus game.

Installation verification module 418 may verify the installation parameters on one or more of electronic gaming device 100, the interface, the cabinet, and/or the pedestal. Installation verification module 418 may generate, store, and/or transmit a warning (and/or one or more statuses) based on comparing data received from one or more sensors relating to electronic gaming device 100, the interface, the cabinet, and/or the pedestal to one or more reference data points. These warnings (and/or one or more statuses) may be transmitted to an external device, a server, a mobile device, and/or a warning display on electronic gaming device 100.

Locking module 420 may control the locking mechanism for the cabinet, interface, and pedestal combination. Locking module 420 may control any locking mechanism for electronic gaming device 100. Locking module 420 may generate a warning when a locking data point is outside of a specific parameter. These warnings may be transmitted to an external device, a server, a mobile device, and/or a warning display on electronic gaming device 100. In addition, one or more statuses may be transmitted to an external device, a server, a mobile device, and/or a status display on electronic gaming device 100.

It should be noted that one or more modules may be combined into one module. Further, there may be one evaluation module where the determined payout does not depend on whether there were any wild symbols, scatter symbols, platform based game play, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5:
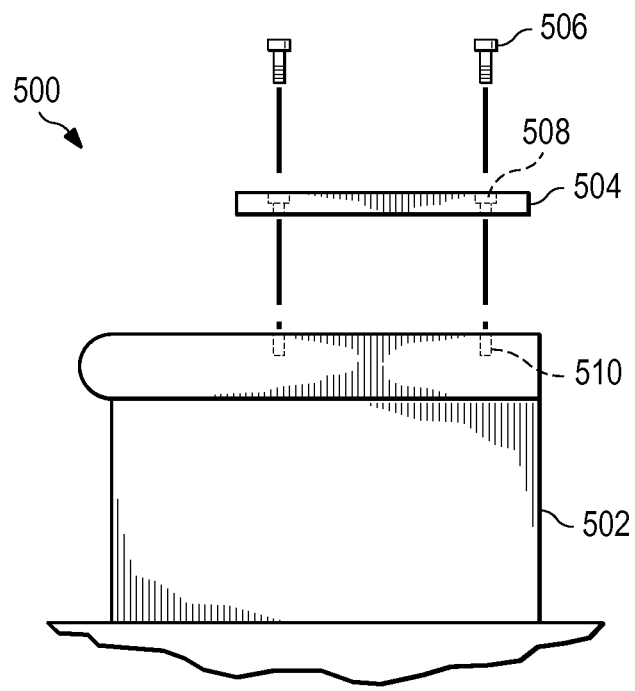
FIG. 5 is an illustration of the interface and the pedestal, according to one embodiment.

In FIG. 5, an illustration of the interface and the pedestal is shown, according to one embodiment. A first image 500 may include a pedestal 502, an interface 504, a locking device 506, a first locking device area 508, and a second locking device area 510.

Electronic gaming device 100 may include pedestal 502 and a cabinet 702. In another example, electronic gaming device 100 may include pedestal 502, interface 504, and cabinet 702 (see FIG. 10).

Figure 6:
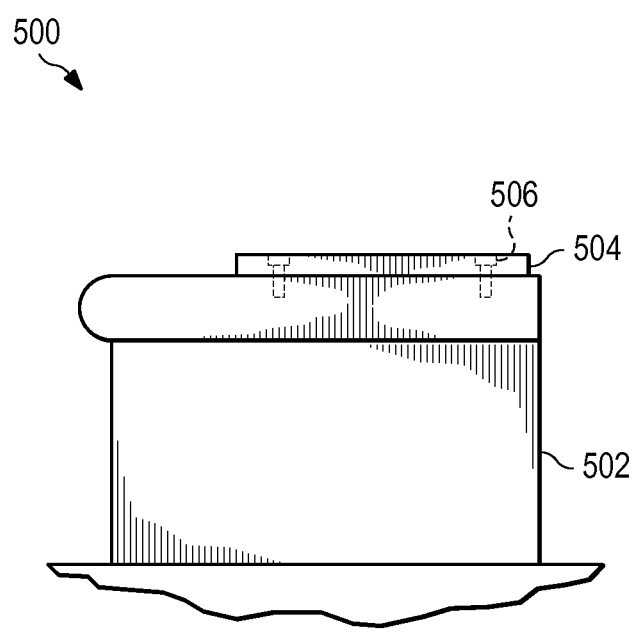
FIG. 6 is another illustration of the interface and the pedestal, according to one embodiment.

In first image 500, locking device 506 (e.g., bolt, nut, fastener, glue, cement, and/or any other locking mechanism) may be placed through first locking device area 508 and second locking device area 510. By securing locking device 506 via first locking device area 508 and second locking device area 510, interface 504 may be secured to pedestal 502 (see FIG. 6). In other examples, there may be only one locking area between interface 504 and pedestal 502. In other example, a substance that has adhering properties may be placed between interface 504 and pedestal 502 to form a bond between these three items (e.g., adhering substance, interface 504, and pedestal 502). In another example, there may be a few and/or a plurality of locking areas between interface 504 and pedestal 502. In another example, interface 504 and pedestal 502 may be attached via a male device and a female device. In one example, the male device is located on interface 504 and the female device is located on pedestal 502. In another example, the male device is located on pedestal 502 and the female device is located on interface 504. Any device/structure/material which can connect pedestal 502 to interface 504 may be utilized.

It should be noted that interface 504 may be secured to cabinet 702 instead of pedestal 502. Further, interface 504 may be integrated into one or more of cabinet 702 and/or pedestal 502. By integrating interface 504 into one or more of cabinet 702 and/or pedestal 502, there may be only two parts. In one example, the two parts may be two of an integrated cabinet (e.g., one piece which has the functions of cabinet 702 and interface 504), cabinet 702, pedestal 502, and an integrated pedestal (e.g., one piece which has the functions of pedestal 502 and interface 504). For example, the two parts may be the integrated cabinet and pedestal 502. In another example, the two parts may be cabinet 702 and an integrated pedestal. Further, the two parts may be the integrated cabinet and the integrated pedestal. In this example, both the integrated cabinet and the integrated pedestal may have various functional elements of interface 504.

Figure 7:
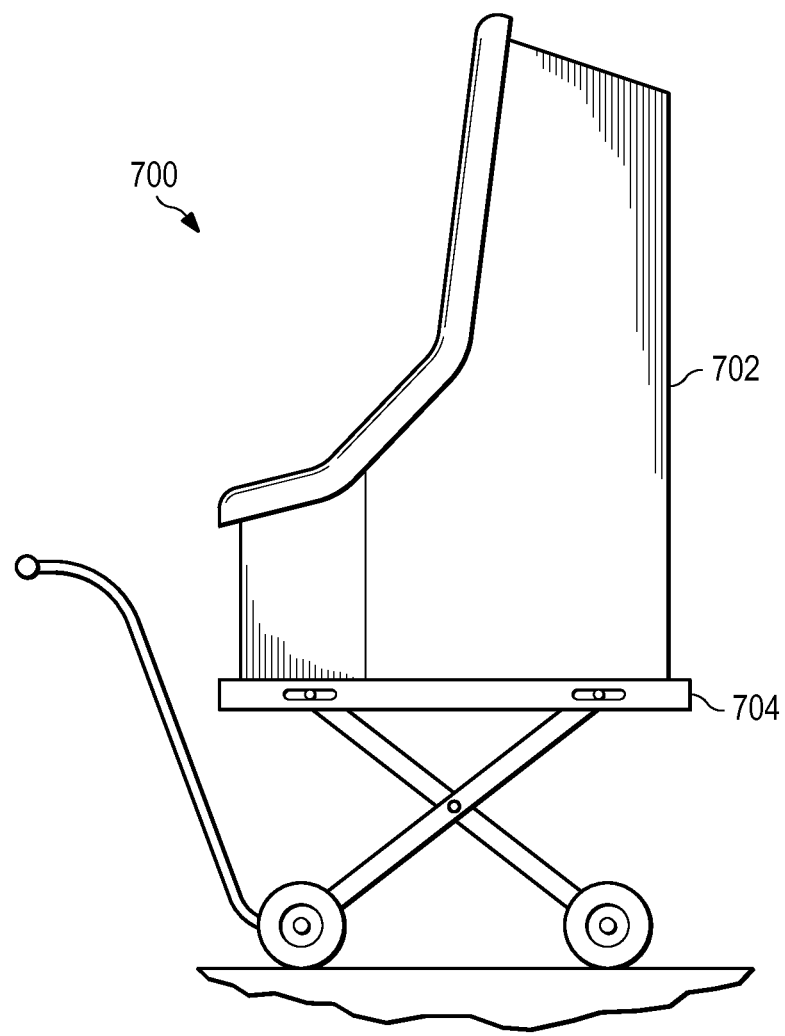
FIG. 7 is an illustration of a cabinet on a loader, according to one embodiment.

In FIG. 7, an illustration of a cabinet on a loader 700 is shown, according to one embodiment. In this illustration of a cabinet on a loader 700, cabinet 702 may be placed on a loader 704. Loader 704 may be any device which allows for the movement (e.g., up, down, lateral, horizontal, angular, and/or any other type of movement) of cabinet 702, pedestal 502, interface 504, electronic gaming device 100, and/or any other device relating to electronic gaming device 100.

Figure 8:
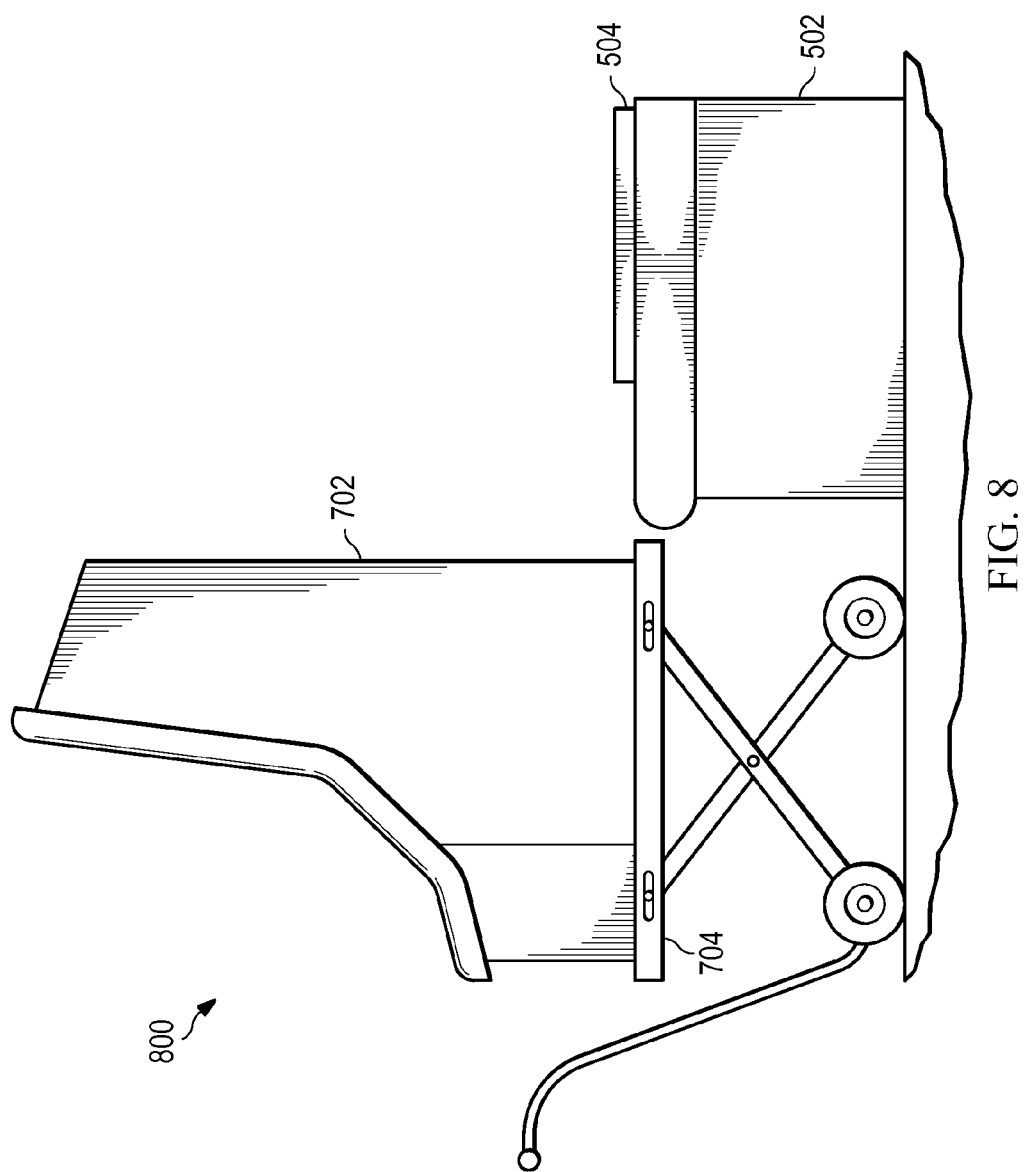
FIG. 8 is an illustration of a cabinet on a loader moving towards the pedestal-interface combination, according to one embodiment.

FIG. 8 shows an illustration of cabinet 702 on loader 704 moving towards the pedestal-interface combination, according to one embodiment. In one example, loader 704 moved cabinet 702 vertically (e.g., up) to a level position with pedestal 502. Further, loader 704 moved cabinet 702 in a position to be aligned with interface 504. In one example, cabinet 702 may be aligned into a position which allows for the connection of cabinet 702 with interface 504. In another example, there may be one or more cabinet electrical interconnection areas 810, one or more interface electrical interconnection areas 812, and/or one or more pedestal electrical interconnection areas 814. In one example, when one or more cabinet electrical interconnection areas 810, one or more interface electrical interconnection areas 812, and/or one or more pedestal electrical interconnection areas 814 are connected (e.g., aligned, interconnected, etc.) one or more electrical devices within the cabinet and/or pedestal are electrically coupled.

Figure 9:
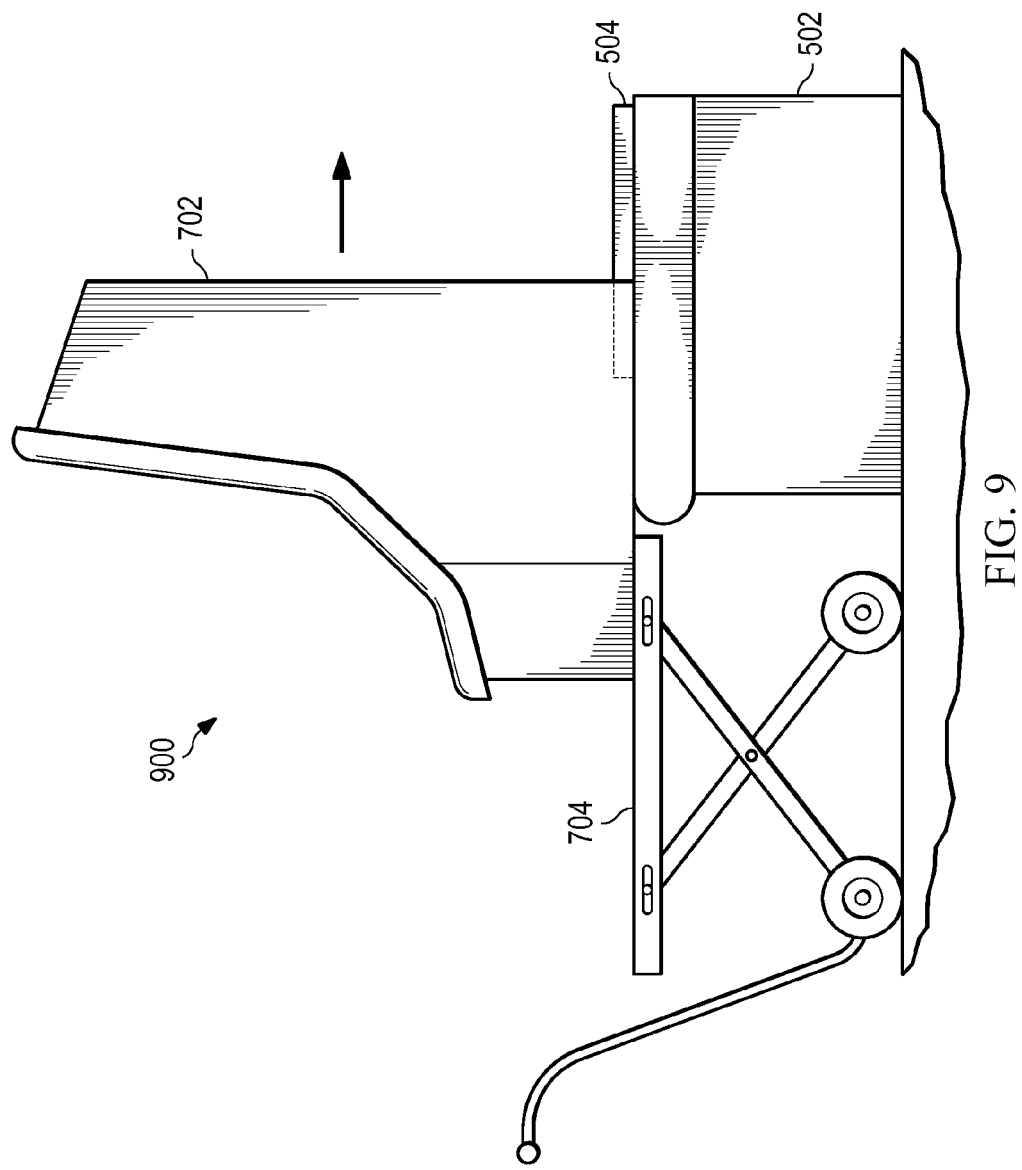
FIG. 9 is an illustration of a cabinet being positioned on the pedestal-interface combination, according to one embodiment.

In FIG. 9, an illustration of a cabinet being positioned on the pedestal-interface combination 900 is shown, according to one embodiment. In one example, cabinet 702 may be moved from loader 704 onto pedestal 502. In another example, cabinet 702 may be moved into an interaction position with interface 504. The interaction position with interface 504 may be that cabinet 702 is engaging a connection mechanism (see FIGS. 15-19) of interface 504. In another example, the connection mechanism may be located on cabinet 702.

Figure 10:
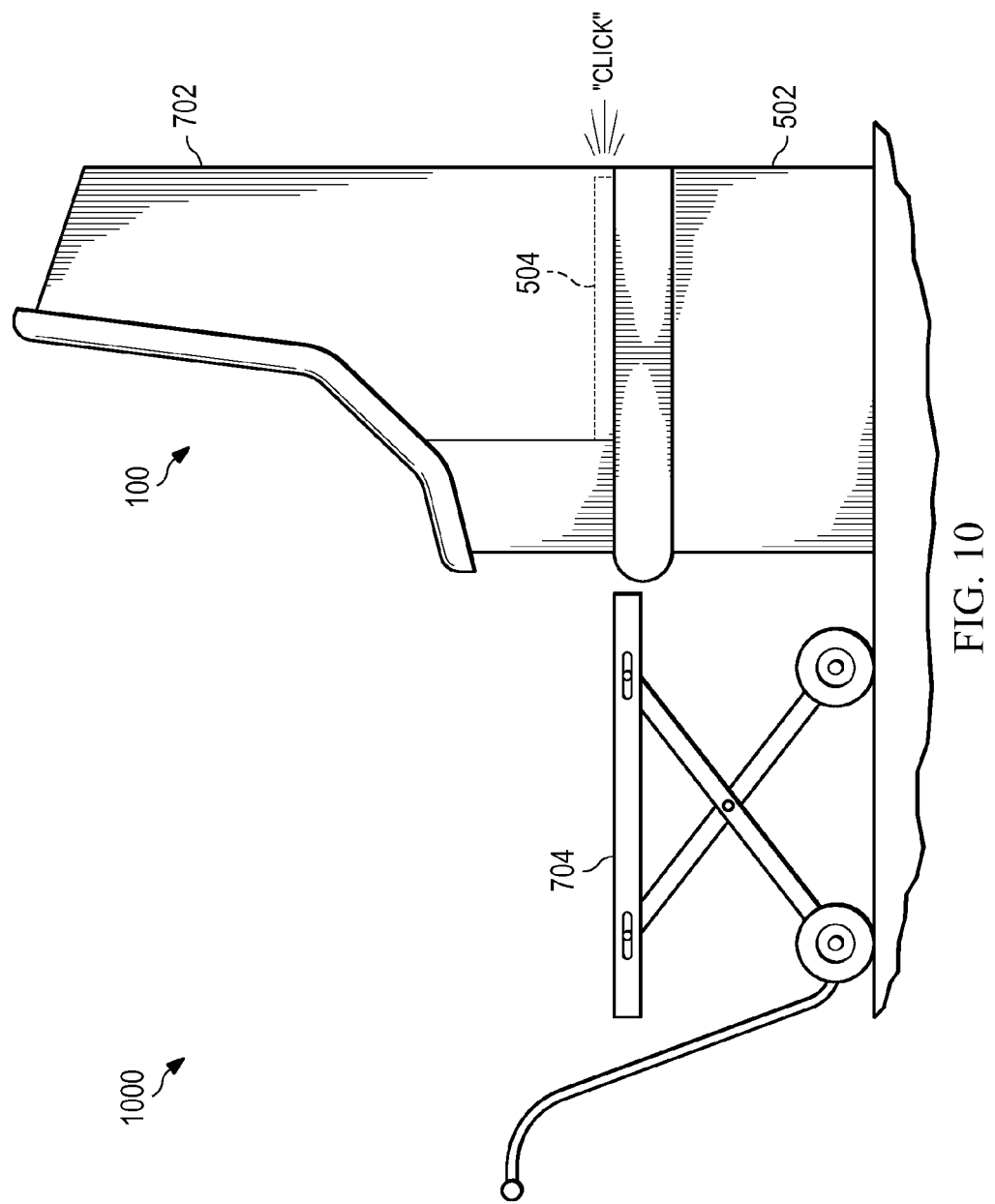
FIG. 10 is another illustration of a cabinet being positioned on the pedestal-interface combination, according to one embodiment.

In one example, the connection mechanism of interface 504 (or cabinet 702) may be locked into place via a snap-and-click locking mechanism (see FIG. 10). The interconnection mechanism (see FIGS. 15-19) may allow for a male type of interconnection device to be connected to a female type interconnection device. For example, the male type interconnection device is located on cabinet 702 and the female type interconnection device is located on interface 504, which when connected together join cabinet 702 with interface 504. In another example, the female type interconnection device is located on cabinet 702 and the male type interconnection device is located on interface 504, which when connected together join cabinet 702 with interface 504. In one example, one or more cabinet electrical interconnection areas 810, one or more interface electrical interconnection areas 812, and/or one or more pedestal electrical interconnection areas 814 are moving to an alignment point (e.g., connection point) (see FIG. 10).

Figure 11:
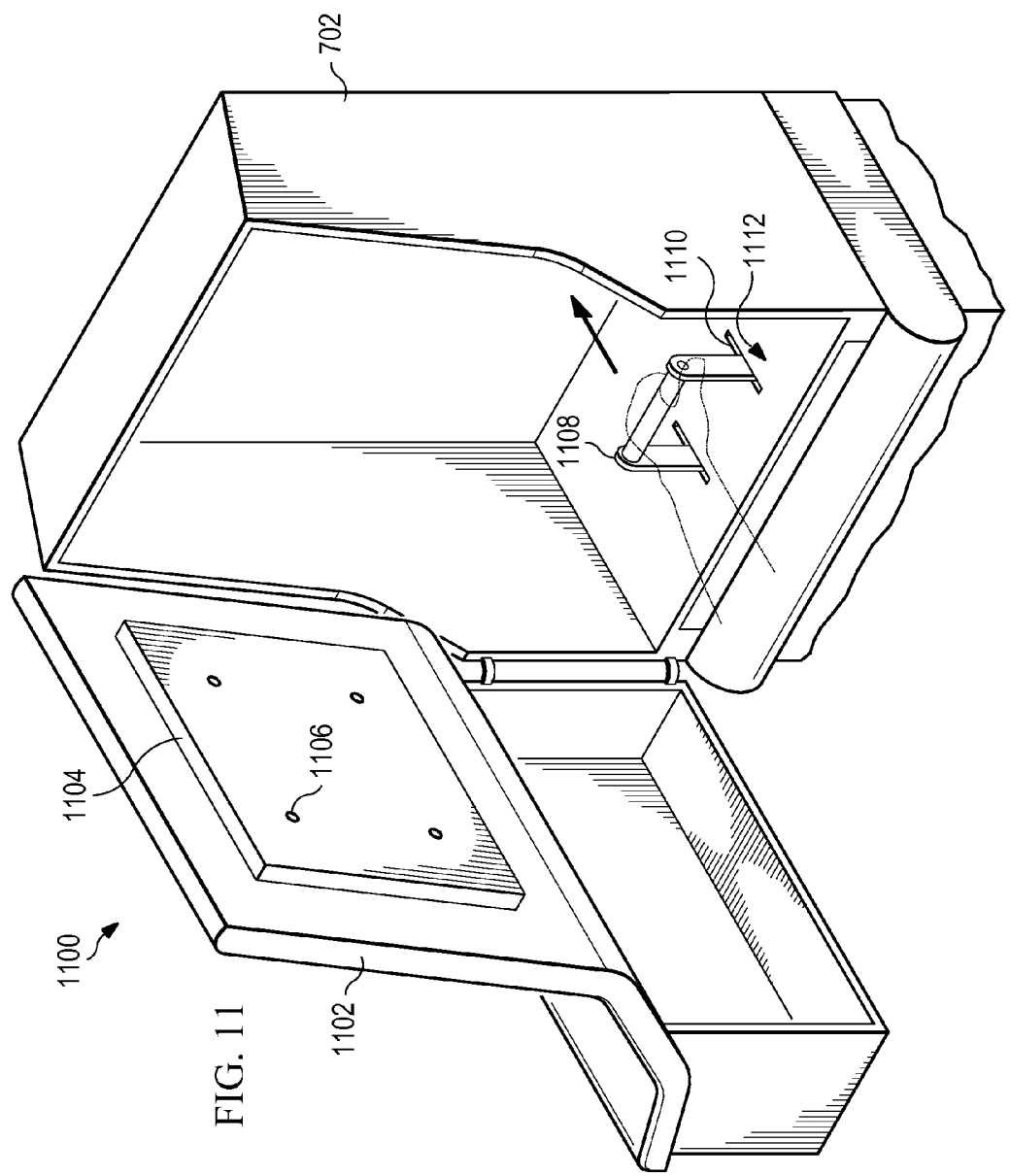
FIG. 11 is an illustration of a locking mechanism for the cabinet, interface, and pedestal combination, according to one embodiment.

FIG. 11 shows an illustration 1100 of a locking mechanism for cabinet 702, interface 504, and pedestal 502 combination, according to one embodiment. Illustration 1100 includes cabinet 702, a cabinet door 1102, a display 1104, a display interaction point 1106, a handle 1108, and a handle movement grid 1110. In one example, handle 1108 is in an unlocked position 1112 within handle movement grid 1110. In one example, handle 1108 is in a locked position 1114 within handle movement grid 1110 (see FIG. 12). In one example, one or more cabinet electrical interconnection areas 810 may be located on the cabinet.

Figure 12:
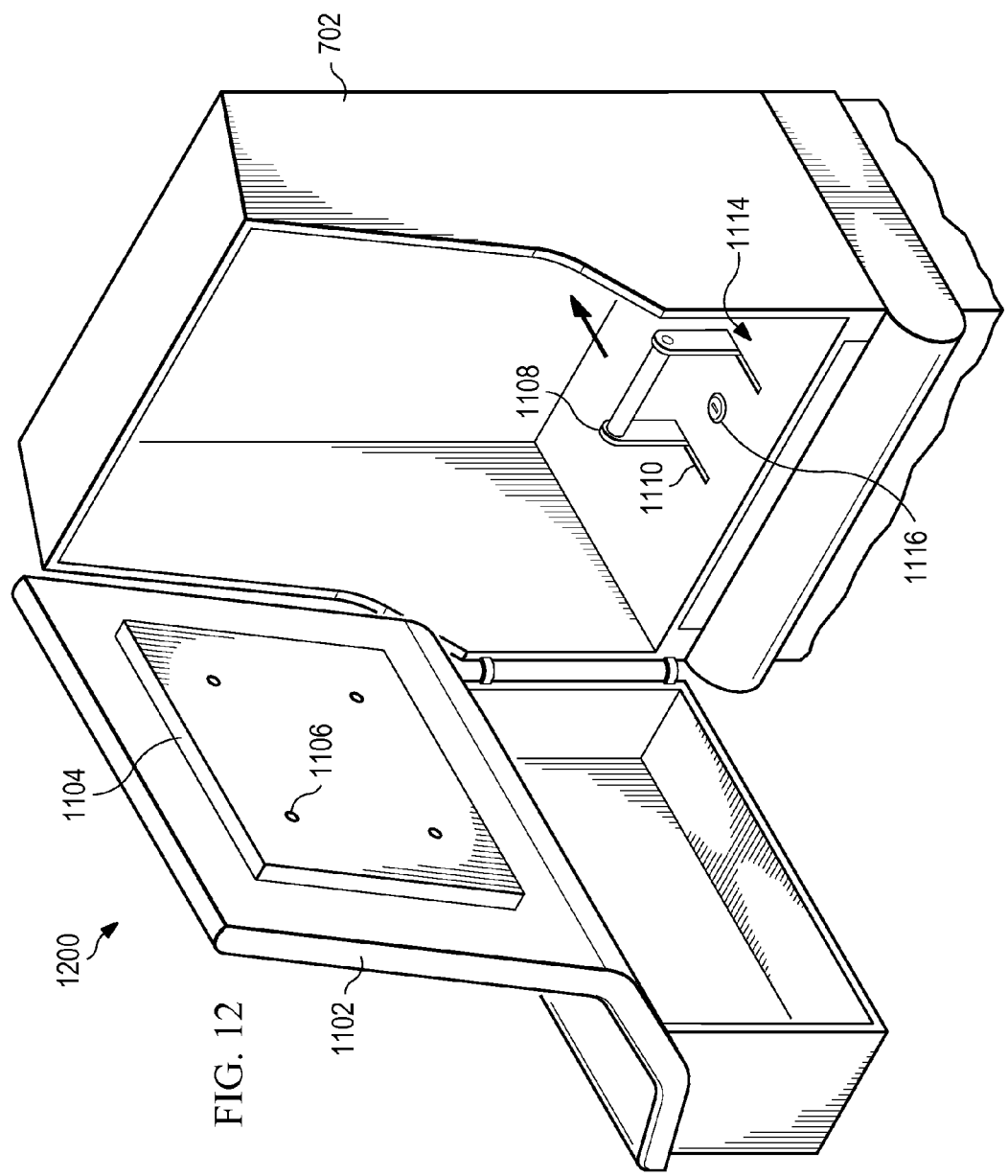
FIG. 12 is another illustration of a locking mechanism for the cabinet, interface, and pedestal combination, according to one embodiment.

In FIG. 12, a locking mechanism 1116 may be utilized to lock handle 1108 into locked position 1114 within handle movement grid 1110. Locking mechanism 1116 may be a key locking device, a push-button locking device, a turn-and-lock locking device, an electronic locking device, a magnetic locking device, a snap-and-click locking device, and/or any other locking device. In one example, locking mechanism 1116 may be a key locking device, which locks once a key is inserted and turned. The key locking device may be unlocked by inserting the key and turning the key in the appropriate direction.

Figure 13:
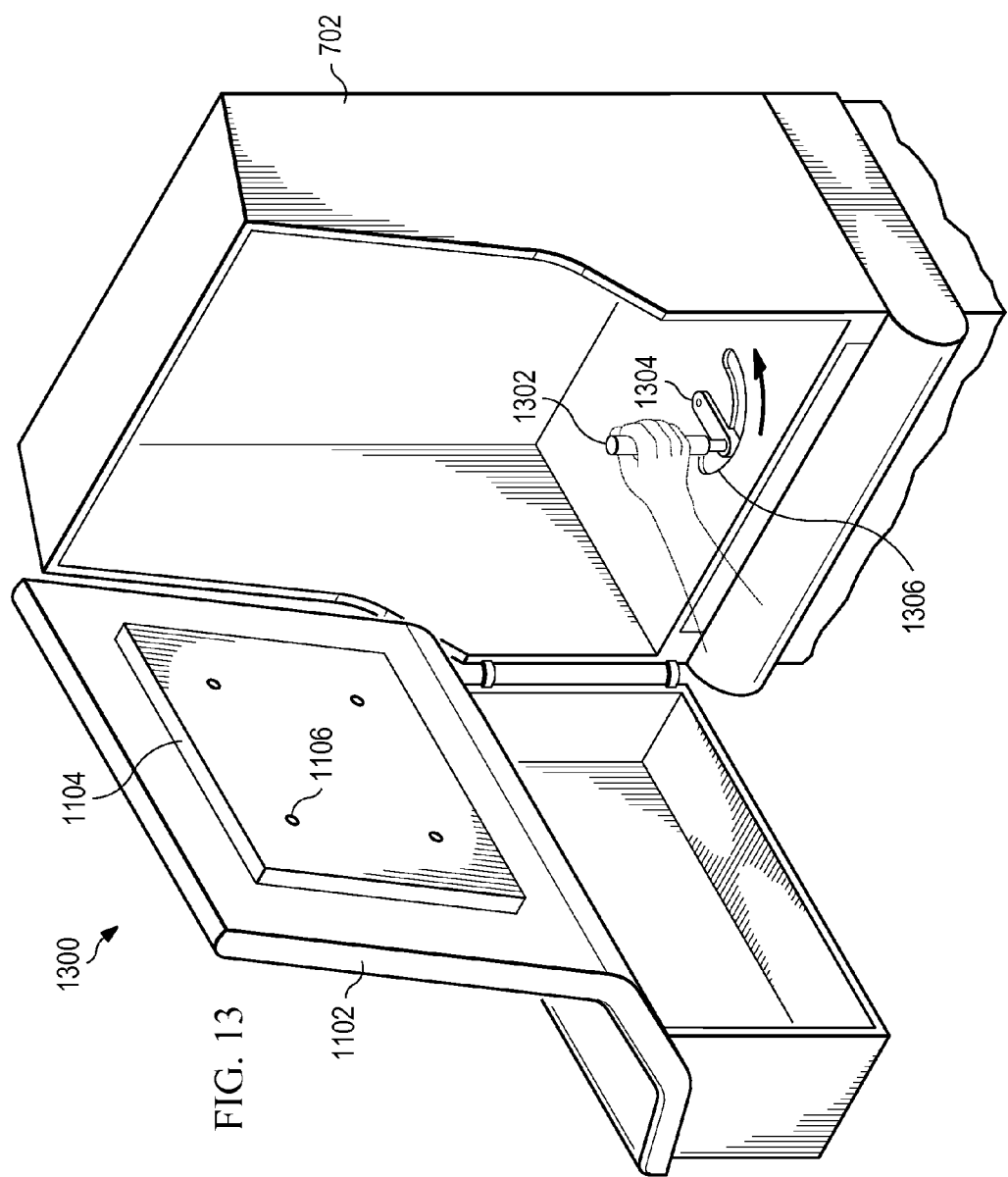
FIG. 13 is another illustration of a locking mechanism for the cabinet, interface, and pedestal combination, according to one embodiment.

In another example, a turn-and-lock locking device 1302 may be utilized as locking mechanism 1116 (see FIG. 13). In one example, turn-and-lock locking device 1302 may move in a turn-and-lock grid 1306 via a turn-and-lock guide 1304. In this example, turn-and-lock locking device 1302 may be positioned in a locking position by moving turn-and-lock locking device 1302 via turn-and-lock guide 1304 and/or turn-and-lock grid 1306 to the right (or left in another example). In this example, turn-and-lock locking device 1302 may be positioned in an unlocked position by moving turn-and-lock locking device 1302 via turn-and-lock guide 1304 and/or turn-and-lock grid 1306 to the left (or right in another example).

Figure 14:
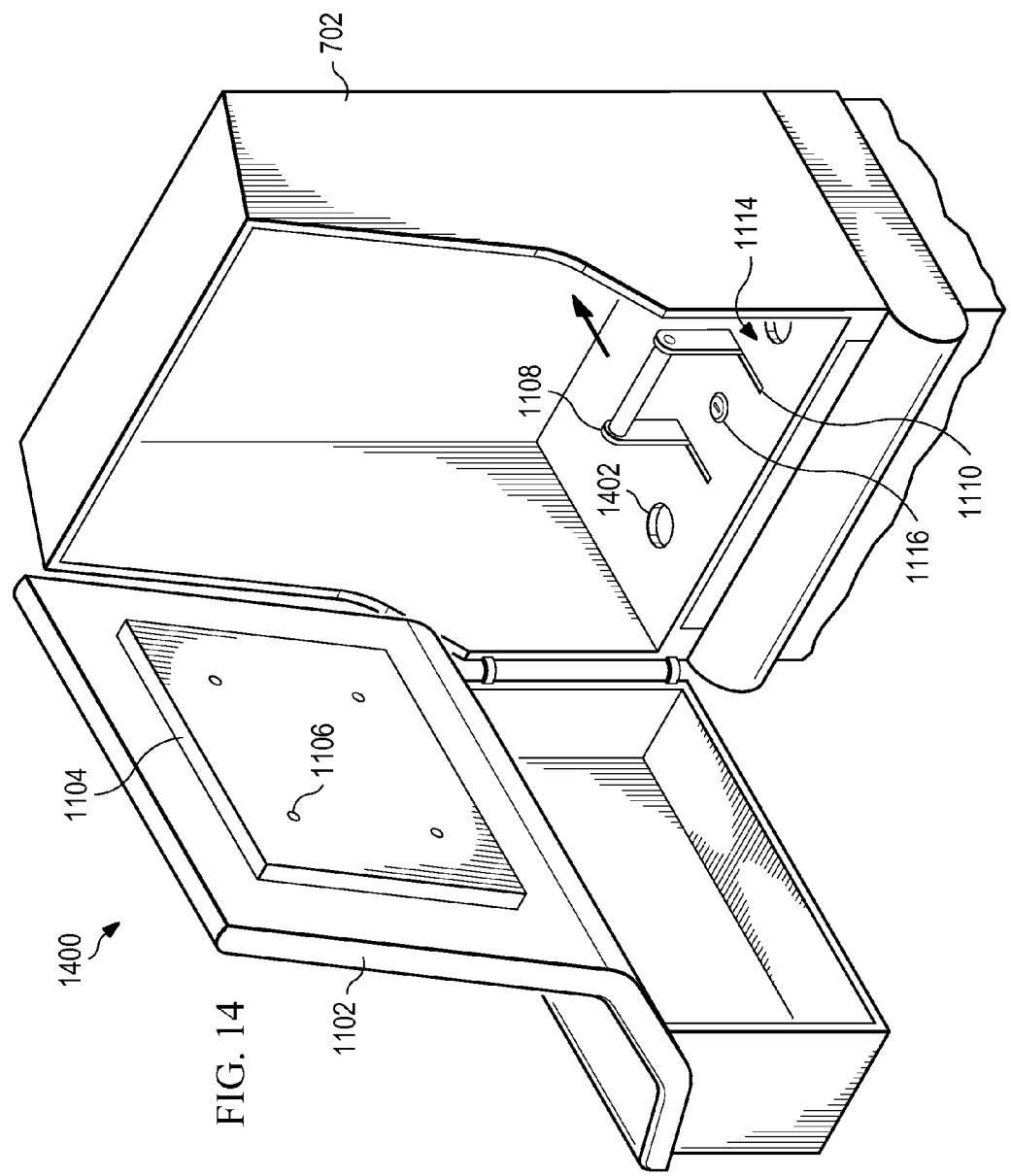
FIG. 14 is another illustration of the cabinet, interface, and pedestal combination, according to one embodiment.

FIG. 14 is another illustration 1400 of cabinet 702, interface 504, and pedestal 502 combination, according to one embodiment. In this example, one or more wire holes 1402 may be utilized to install, run, interconnect, and/or attach one or more items (e.g., wires, cables, support structures, lights, etc.) between cabinet 702 and pedestal 502.

Figure 15:
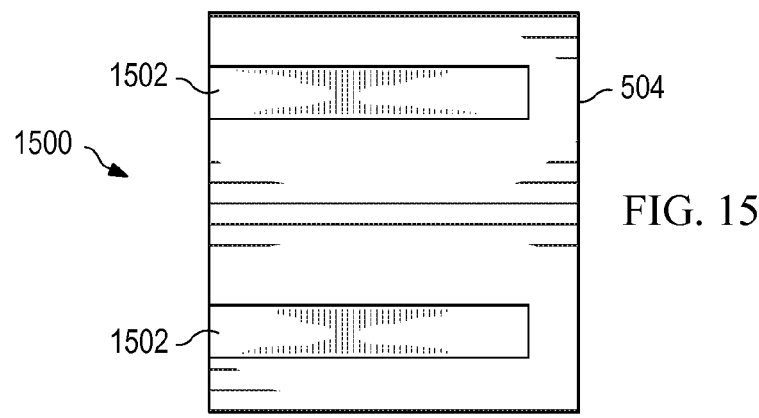
FIG. 15 is an illustration of an interface engagement mechanism, according to one embodiment.
Figure 16:
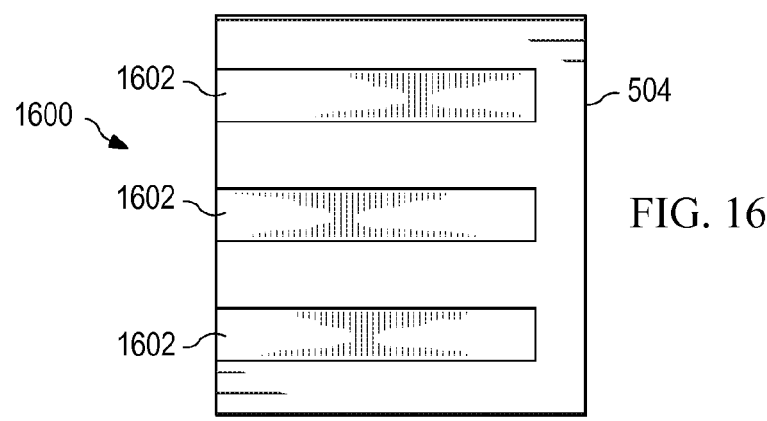
FIG. 16 is another illustration of an interface engagement mechanism, according to one embodiment.

FIG. 15 is an illustration of an interface engagement mechanism 1500, according to one embodiment. Interface 504 may have one or more alignment areas. In this example, interface 504 has two alignment areas 1502. Interface 504 may have any number of alignment points and/or alignment areas. In another example, interface 504 has three alignment areas 1602 (see FIG. 16). These alignment areas may match up with one or more areas on cabinet 702 and/or pedestal 502 to form an integrated part and/or to connect the two parts (e.g., cabinet 702 with interface 504 and/or pedestal 502 with interface 504). In one example, interface engagement mechanism 1500 may include one or more interface electrical interconnection areas 812.

Figure 17:
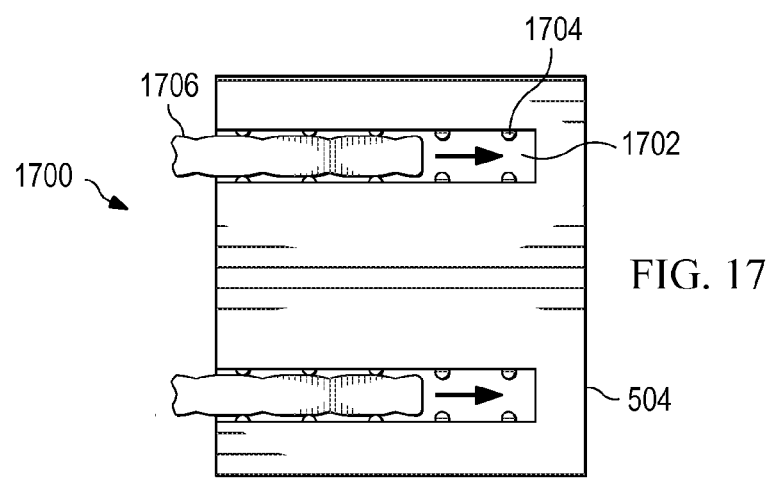
FIG. 17 is another illustration of an interface engagement mechanism, according to one embodiment.
Figure 18:
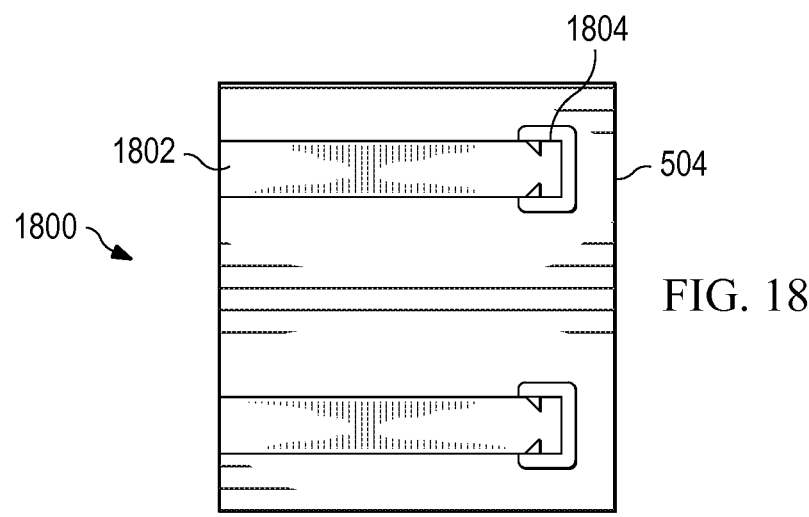
FIG. 18 is another illustration of an interface engagement mechanism, according to one embodiment.

FIG. 17 is another illustration of an interface engagement mechanism 1700, according to one embodiment. In one example, one or more alignment areas 1702 may include one or more connecting points 1704. An interconnection item 1706 from either cabinet 702 and/or pedestal 502 may be inserted into interface 504 via one or more alignment areas 1702 and be connected (e.g., locked, pressure placed on, stopped from moving, etc.) to interface 504 and/or one or more alignment areas 1702.

In another example, interface 504 may include one or more alignment areas 1802, which may include one or more clamping devices 1804. One or more clamping devices 1804 may clamp onto, screw onto, snap together, and/or any other way to be connected to one or more interconnection items from either cabinet 702 and/or pedestal 502 (see FIG. 18).

Figure 19:
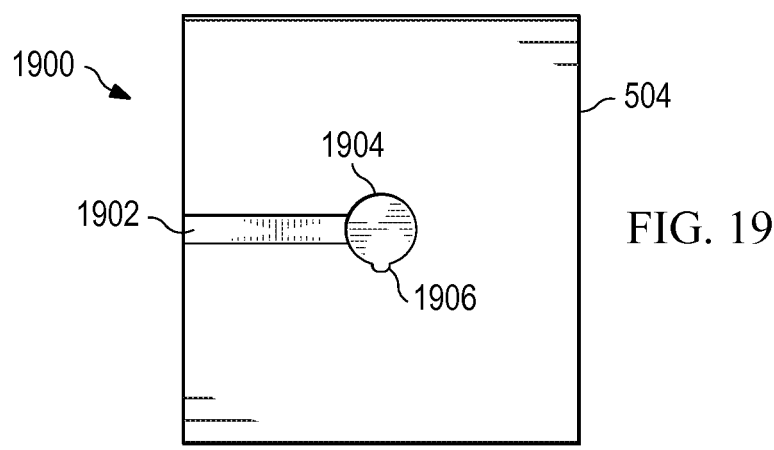
FIG. 19 is another illustration of an interface engagement mechanism, according to one embodiment.

In another example, interface 504 may include one or more alignment areas 1902, which may include a roundabout 1904 and a locking point 1906 (see FIG. 19). In one example, one or more interconnection items from either cabinet 702 and/or pedestal 502 may be inserted into one or more alignment areas 1902. Once the one or more interconnection items is positioned at the end of the one or more alignment areas 1902, roundabout 1904 may be turned until roundabout 1904 reaches locking point 1906 which secures cabinet 702, interface 504, and pedestal 502 into a locked position.

Figure 20:
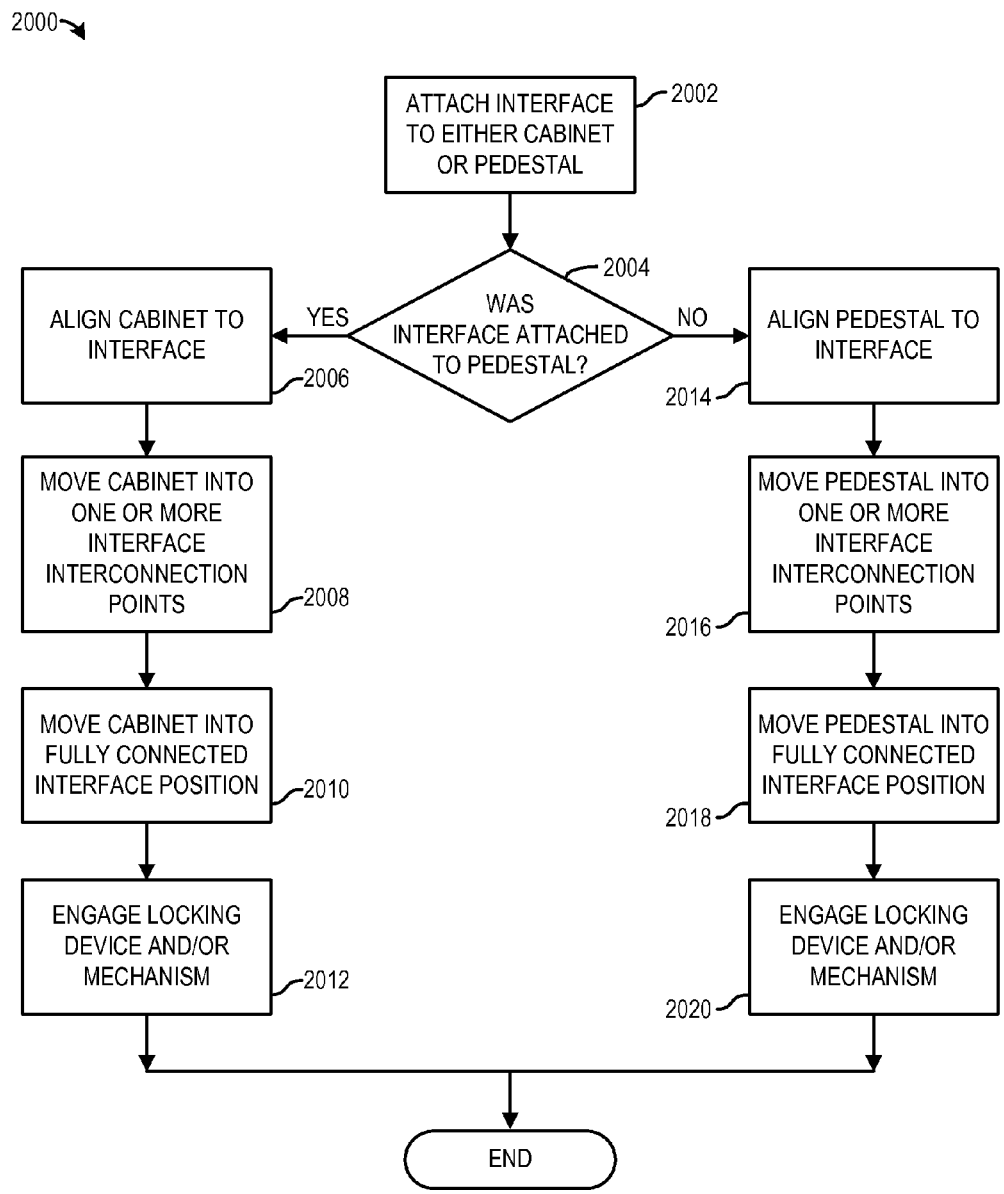
FIG. 20 is a flow diagram for installation of the cabinet, interface, and pedestal, according to one embodiment.

In FIG. 20, a flow diagram 2000 for installation of cabinet 702, interface 504, and pedestal 502 is shown, according to one embodiment. In one example, the method may include attaching interface 504 to one of cabinet 702 and/or pedestal 502 (step 2002). The method may include determining whether interface was attached to pedestal 502 (step 2004). If interface 504 was not attached to pedestal 502, then the method may include aligning pedestal 502 to interface 504 (step 2014). The method may include moving pedestal 502 into one or more interface interconnection points (step 2016). The method may include moving pedestal 502 into a fully connected interface position (step 2018). The method may include engaging one or more locking devices, one or more locking mechanisms, and/or one or more electrical connections (step 2020). The method may then end.

If interface 504 was attached to pedestal 502, then the method may include aligning cabinet 702 to interface 504 (step 2006). The method may include moving cabinet 702 into one or more interface interconnection points (step 2008). The method may include moving cabinet 702 into a fully connected interface position (step 2010). The method may include engaging one or more locking devices, one or more locking mechanisms, and/or one or more electrical connections (step 2012). The method may end.

Figure 21:
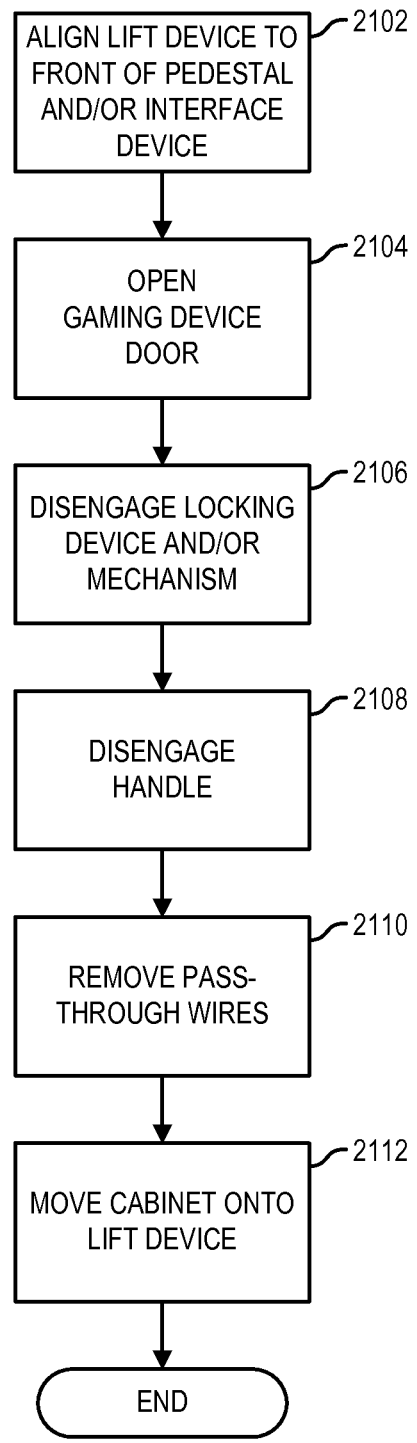
FIG. 21 is a flow diagram for uninstalling the cabinet, interface, and pedestal, according to one embodiment.

In FIG. 21, a flow diagram 2100 for uninstalling cabinet 702, interface 504, and pedestal 502 is shown, according to one embodiment. In one example, the method may include aligning the lift device with cabinet 702 to the front of pedestal 502 and/or interface 504 (step 2102). The method may include opening the gaming device door (step 2104). The method may include disengaging one or more locking devices and/or locking mechanisms (step 2106). The method may include disengaging a handle (step 2108). The method may include removing one or more pass-through wires and/or one or more electrical connections (or other items) (step 2110). The method may include moving cabinet 702 onto lift device (step 2112). The method may end.

In another example, the method may include aligning the lift device with pedestal 502 to the front of cabinet 702 and/or interface 504. The method may include opening the gaming device door. The method may include disengaging one or more locking devices and/or locking mechanisms. The method may include disengaging a handle. The method may include removing one or more pass-through wires (or other items). The method may include moving pedestal 502 onto lift device. The method may end.

In FIG. 22, a flow diagram 2200 for verifying the installation of cabinet 702, interface 504, and pedestal 502 is shown, according to one embodiment. In one example, the method may include obtaining one or more data points from one or more sensors relating to one or more of electronic gaming device 100, cabinet 702, interface 504, and/or pedestal 502 (step 2202). The method may include comparing the one or more data points to one or more reference points (step 2204). The method may include determining whether cabinet 702, interface 504, one or more cabinet electrical interconnection areas 810, one or more interface electrical interconnection areas 812, one or more pedestal electrical interconnection areas 814 and/or pedestal 502 are in the appropriate positions and/or within a range of interrelationship positions with each other (step 2206). If cabinet 702, interface 504, one or more cabinet electrical interconnection areas 810, one or more interface electrical interconnection areas 812, one or more pedestal electrical interconnection areas 814 and/or pedestal 502 are not in the appropriate positions and/or within a range of interrelationship positions with each other, then the method may transmit one or more warnings to an external device, to a server, to a mobile device and/or a warning device on electronic gaming device 100 (step 2208) and the method may end. If cabinet 702, interface 504, one or more cabinet electrical interconnection areas 810, one or more interface electrical interconnection areas 812, one or more pedestal electrical interconnection areas 814 and/or pedestal 502 are in the appropriate positions and/or within a range of interrelationship positions with each other, then the method may end. The method may also transmit one or more status reports.

In one example, cabinet 702 may be aligned (e.g., in the correction position and/or within a tolerance range) with pedestal 502 but not engaged with interface 504. One or more sensors may transmit this data to one or more processors, which may transmit one or more warnings (and/or statuses).

In another example, cabinet 702 may be aligned (e.g., in the correction position and/or within a tolerance range) with pedestal 502 and engaged with interface 504. However, interface 504 may not be secured to pedestal 502. One or more sensors may transmit this data to one or more processors, which may transmit one or more warnings (and/or statuses).

Electronic gaming device 100 may have features that are part of the base game and/or a bonus game. In addition, the disclosed features may be part of a base bet and/or may require an additional side bet (e.g., ante bet).

In one embodiment, the electronic gaming device may include a plurality of reels. The one or more paylines may be formed on at least a portion of the plurality of reels. The electronic gaming device may include a memory.

In one embodiment, the electronic gaming device may include a cabinet, a pedestal, and an interface. The interface may include one or more interconnection areas. The interface may include one or more attachment areas. The interface may be attached to one of the cabinet and the pedestal via the one or more attachment areas. The interface may be attached to one of the cabinet and the pedestal via the one or more interconnection areas. In one example, attachment areas are secured via a screw, a nut, a bolt, glue, etc. In another example, the interconnection areas utilize a male device with a female device for interconnecting.

In another example, attachment areas utilize a male device with a female device for interconnecting. In another example, the interconnection areas are secured via a screw, a nut, a bolt, glue, etc.

In another example, any connection method may be utilized for attachment areas and/or interconnection areas.

In one example, the electronic gaming device may include one or more processors. In another example, the electronic gaming device may include one or more sensors which may measure positional data relating to one or more of the cabinet, the pedestal, and the interface. In another example, the one or more sensors may transmit one or more positional data relating to the one or more of the cabinet, the pedestal, and the interface to the one or more processors.

In another example, the processor may compare the one or more positional data to one or more references. The processor may transmit one or more warnings based on a comparison of the one or more positional data to one or more references. The processor may transmit one or more statuses based on a comparison of the one or more positional data to one or more references.

In another embodiment, a method of manufacturing an electronic gaming device may include attaching an interface to a pedestal. The method may include aligning a cabinet with at least one of the pedestal and the interface. The method may include placing the cabinet into one or more interface connection points. The method may include placing the cabinet into one or more lock positions on the interface. The method may include locking one or more locking devices.

In another example, the method may include measuring positional data relating to one or more of the cabinet, the pedestal, and the interface. In one example, the method may include transmitting one or more positional data relating to the one or more of the cabinet, the pedestal, and the interface. The method may include comparing the one or more positional data to one or more references. The method may include transmitting one or more warnings based on a comparison of the one or more positional data to one or more references. The method may include transmitting one or more statuses based on a comparison of the one or more positional data to one or more references.

In another embodiment, the interface for an electronic gaming device may include a surface including one or more attachment areas. The one or more attachment areas may be attached to a pedestal via one or more securing devices. The surface may include one or more interconnection areas and the one or more interconnections areas may be attached to a cabinet via an interaction locking mechanism.

In another example, the interaction locking mechanism may be a snap-and-click locking device. In another example, the interaction locking mechanism may be a clamping locking device. In another example, the interaction locking mechanism may be a roundabout locking device. The interaction locking mechanism may include one or more connecting points. The one or more connecting points may place pressure on one or more connection devices. The one or more connecting points may adhere to one or more connection devices.

In one embodiment, the electronic gaming device may include a cabinet and a pedestal. The electronic gaming device may include an interface which may include one or more interconnection areas and one or more attachment areas. The electronic gaming device may include an electrical interface. The electrical interface may include one or more cabinet electrical interconnection areas and one or more pedestal electrical interconnection areas. The interface may be attached to one of the cabinet and the pedestal via the one or more attachment areas and the interface may further be attached to one of the cabinet and the pedestal via the one or more interconnection areas. The electrical interface may electrically couple to the cabinet and the pedestal via the one or more cabinet electrical interconnection areas and the one or more pedestal electrical interconnection areas.

In another example, the electronic gaming device may include one or more processors. In another example, the electronic gaming device may include one or more sensors configured to measure positional data relating to the electrical interface, the one or more cabinet electrical interconnection areas, and/or the one or more pedestal electrical interconnection areas. In one example, the one or more sensors may transmit one or more positional data relating to the electrical interface, the one or more cabinet electrical interconnection areas, and/or the one or more pedestal electrical interconnection areas to the one or more processors. In another example, the one or more processors may compare the one or more positional data to one or more references. In an example, the one or more processors may transmit one or more warnings based on a comparison of the one or more positional data to one or more references. In one example, the one or more processors may transmit one or more statuses based on a comparison of the one or more positional data to one or more references.

In one embodiment, a method of manufacturing an electronic gaming device may include attaching an interface to a pedestal. The method may include aligning a cabinet with at least one of the pedestal and the interface. The method may include placing the cabinet into one or more interface connection points. The method may include connecting one or more cabinet electrical interconnection areas to one or more pedestal electrical interconnection areas. The method may include placing the cabinet into one or more lock positions on the interface. The method may include locking one or more locking devices.

In one example, the method may include measuring positional data relating to an electrical interface, the one or more cabinet electrical interconnection areas, and/or the one or more pedestal electrical interconnection areas. The method may include transmitting one or more positional data relating to the electrical interface, the one or more cabinet electrical interconnection areas, and/or the one or more pedestal electrical interconnection areas. The method may include comparing the one or more positional data to one or more references. The method may include transmitting one or more warnings based on a comparison of the one or more positional data to one or more references. The method may include transmitting one or more statuses based on a comparison of the one or more positional data to one or more references.

In another embodiment, the interface for an electronic gaming device may include a bottom surface including one or more attachment areas. The one or more attachment areas may attach to a pedestal via one or more securing devices. The interface may include a top surface including one or more interconnection areas where the one or more interconnections areas may attach to a cabinet via an interaction locking mechanism. The interface may include an electrical interface which may connect one or more cabinet electrical interconnection areas with one or more pedestal electrical interconnection areas.

In another example, the interaction locking mechanism may be a snap-and-click locking device. In one example, the interaction locking mechanism may be a clamping locking device. In an example, the interaction locking mechanism may be a roundabout locking device. In one example, the interaction locking mechanism may include one or more connecting points. In another example, the one or more connecting points may place pressure on one or more connection devices. In an example, the one or more connecting points may adhere to one or more connection devices.

Figure 23A:
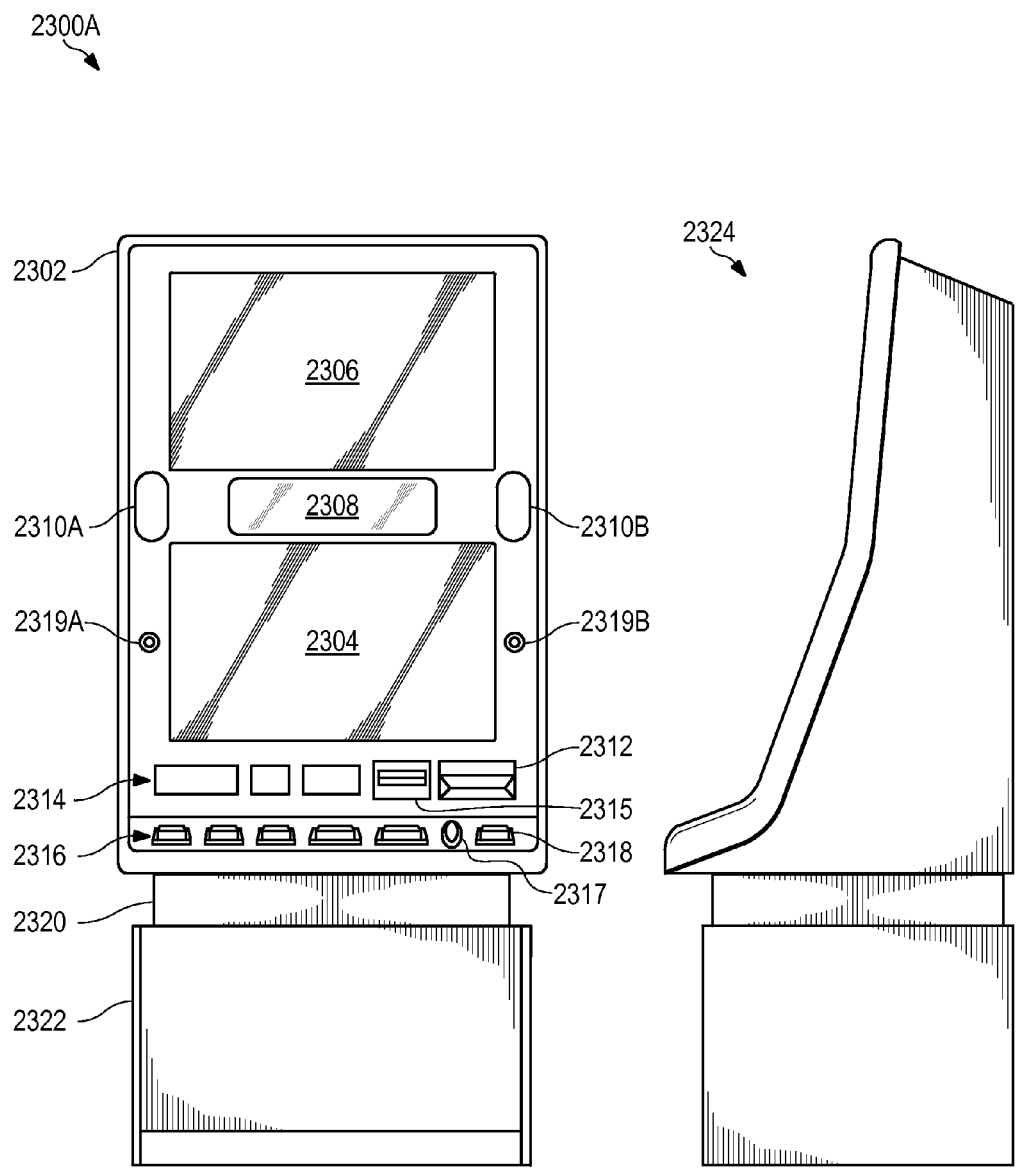
FIG. 23A is an illustration of an interface movement device, according to one embodiment.

In FIG. 23A, an illustration of an interface movement device is shown, according to one embodiment. In this example, a gaming device 2300A may include a cabinet 2302, a first display screen 2304, a second display screen 2306, a third display area 2308, a left speaker 2310A, a right speaker 23108, one or more motion sensors (e.g., reference numbers 2319A, 2319B, etc.), a money transfer device 2312, a ticketing device 2315, a messaging area 2314, one or more input devices (e.g., reference numbers 2316, 2317, 2318, etc.), an interface movement device 2320, and a pedestal 2322. In one example, interface movement device 2320 connects cabinet 2302 with pedestal 2322. The connections (e.g., electrical, mechanical, and/or both) of cabinet 2302 to pedestal 2322 via interface movement device 2320 may occur via any examples shown in this disclosure including the examples shown in FIGS. 1-22. Further, interface movement device 2320 may allow for movement of the cabinet 2302 relative to pedestal 2322 in any direction (e.g., up, down, left, right, backwards, forwards, at 30 degrees, etc.) and/or in any combination of directions (e.g., left and to the right, left side of cabinet up and right side of cabinet down, etc.). In should be noted that interface movement device 2320 was illustrated to be seen between cabinet 2302 and pedestal 2322 for clarity and for easy of understanding. However, interface movement device 2320 may be hidden by the pedestal 2322, the cabinet 2302, any other element of gaming device 2300A, integrated into pedestal 2322, integrated into cabinet 2302, and/or miniscule in size. Further, interface movement device 2320 may be utilized to be seen by the player and/or to play an integral part of game play. In another example, a side view 2324 of gaming device 2300A is shown. In this example, interface movement device 2320 can be seen from the side. However, interface movement device 2320 may not be seen from the side in other examples.

Figure 23B:
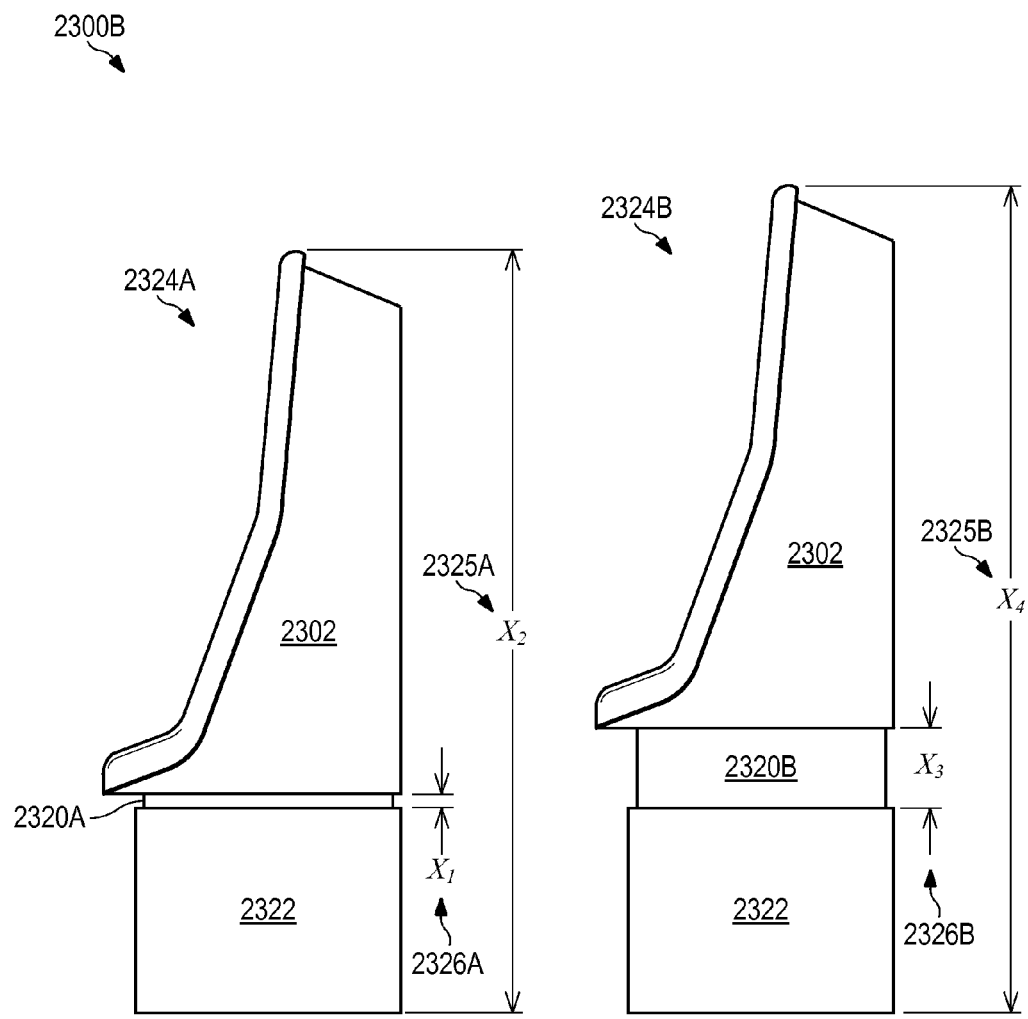
FIG. 23B is another illustration of an interface movement device, according to one embodiment.

In FIG. 23B, another illustration of an interface movement device is shown, according to one embodiment. In this example, electronic gaming device 2300B (and/or cabinet 2324A or 2302) is at a first height 2325A because interface movement device 2320A is at a first position with a first interface movement device height 2326A. In this example, electronic gaming device 2300B (and/or cabinet 2324B or 2302) may be moved to a second height 2325B because interface movement device 2320B is at a second position with a second interface movement device height 2326B. In this example, the cabinet 2302 moved in one direction relative to the pedestal 2322. In various examples, interface movement device 2320 may be utilized to move the cabinet in any direction (e.g., up to six independent directions and/or any combination of directions. In various examples, the interface movement device 2320 may enable movement of the cabinet relative to the pedestal by any distance (e.g., +/−½ inch, +/−1 inch, +/−1⅓ inches, +/−2 inches, +/−5 inches, +/−6 and ⅙ inches, +/−1 foot, +/−2 feet and 1½ inches, +/−10 feet, etc.).

As previously stated, interface movement device 2320 may be concealed from a player's view, integrated into the cabinet, integrated into the pedestal, integrated into any part of electronic gaming device, and/or shown as illustrated by these figures in this disclosure.

Figure 23C:
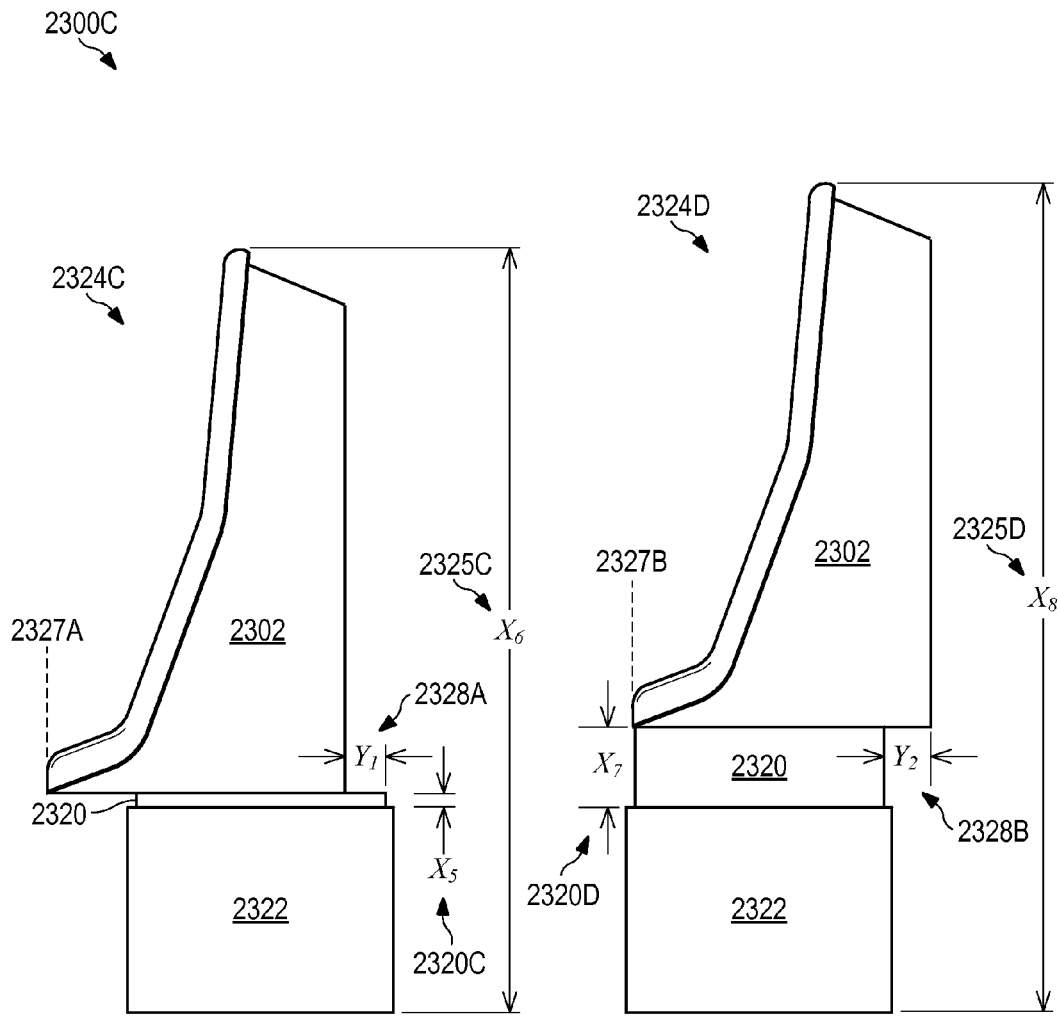
FIG. 23C is another illustration of an interface movement device, according to one embodiment.

In FIG. 23C, another illustration of an interface movement device is shown, according to one embodiment. In this example, electronic gaming device 2300C (and/or cabinet 2324C or 2302) is at a third height 2325C because interface movement device 2320 is at a third position with a third interface movement device height 2320C. Further, electronic gaming device 2300C (and/or cabinet 2324C or 2302) is at a first lateral position 2327A because interface movement device 2320 is at a first lateral position with a first interface movement device lateral position 2328A. In this example, the first interface movement device lateral position 2328A may be achieved by moving the interface movement device 2320, having the interface movement device 2320 move the cabinet 2302, having the interface movement device 2320 move the pedestal 2322, and/or any combination thereof.

In this example, electronic gaming device 2300C (and/or cabinet 2324D or 2302) may be moved to a fourth height 2325D because interface movement device 2320 is at a fourth position with a fourth interface movement device height 2320D. Further, electronic gaming device 2300C (and/or cabinet 2324D or 2302) is at a second lateral position 2327B because interface movement device 2320 is at a second lateral position with a second interface movement device lateral position 2328B. In this example, the second interface movement device lateral position 2328B may be achieved by moving the interface movement device 2320, having the interface movement device 2320 move the cabinet 2302, having the interface movement device 2320 move the pedestal 2322, and/or any combination thereof. In this example, the cabinet 2324 (or 2302) moved in two directions relative to the pedestal 2322.

Figure 23D:
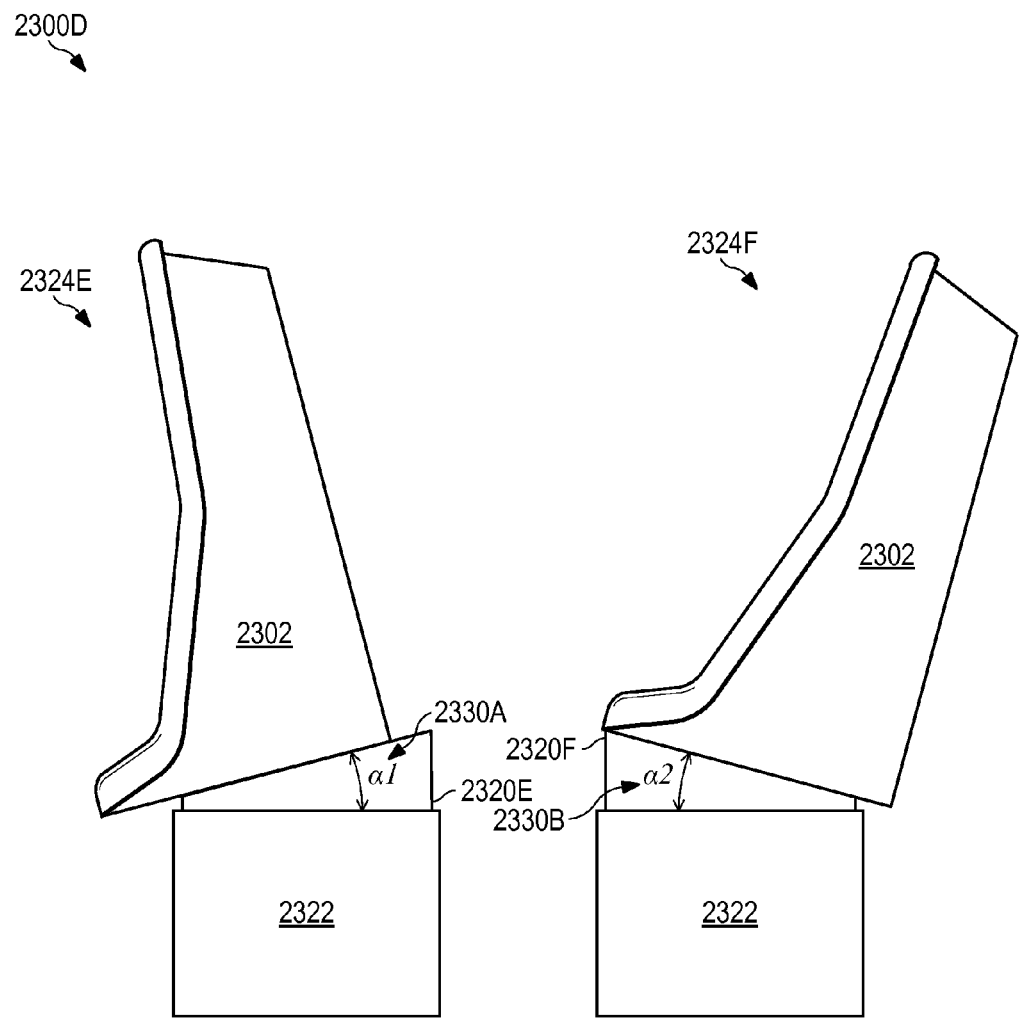
FIG. 23D is another illustration of an interface movement device, according to one embodiment.

In FIG. 23D, another illustration of an interface movement device is shown, according to one embodiment. In this example, electronic gaming device 2300D (and/or cabinet 2324E or 2302) is at a first angle 2330A (first angle being the angle that the cabinet is relative to the pedestal) because interface movement device 2320E has caused a movement area which generates first angle 2330A between cabinet 2302 and pedestal 2322. In various examples, the interface movement device 2320 may enable movement of the cabinet relative to the pedestal by any angle (e.g., 0 degrees, +/−1 degree, +/−1.1 degree, +/−3 degrees, +/−5 degrees, +/−10 degrees, +/−30 degrees, +/−60 degrees, +/−65 degrees, +/−90 degrees, +/−180 degrees, +/−210 degrees, etc.). In this example, electronic gaming device 2300D (and/or cabinet 2324F or 2302) is at a second angle 2330B (second angle being the angle that the cabinet is relative to the pedestal) because interface movement device 2320F has caused a movement area which generates second angle 2330B between cabinet 2302 and pedestal 2322. In this example, the cabinet 2302 was moved in a forward and backward motion relative to the pedestal 2322. Further, the cabinet 2302 was moved in an up and down motion relative to the pedestal 2322.

Figure 23E:
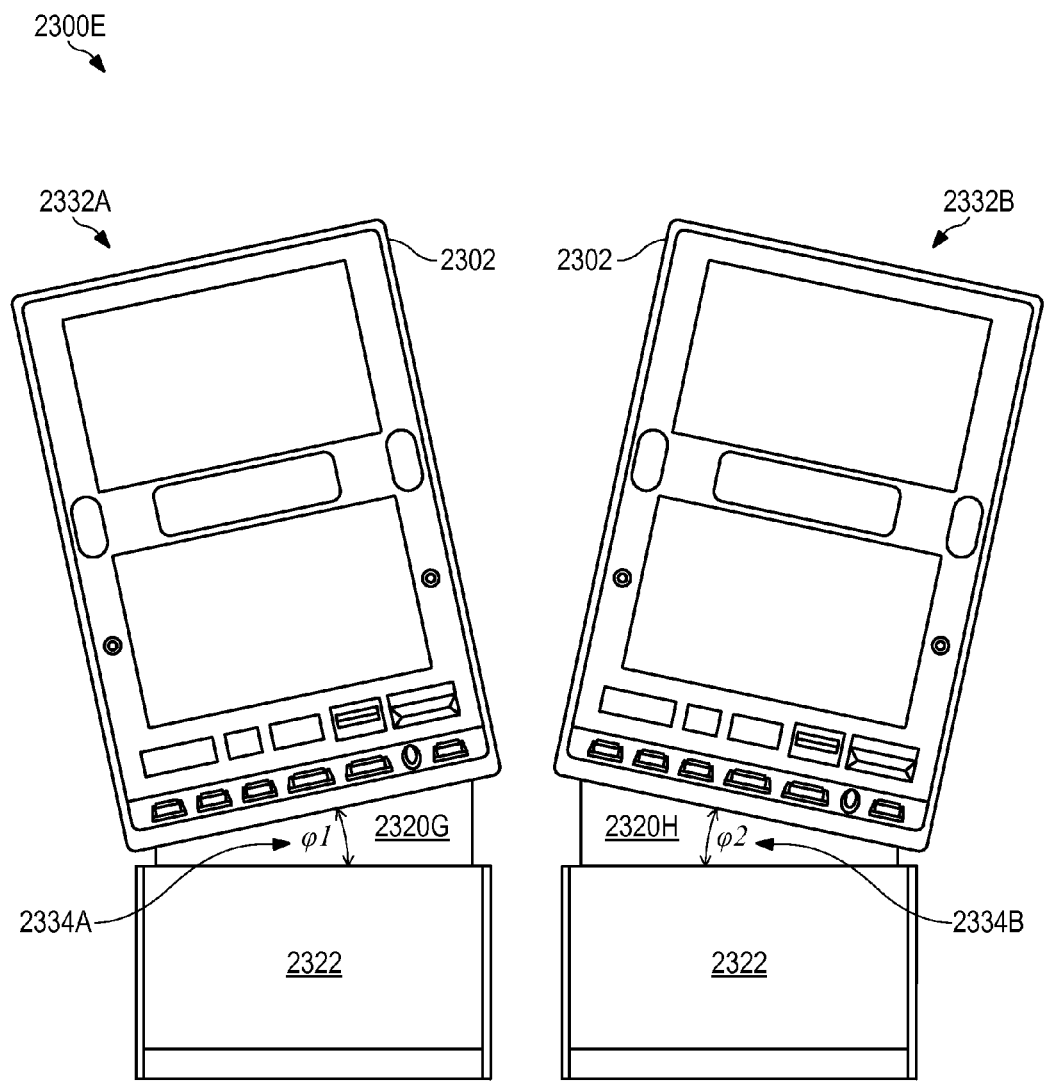
FIG. 23E is another illustration of an interface movement device, according to one embodiment.

In FIG. 23E, another illustration of an interface movement device is shown, according to one embodiment. In this example, electronic gaming device 2300E (and/or cabinet 2332A or 2302) is at a first angle 2334A (first angle being the angle that the cabinet is relative to the pedestal) because interface movement device 2320G has caused a movement area which generates first angle 2334A between cabinet 2302 and pedestal 2322. In various examples, the interface movement device 2320 may enable movement of the cabinet relative to the pedestal by any angle (e.g., 0 degrees, +/−0.25 degrees, +/−0.5 degrees, +/−2.3 degrees, +/−4.1 degrees, +/−8 degrees, +/−13 degrees, +/−15 degrees, +/−67 degrees, +/−91 degrees, +/−185 degrees, +/−232 degrees, etc.). In this example, electronic gaming device 2300E (and/or cabinet 23328 or 2302) is at a second angle 2334B (second angle being the angle that the cabinet is relative to the pedestal) because interface movement device 2320H has caused a movement area which generates second angle 2334B between cabinet 2302 and pedestal 2322. In this example, the cabinet 2302 was moved in a right and left motion relative to the pedestal 2322. Further, the cabinet 2302 was moved in an up and down motion relative to the pedestal 2322. In various examples, these movements may support a rocky and/or shacking presentation which may be tied to a game theme.

Figure 23F:
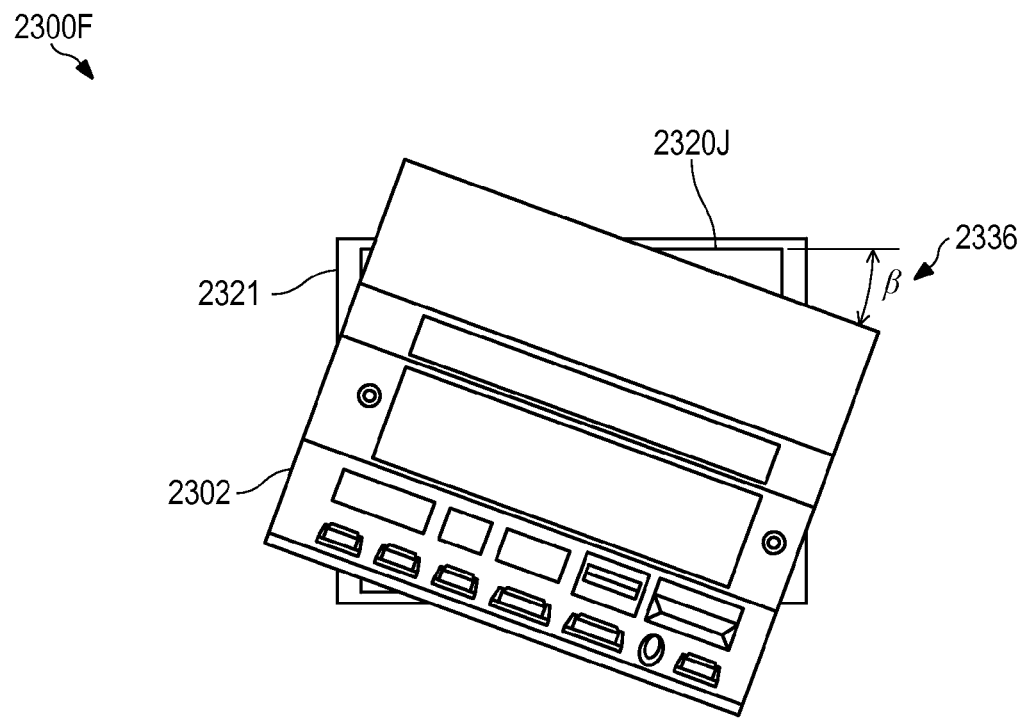
FIG. 23F is another illustration of an interface movement device, according to one embodiment.

In FIG. 23F, another illustration of an interface movement device is shown, according to one embodiment. In this example, electronic gaming device 2300F (and/or cabinet 2302) is at a first angle 2336 (first angle being the angle that the cabinet is relative to a supporting area) because interface movement device 2320 has caused a movement area which generates first angle 2336 between cabinet 2302 and a supporting area 2321. In various examples, the interface movement device 2320 may enable movement of the cabinet relative to supporting area 2321 by any angle (e.g., 0 degrees, +/−0.365 degrees, +/−0.625 degrees, +/−2.8 degrees, +/−4.4 degrees, +/−11 degrees, +/−13 degrees, +/−15 degrees, +/−67 degrees, +/−91 degrees, +/−185 degrees, +/−232 degrees, etc.). In this example, the cabinet 2302 was moved in turning motion relative to supporting area 2321. Further, the cabinet 2302 may be moved in an up and down motion relative to supporting area 2321. Supporting area 2321 (which is linked to movement interface and cabinet) may be located behind cabinet 2302 which allows cabinet 2302 to move in six directions relative to the vertical axis (e.g., the vertical axis may be the major axis with the horizontal axis being the minor axis). Whereas, when the movement interface is linked to pedestal the cabinet may move in six directions relative to the horizontal axis (e.g., the horizontal axis may be the major axis with the vertical axis being the minor axis). These two examples may be combined and/or reversed (e.g., changing the relative axis).

Figure 23G:
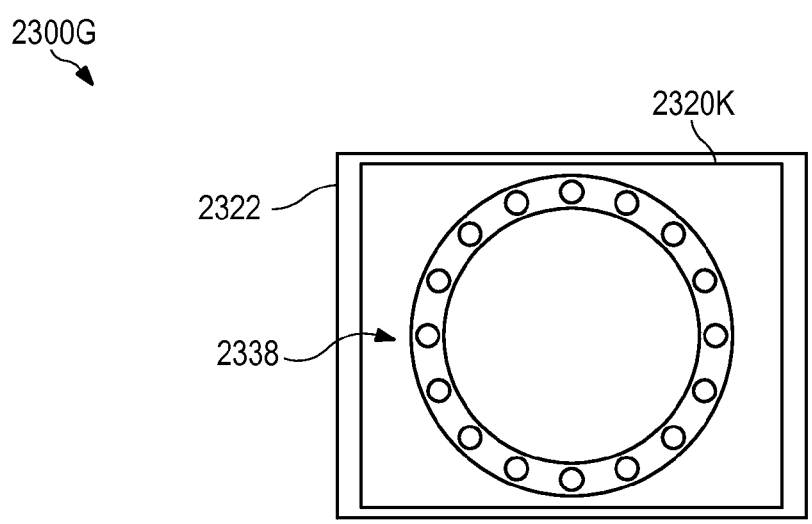
FIG. 23G is another illustration of an interface movement device, according to one embodiment.

In FIG. 23G, another illustration of an interface movement device is shown, according to one embodiment. In this example, a movement interface device includes a circle of ball bearings 2338. Any other formation (e.g., square, triangle, hexagon, etc.) may be utilized. Further, any other movement mechanism may be utilized.

Figure 24A:
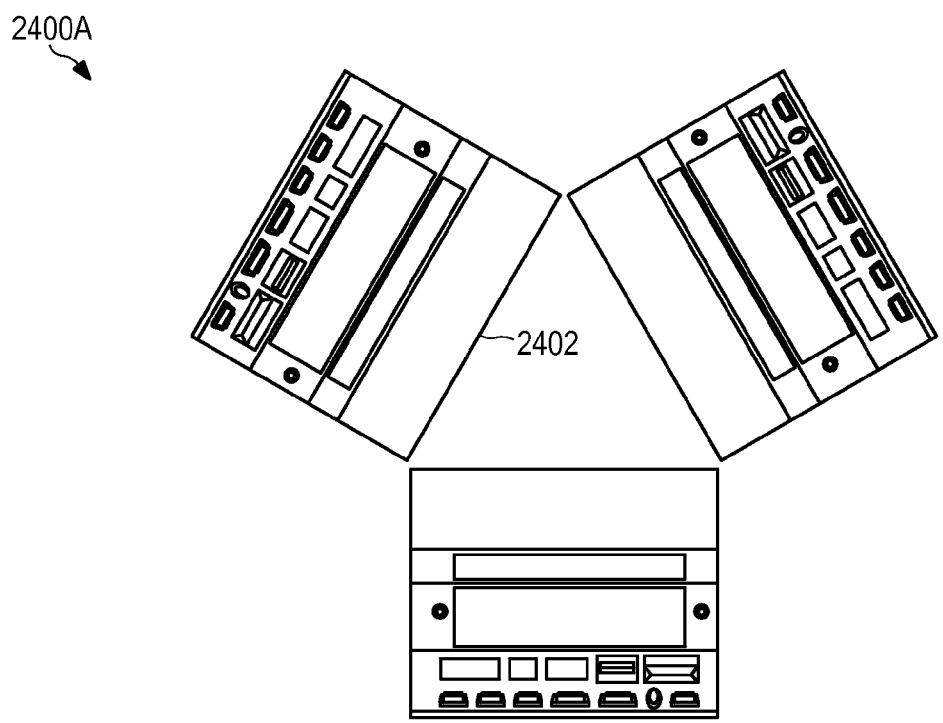
FIG. 24A is an illustration of an interface movement device, according to one embodiment.
Figure 24B:
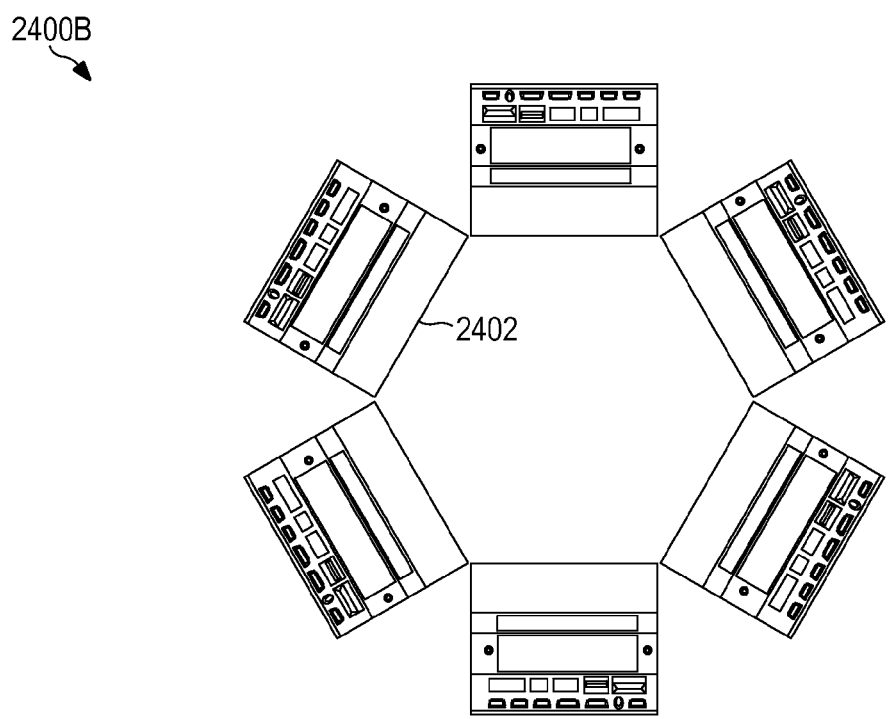
FIG. 24B is another illustration of an interface movement device, according to one embodiment.
Figure 24C:
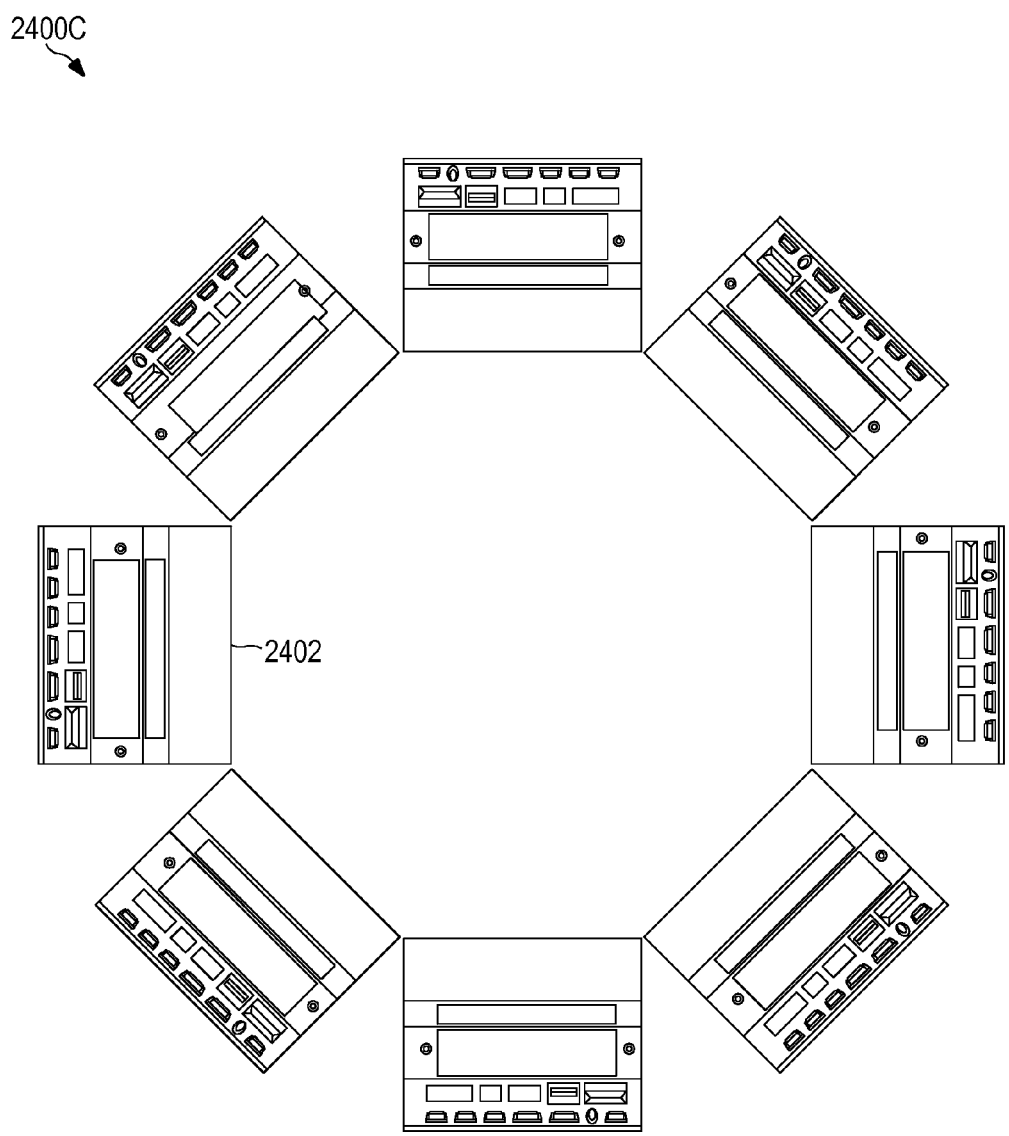
FIG. 24C is another illustration of an interface movement device, according to one embodiment.

In FIG. 24A, an illustration of an interface movement device is shown, according to one embodiment. In this example, two or more electronic gaming devices 2402 may be positioned in a triangle formation via one or more interface movement devices 2320. Further, any shape may be formed (e.g., an S shape, an L shape, a Z shape, etc.). For example as seen in FIG. 24B, a hexagon shape may be formed. In another example as seen in FIG. 24C, a circle shape may be formed. In various examples, the two or more electronic gaming devices 2402 may form these shapes with no separations between the two or more electronic gaming devices 2402, minimal separations between the two or more electronic gaming devices 2402, and/or any other separation distances (e.g., varying, equal, large, etc.) between the two or more electronic gaming devices 2402.

Figure 25A:
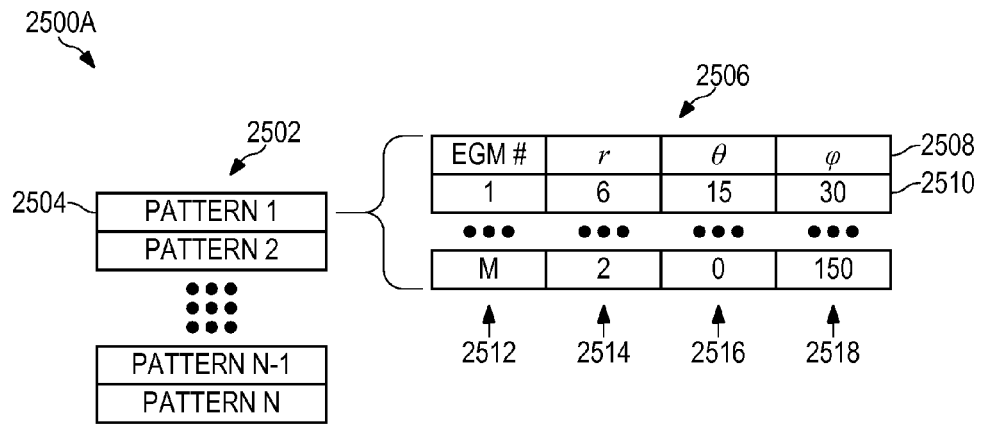
FIG. 25A is an illustration of a plurality of movement patterns, according to one embodiment.

In FIG. 25A, an illustration of a plurality of movement patterns is shown, according to one embodiment. In this example, a movement index area 2502 may include a first movement pattern, a second movement pattern, an n−1 movement pattern, and an Nth movement pattern. Any number of movement patterns (e.g., 1 to N) may be utilized. In this example, a first movement pattern 2504 may have various characteristics. In this example, first movement pattern 2504 may indicate that first gaming machine (e.g., EGM #1) is to be in position r=6, $\Phi$=15, and $\phi$=30 at time t=0, while the Mth gaming machine (e.g., EGM #M) is to be in position r=2, $\Phi$=0, and $\phi$=150 at time t=0. Further, at time t=1, first gaming machine (e.g., EGM #1) is to be in position r=15, $\Phi$=12, and $\phi$=29, while the Mth gaming machine (e.g., EGM #M) is to be in position r=4, $\Phi$=100, and $\phi$=2. In addition, at time t=N, first gaming machine (e.g., EGM #1) is to be in position r=25, $\Phi$=9, and $\phi$=35, while the Mth gaming machine (e.g., EGM #M) is to be in position r=0, $\Phi$=0, and $\phi$=0, and second gaming machine (e.g., EGM #2) is to be in position r=15, $\Phi$=33, and $\phi$=69, while Nth gaming machine (e.g., EGM #N) is to be in position r=42, $\Phi$=7, and $\phi$=13. These data points may be on a spherical coordinate system. However, any coordinate system may be utilized.

Figure 25B:
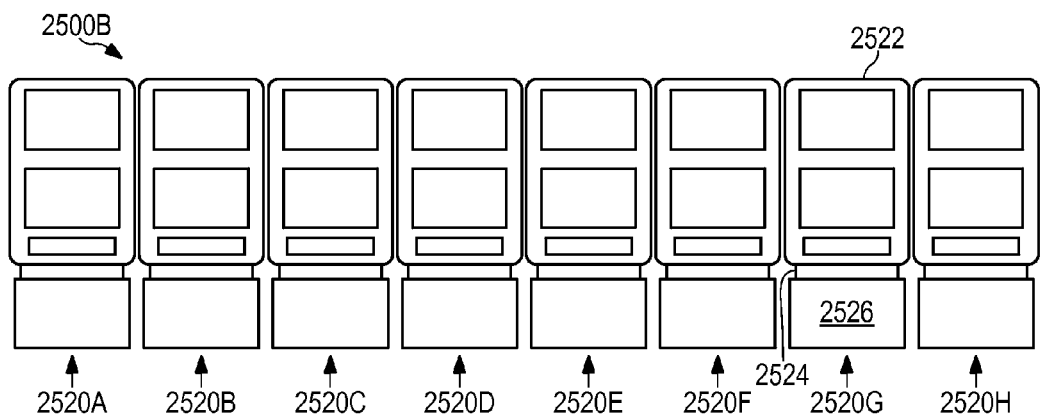
FIG. 25B is another illustration of an interface movement device, according to one embodiment.

In FIG. 25B, another illustration of an interface movement device is shown, according to one embodiment. In this example, a bank of gaming devices 2500B is shown where one or more of the gaming devices 2522 (e.g., a first gaming device 2520A, a second gaming device 2520B, a third gaming device 2520C, a fourth gaming device 2520D, a fifth gaming device 2520E, a sixth gaming device 2520F, a seventh gaming device 2520G, and an Nth gaming device 2520H) are in a default position. The default position may be any physical position, however, in this example, the default position is where the movement interface 2524 is in a base position (e.g., has not moved).

Figure 25C:
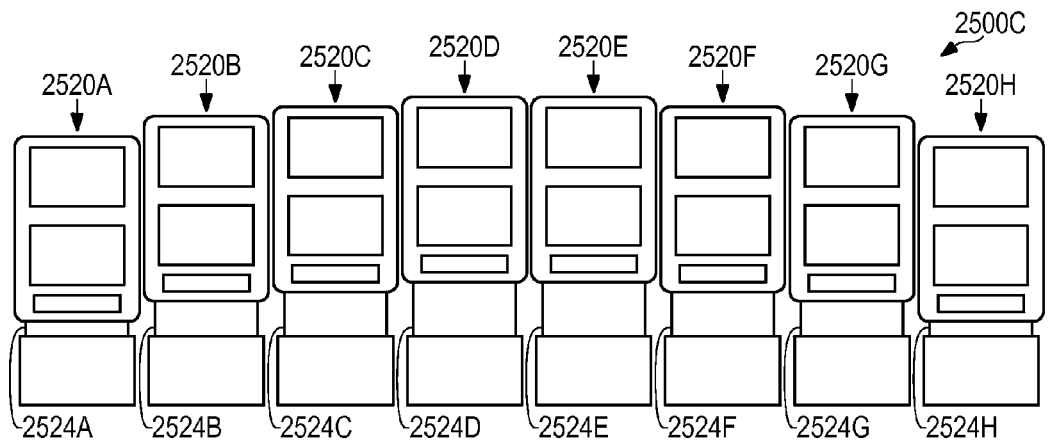
FIG. 25C is another illustration of an interface movement device, according to one embodiment.

In FIG. 25C, another illustration of an interface movement device is shown, according to one embodiment. In this example, first gaming device 2520A has not moved via a first movement device interface 2524A, second gaming device 2520B has moved up via a second movement device interface 2524B (second gaming device 2520B is located in a position higher than first gaming device 2520A), third gaming device 2520C has moved up via a third movement interface device 2524C (third gaming device 2520C is located in a position higher than first gaming device 2520A and second gaming device 2520B), fourth gaming device 2520D has moved up via a fourth movement interface device 2524D (fourth gaming device 2520D is located in a position higher than first gaming device 2520A, second gaming device 2520B, and third gaming device 2520C), fifth gaming device 2520E has moved up via a fifth movement interface device 2524E (fifth gaming device 2520E is located in a position equal to fourth gaming device 2520D which is higher than first gaming device 2520A, second gaming device 2520B, and third gaming device 2520C), sixth gaming device 2520F has moved up via a sixth movement interface device 2524F (sixth gaming device 2520F is located in a position lower than fifth gaming device 2520E but higher than first gaming device 2520A and second gaming device 2520B while being equal in height to third gaming device 2520C), seventh gaming device 2520G has moved up via a seventh movement interface device 2524G (seventh gaming device 2520D is located in a position higher than first gaming device 2520A, equal to second gaming device 2520B, and lower than third gaming device 2520C and fourth gaming device 2524D and fifth gaming device 2524E), and Nth gaming device 2520H has moved up via a nth movement interface device 2524H (Nth gaming device 2520H is located in a position lower than all the devices except first gaming device 2520A which is at an equal height level.

Figure 25D:
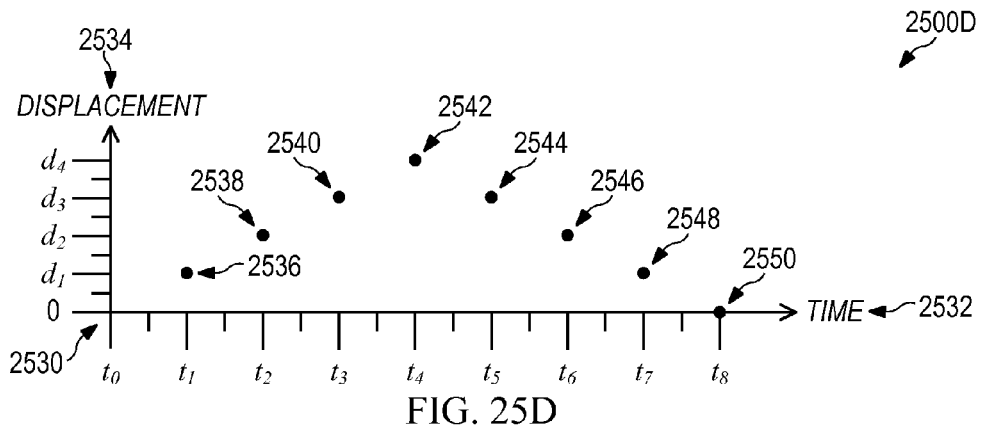
FIG. 25D is another illustration of an interface movement device, according to one embodiment.

In FIG. 25D, another illustration of an interface movement device is shown, according to one embodiment. In this example, a displacement versus time table 2500D is shown with time on the X axis 2532 and displacement data on the Y axis 2534 with an origin 2530. In one example, at a time t=0, there is no displacement which may mean that the electronic gaming device is in a base, default, and/or initial position. In another example, at a time t=t1 (reference number 2536), there is a displacement of d1 (e.g., one displacement unit, which may equal +/−0.1 inches, +/−0.25 inches, +/−1 inch, +/−3 inches, +/−1 foot, etc.). In another example, at a time t=t2 (reference number 2538), there is a displacement of d2 (e.g., two displacement units). In another example, at a time t=t3 (reference number 2540), there is a displacement of d3 (e.g., three displacement units). In another example, at a time t=t4 (reference number 2542), there is a displacement of d4 (e.g., four displacement units). In another example, at a time t=t5 (reference number 2544), there is a displacement of d3 (e.g., three displacement units). In another example, at a time t=t6 (reference number 2546), there is a displacement of d2 (e.g., two displacement units). In another example, at a time t=t7 (reference number 2548), there is a displacement of d1 (e.g., one displacement units). In another example, at a time t=t8 (reference number 2550), there is a displacement of d0 (e.g., zero displacement units).

It should be noted that electronic gaming device may be moved by any fraction of a displacement unit. Further, a displacement unit may be 1 inch to the right at an angle of 30 degrees and/or any movement pattern in any direction and/or multi-directional. Further, these displacement units may be for one electronic gaming machine. Therefore, a single gaming device would move to all of these positions during a time period. In addition, these displacement units may be tied to different gaming devices. Therefore, a first gaming device is linked to a first displacement data. For example, a first gaming device moves based on the data at time t=t1 while a second gaming device moves based on the data at time t=t2. This last example will be shown in FIGS. 25E-25N.

Figure 25E:
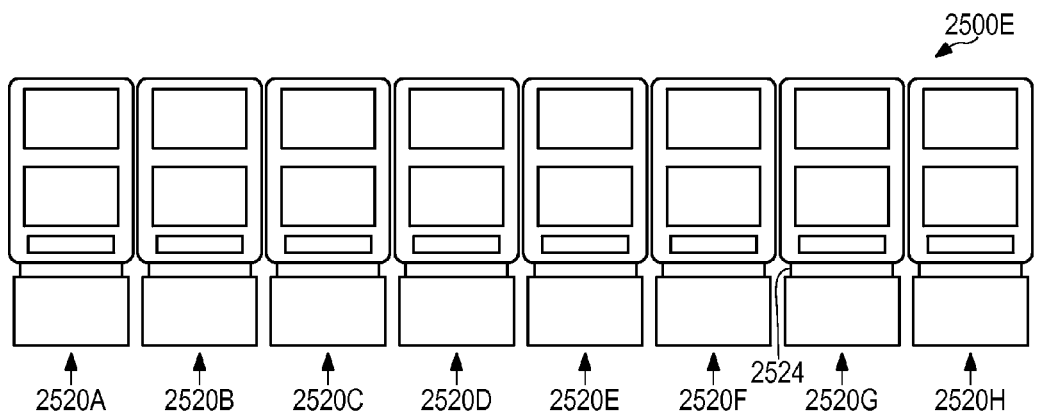
FIG. 25E is another illustration of an interface movement device, according to one embodiment.

In FIG. 25E, another illustration of an interface movement device is shown, according to one embodiment. In this example, bank of gaming devices 2500E is shown where one or more of the gaming devices 2522 (e.g., first gaming device 2520A, second gaming device 2520B, third gaming device 2520C, fourth gaming device 2520D, fifth gaming device 2520E, sixth gaming device 2520F, seventh gaming device 2520G, and Nth gaming device 2520H) are in a default position. The default position may be any physical position, however, in this example, the default position is where the movement interface 2524 is in a base position (e.g., has not moved). In this example, at a time t=0 (reference number 2530), there is no displacement which may means that the electronic gaming devices are in a base, default, and/or initial position. In one example, an initial position may be the position where the gaming machine last stopped. In other words, the gaming machine may be at the top of it motion range for an initial position. For example, a first presentation may require a first gaming machine to end at a first point (which is not the default position and/or base position). Whereas, a second presentation may require the first gaming machine to start at a second position which is different than the first point. The system, method, and/or device may adjust one or more parameter based on this discrepancy.

Figure 25F:
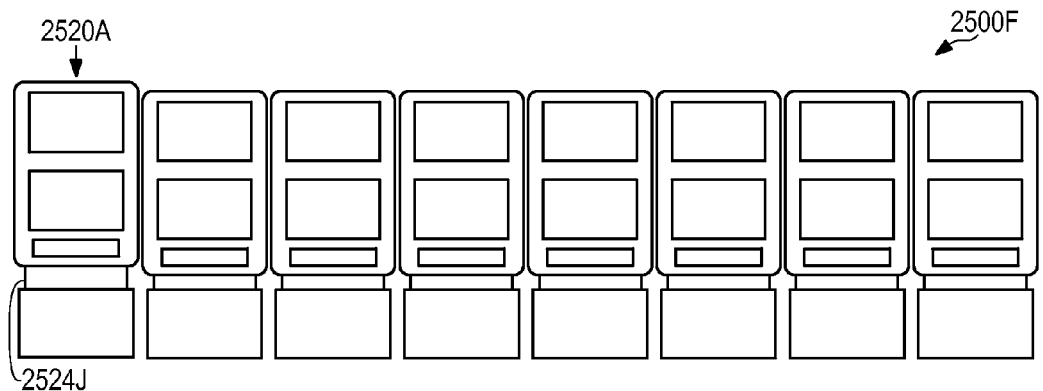
FIG. 25F is another illustration of an interface movement device, according to one embodiment.

In FIG. 25F, another illustration of an interface movement device is shown, according to one embodiment. In this example, at a time t=t1 (reference number 2536), there is a displacement of d1 (e.g., one displacement unit, which may equal +/−0.1 inches, +/−0.125 inches, +/−0.23 inches, +/−2 inches, +/−2.671 inches, +/−1.2 feet, +/−10 feet, +/−30 degrees, +/−44 degrees, +/−1 inch to the right and +/−2 inches up and then +/−3 feet to the left, and then +/−3 inches down and/or combination thereof) which is utilized on first gaming device 2520A which displaces, moves up, moves down, moves to the right, moves to the left, rotates, shifts, rocks, vibrates, and/or moves in a multi-directional movement patterns via a first interface movement device 2524J associated with first gaming device 2520A.

Figure 25G:
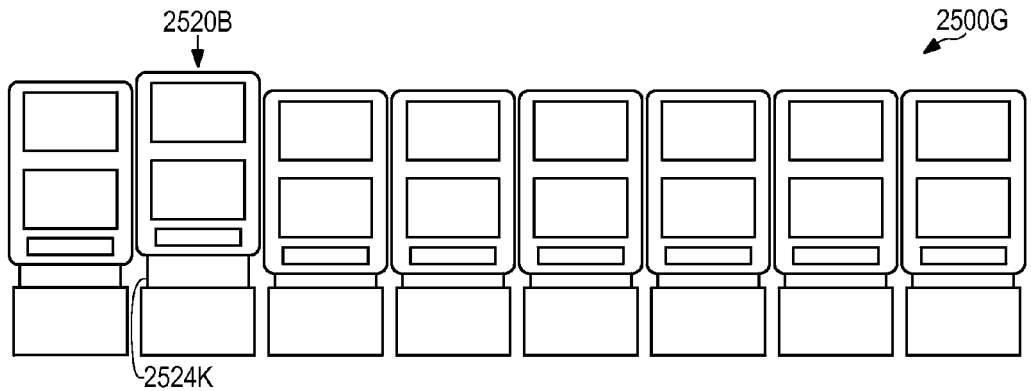
FIG. 25G is another illustration of an interface movement device, according to one embodiment.

In another example, at a time t=t2 (reference number 2538), there is a displacement of d2 (e.g., two displacement units) which is utilized on second gaming device 2520B which displaces, moves up, moves down, moves to the right, moves to the left, rotates, shifts, rocks, vibrates, and/or moves in a multi-directional movement patterns (e.g., to the left and up and then down and to the left) via a second interface movement device 2524K associated with second gaming device 2520B (see FIG. 25G).

Figure 25H:
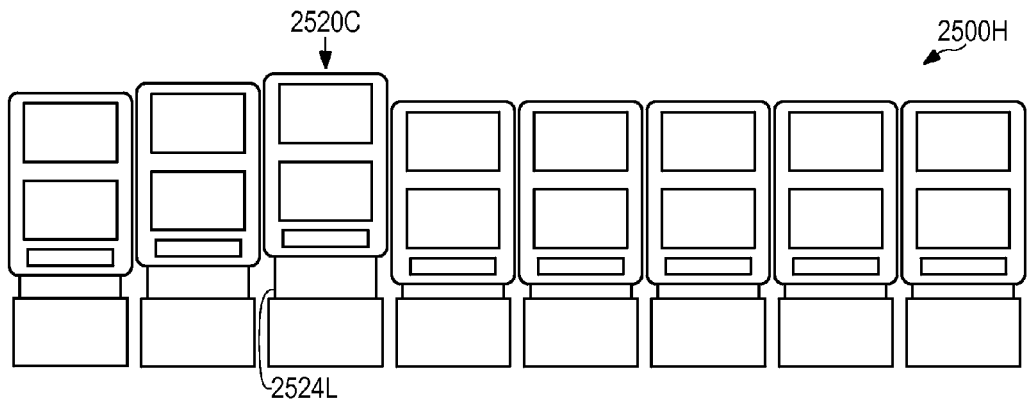
FIG. 25H is another illustration of an interface movement device, according to one embodiment.

In another example, at a time t=t3 (reference number 2540), there is a displacement of d3 (e.g., three displacement units) which is utilized on third gaming device 2520C which displaces, moves up, moves down, moves to the right, moves to the left, rotates, shifts, rocks, vibrates, and/or moves in a multi-directional movement patterns (e.g., to the right and up and then down and to the left) via a third interface movement device 2524L associated with third gaming device 2520C (see FIG. 25H).

Figure 25J:
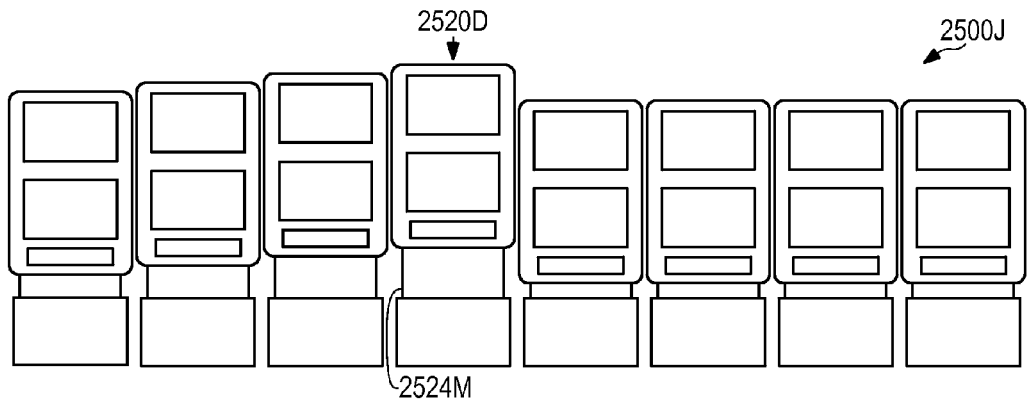
FIG. 25J is another illustration of an interface movement device, according to one embodiment.

In another example, at a time t=t4 (reference number 2542), there is a displacement of d4 (e.g., four displacement units) which is utilized on fourth gaming device 2520D which displaces, moves up, moves down, moves to the right, moves to the left, rotates, shifts, rocks, vibrates, and/or moves in a multi-directional movement patterns (e.g., up and to the left and then down and to the left) via a fourth interface movement device 2524M associated with fourth gaming device 2520D (see FIG. 25J).

Figure 25K:
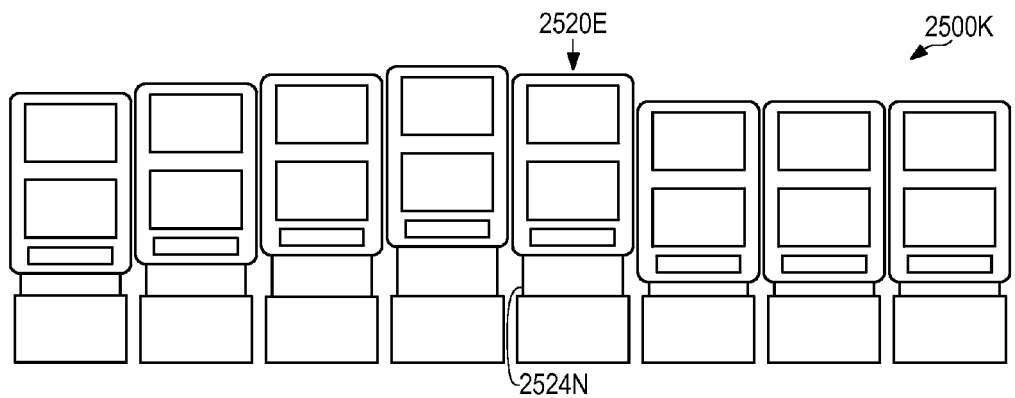
FIG. 25K is another illustration of an interface movement device, according to one embodiment.

In another example, at a time t=t5 (reference number 2544), there is a displacement of d3 (e.g., three displacement units) which is utilized on fifth gaming device 2520E which displaces, moves up, moves down, moves to the right, moves to the left, rotates, shifts, rocks, vibrates, and/or moves in a multi-directional movement patterns (e.g., to the left and up and then down and to the left) via a fifth interface movement device 2524N associated with fifth gaming device 2520E (see FIG. 25K).

Figure 25L:
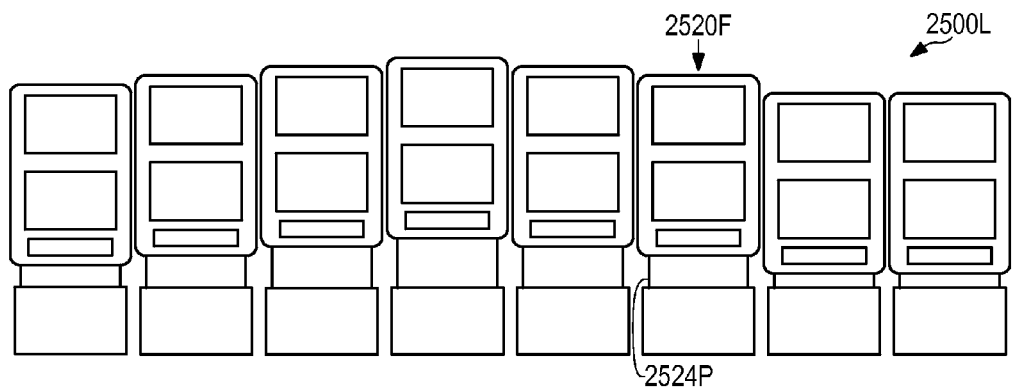
FIG. 25L is another illustration of an interface movement device, according to one embodiment.

In another example, at a time t=t6 (reference number 2546), there is a displacement of d2 (e.g., two displacement units) which is utilized on sixth gaming device 2520F which displaces, moves up, moves down, moves to the right, moves to the left, rotates, shifts, rocks, vibrates, and/or moves in a multi-directional movement patterns (e.g., to the left and up and then down and to the left) via a sixth interface movement device 2524P associated with sixth gaming device 2520F (see FIG. 25L).

Figure 25M:
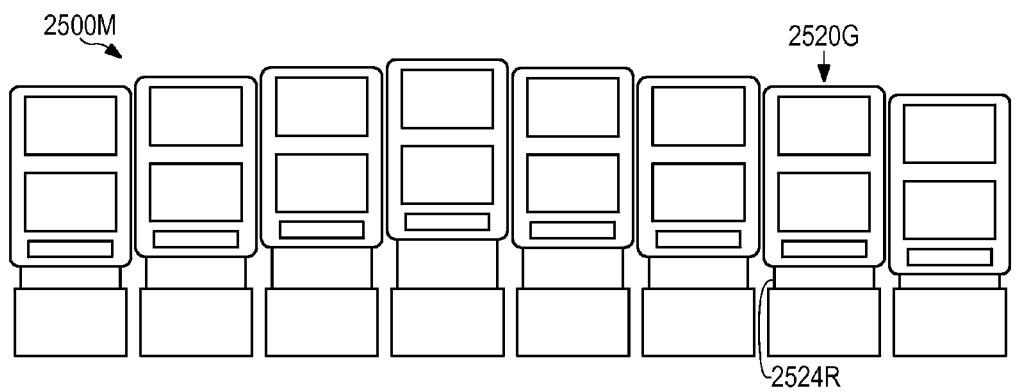
FIG. 25M is another illustration of an interface movement device, according to one embodiment.

In another example, at a time t=t7 (reference number 2548), there is a displacement of d1 (e.g., one displacement units) which is utilized on seventh gaming device 2520G which displaces, moves up, moves down, moves to the right, moves to the left, rotates, shifts, rocks, vibrates, and/or moves in a multi-directional movement patterns (e.g., to the left and up and then down and to the left) via a seventh interface movement device 2524R associated with seventh gaming device 2520G (see FIG. 25M).

Figure 25N:
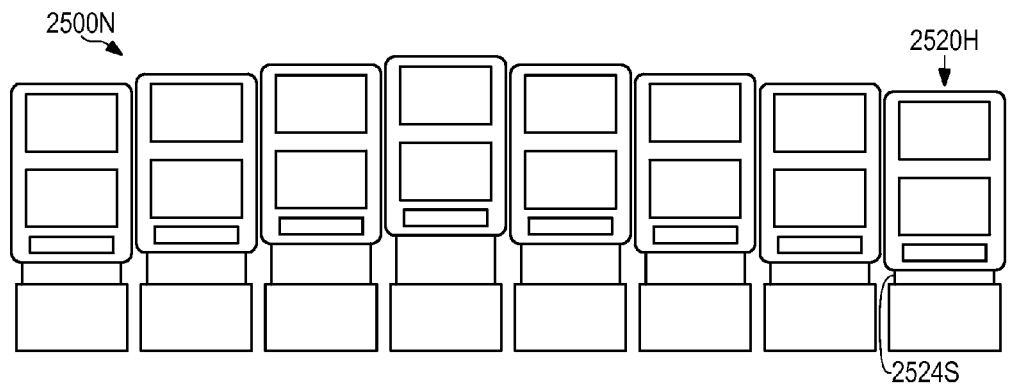
FIG. 25N is another illustration of an interface movement device, according to one embodiment.

In another example, at a time t=t8 (reference number 2550), there is a displacement of d0 (e.g., zero displacement units) which is utilized on Nth gaming device 2520H which displaces, moves up, moves down, moves to the right, moves to the left, rotates, shifts, rocks, vibrates, and/or moves in a multi-directionally movement patterns (e.g., to the left and up and then down and to the left) via an Nth interface movement device 2524S associated with Nth gaming device 2520H (see FIG. 25N). In one example, the movement pattern may be one unit to the right and 2.3 units up and then 3 units down and then 4 units up and then two units at a 30 degree angle to the upper left. There may be any number (e.g., 1 to N) of movement steps which utilize varying distances and varying angles and varying movement speeds.

Figure 25P:
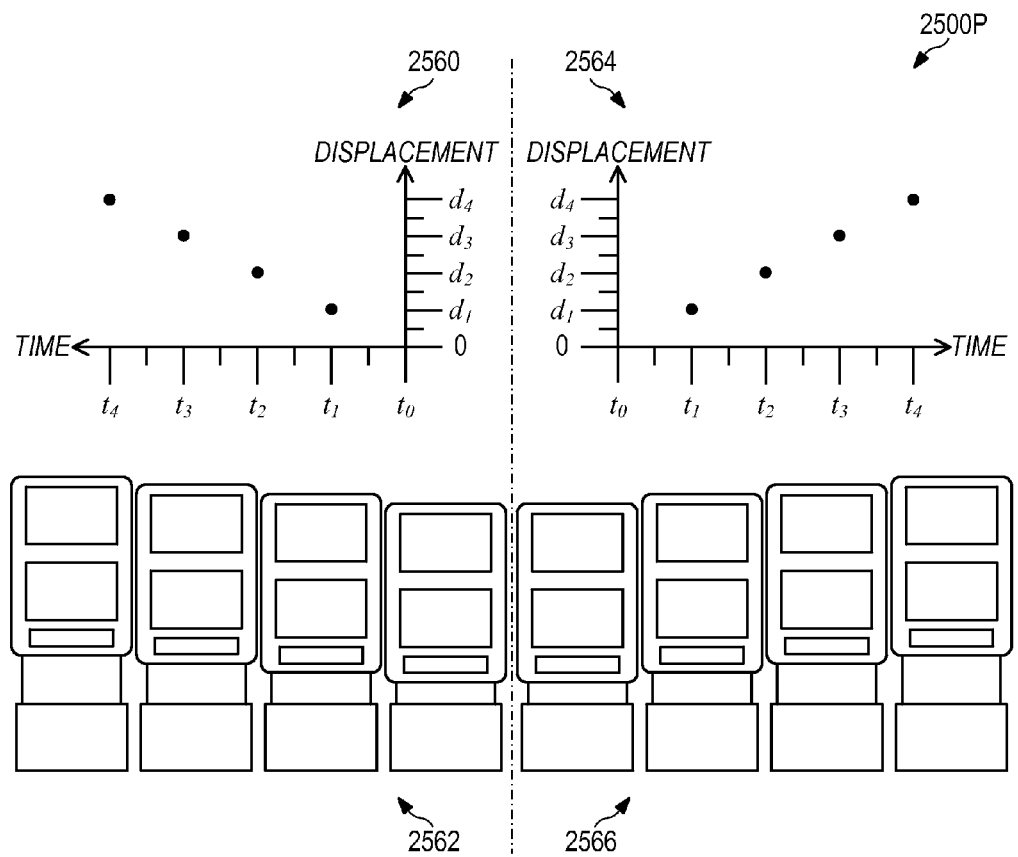
FIG. 25P is another illustration of an interface movement device, according to one embodiment.

In FIG. 25P, another illustration of an interface movement device is shown, according to one embodiment. In this example, a first displacement versus time pattern 2560 and a second displacement versus time pattern 2564 are shown. The first displacement versus time pattern 2560 is utilized for a first bank of games 2562 while the second displacement versus time pattern 2564 is utilized for a second bank of games 2566. In this example, the movement pattern is a mirror image of a wave pattern where the first bank of games 2562 and the second bank of games 2566 show a presentation where these banks of games are moving away from each other in a mirrored pattern.

In an alternative embodiment, at a time t=0, there is no displacement which may mean that the electronic gaming device (e.g., a first gaming device 2520A) is in a base, default, and/or initial position. In another example, at a time t=t1 (reference number 2536), there is a displacement of d1 (e.g., one displacement unit, which may equal 0.1 inches, 0.25 inches, 1 inch, 3 inches, 1 foot, etc.) which is utilized on first gaming device 2520A which displaces, moves up, moves down, moves to the right, moves to the left, rotates, shifts, rocks, vibrates, and/or moves in a multi-directional movement patterns via a first interface movement device 2524J associated with first gaming device 2520A. In another example, at a time t=t2 (reference number 2538), there is a displacement of d2 (e.g., two displacement units) which is utilized on first gaming device 2520A which displaces, moves up, moves down, moves to the right, moves to the left, rotates, shifts, rocks, vibrates, and/or moves in a multi-directional movement patterns via a first interface movement device 2524J associated with first gaming device 2520A. In another example, at a time t=t3 (reference number 2540), there is a displacement of d3 (e.g., three displacement units) which is utilized on first gaming device 2520A which displaces, moves up, moves down, moves to the right, moves to the left, rotates, shifts, rocks, vibrates, and/or moves in a multi-directional movement patterns via a first interface movement device 2524J associated with first gaming device 2520A. In another example, at a time t=t4 (reference number 2542), there is a displacement of d4 (e.g., four displacement units) which is utilized on first gaming device 2520A which displaces, moves up, moves down, moves to the right, moves to the left, rotates, shifts, rocks, vibrates, and/or moves in a multi-directional movement patterns via a first interface movement device 2524J associated with first gaming device 2520A. In another example, at a time t=t5 (reference number 2544), there is a displacement of d3 (e.g., three displacement units) which is utilized on first gaming device 2520A which displaces, moves up, moves down, moves to the right, moves to the left, rotates, shifts, rocks, vibrates, and/or moves in a multi-directional movement patterns via a first interface movement device 2524J associated with first gaming device 2520A. In another example, at a time t=t6 (reference number 2546), there is a displacement of d2 (e.g., two displacement units) which is utilized on first gaming device 2520A which displaces, moves up, moves down, moves to the right, moves to the left, rotates, shifts, rocks, vibrates, and/or moves in a multi-directional movement patterns via a first interface movement device 2524J associated with first gaming device 2520A. In another example, at a time t=t7 (reference number 2548), there is a displacement of d1 (e.g., one displacement units) which is utilized on first gaming device 2520A which displaces, moves up, moves down, moves to the right, moves to the left, rotates, shifts, rocks, vibrates, and/or moves in a multi-directional movement patterns via a first interface movement device 2524J associated with first gaming device 2520A. In another example, at a time t=t8 (reference number 2550), there is a displacement of d0 (e.g., zero displacement units) which is utilized on first gaming device 2520A which displaces, moves up, moves down, moves to the right, moves to the left, rotates, shifts, rocks, vibrates, and/or moves in a multi-directional movement patterns via a first interface movement device 2524J associated with first gaming device 2520A. In various examples, any number of gaming devices (e.g., 1 to N) may be utilized and tied to one or more displacement/time data (e.g., 1 to N). Further, a first gaming device may be tied to 1 to N displacement/time data for a first instance while first gaming device may be tied to 1 to N−1 displacement/time data for a second instance. In addition, one, a few, a plurality, and/or up to an Nth gaming device may be tied to any displacement/time data (e.g., 1 to N). In various examples, one, a few, a plurality, and/or up to an Nth displacement/time data may be utilized.

In another example, if a player is playing on a gaming device which was going to be utilized for a presentation (e.g., attraction mode, etc.), then this gaming machine is skipped and/or removed from the presentation. In addition, the presentation may be modified to minimize any interruption of game play. For example, if a player was playing on the 2520E game from FIG. 25K, this fifth gaming machine 2520E may be skipped and/or the presentation may be modified (e.g., the fifth gaming machine does not move but has audio and video presentations).

Figure 26A:
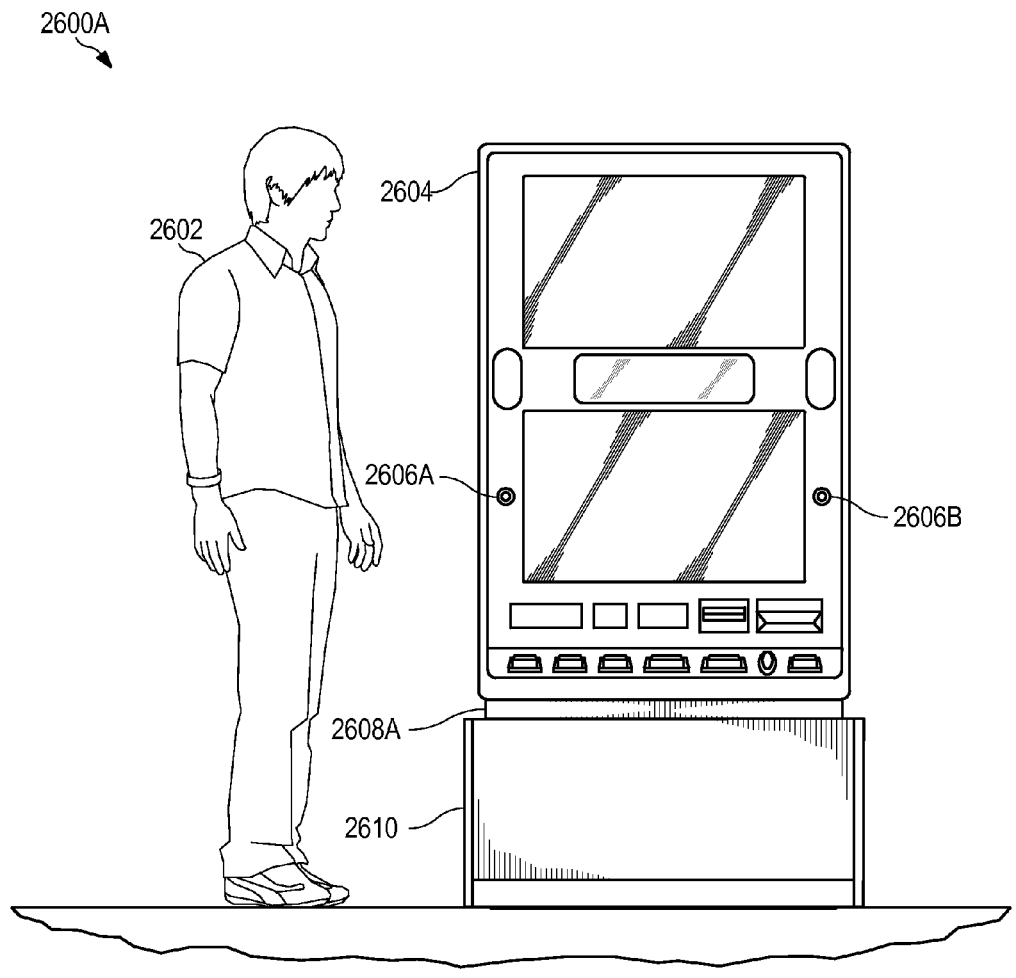
FIG. 26A is another illustration of an interface movement device, according to one embodiment.

In FIG. 26A, another illustration of an interface movement device is shown, according to one embodiment. In this example, a player 2602 may be in proximity to gaming device which includes a cabinet 2604 (which includes a first sensor 2606A and a second sensor 2606B), a movement interface 2608A, and a pedestal 2610. In this example, the movement interface 2608A is in a first position.

Figure 26B:
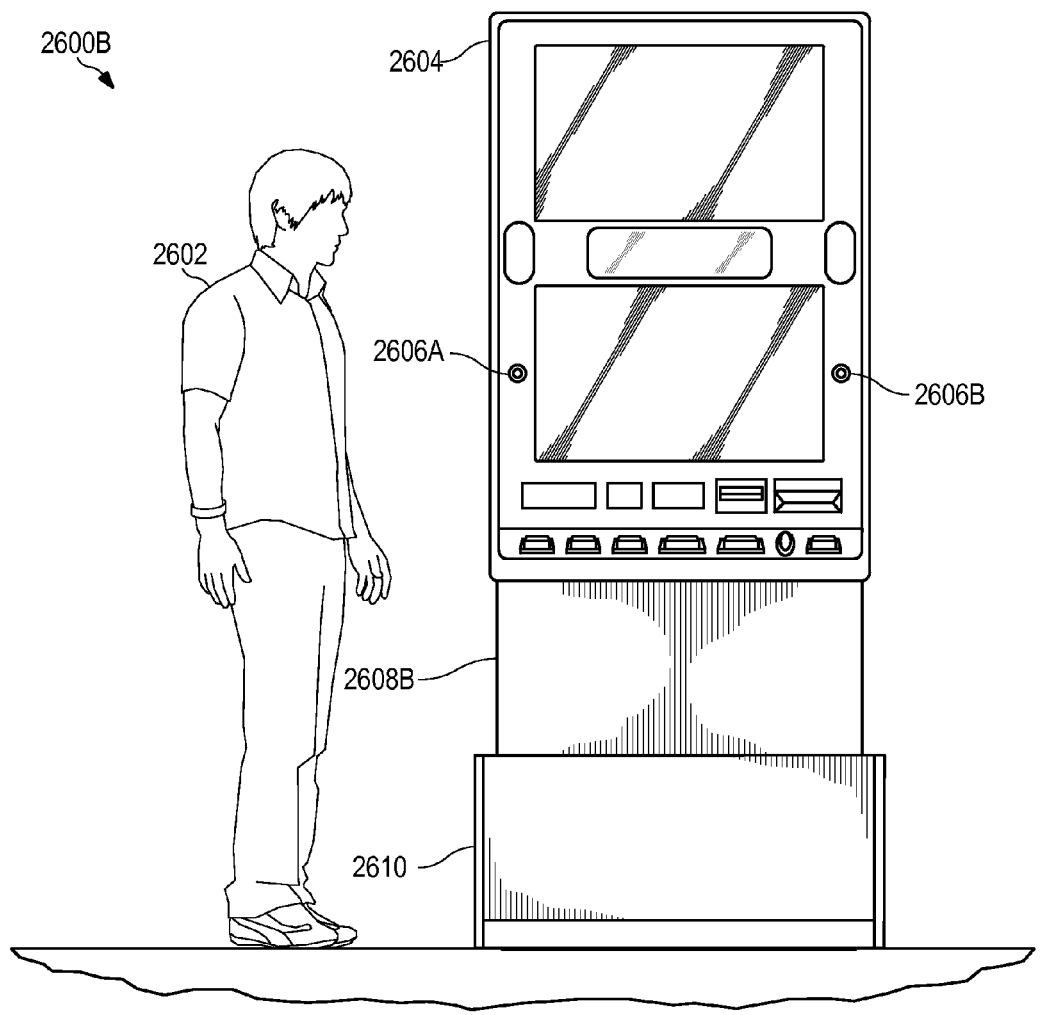
FIG. 26B is another illustration of an interface movement device, according to one embodiment.

In FIG. 26B, another illustration of an interface movement device is shown, according to one embodiment. In one example, the gaming device may be moved by movement interface 2608A and moved to a second position 2608B based on one or more player characteristics obtained via a first sensor 2606A and a second sensor 2606B. The one or more player characteristics may be a player's height, a player's weight, a player's built, a player's age, a player's personal property (e.g., eye glasses), a player's line of sight, a spectator's line of sight, any other physical characteristics, and/or any combination thereof.

Figure 26C:
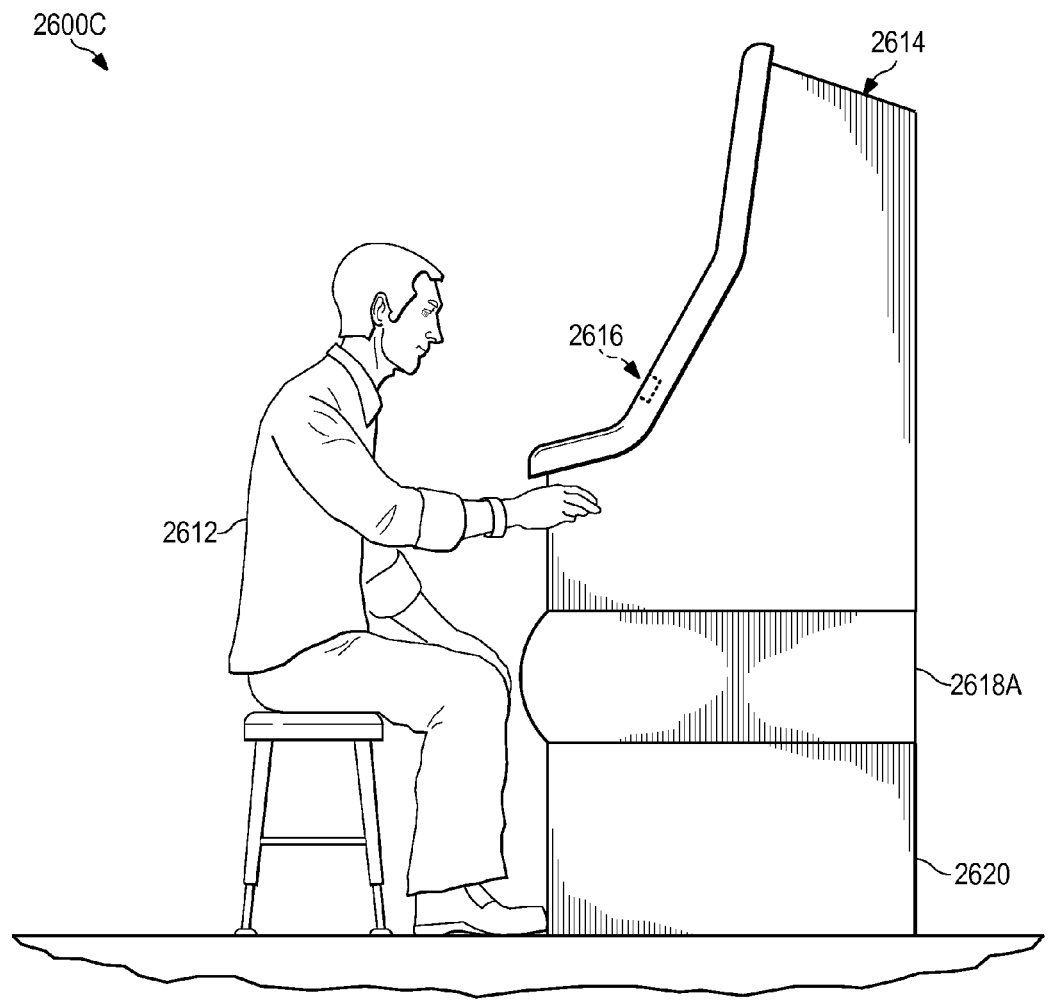
FIG. 26C is another illustration of an interface movement device, according to one embodiment.

In FIG. 26C, another illustration of an interface movement device is shown, according to one embodiment. In one example, the electronic gaming device may include a cabinet 2614 and a pedestal 2620 where the interface movement device 2618A repositions the cabinet 2614 and/or the pedestal 2620 based on one or more psychical characteristics obtain via the sensor array 2616. In this example, the player was initially standing and the cabinet height was at a first position. Once the player 2612 sat on the chair, the gaming device lowered the cabinet 2614 via the interface movement device 2618A.

Figure 26D:
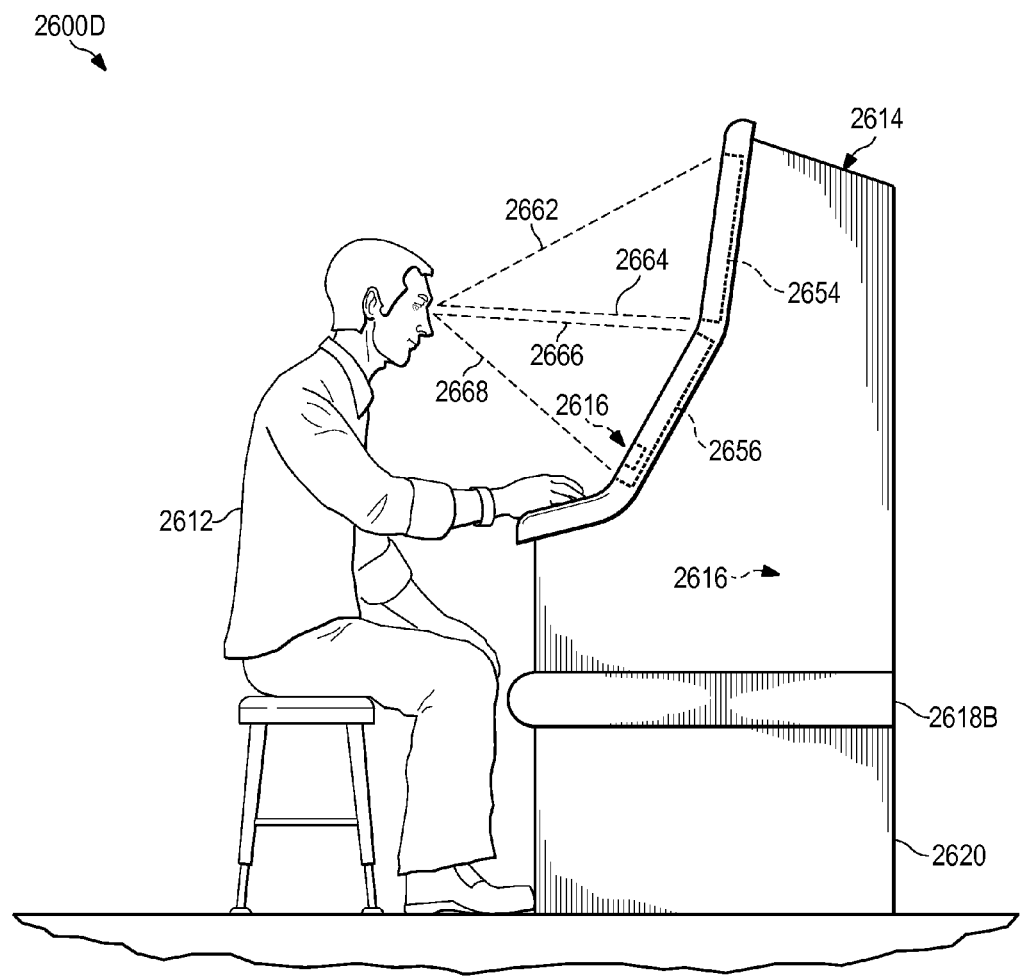
FIG. 26D is another illustration of an interface movement device, according to one embodiment.

In FIG. 26D, another illustration of an interface movement device is shown, according to one embodiment. In one example, player 2612 may be positioned in a seat. Based on one or more player characteristics (e.g., player's first sight line—reference numbers 2662 and 2664—second sight line—reference numbers 2666 and 2668), the gaming device may move the cabinet, the pedestal, and/or one or more interface movement devices (e.g., 2618B) to obtain an optimal and/or better sight lines for player 2612.

Figure 27A:
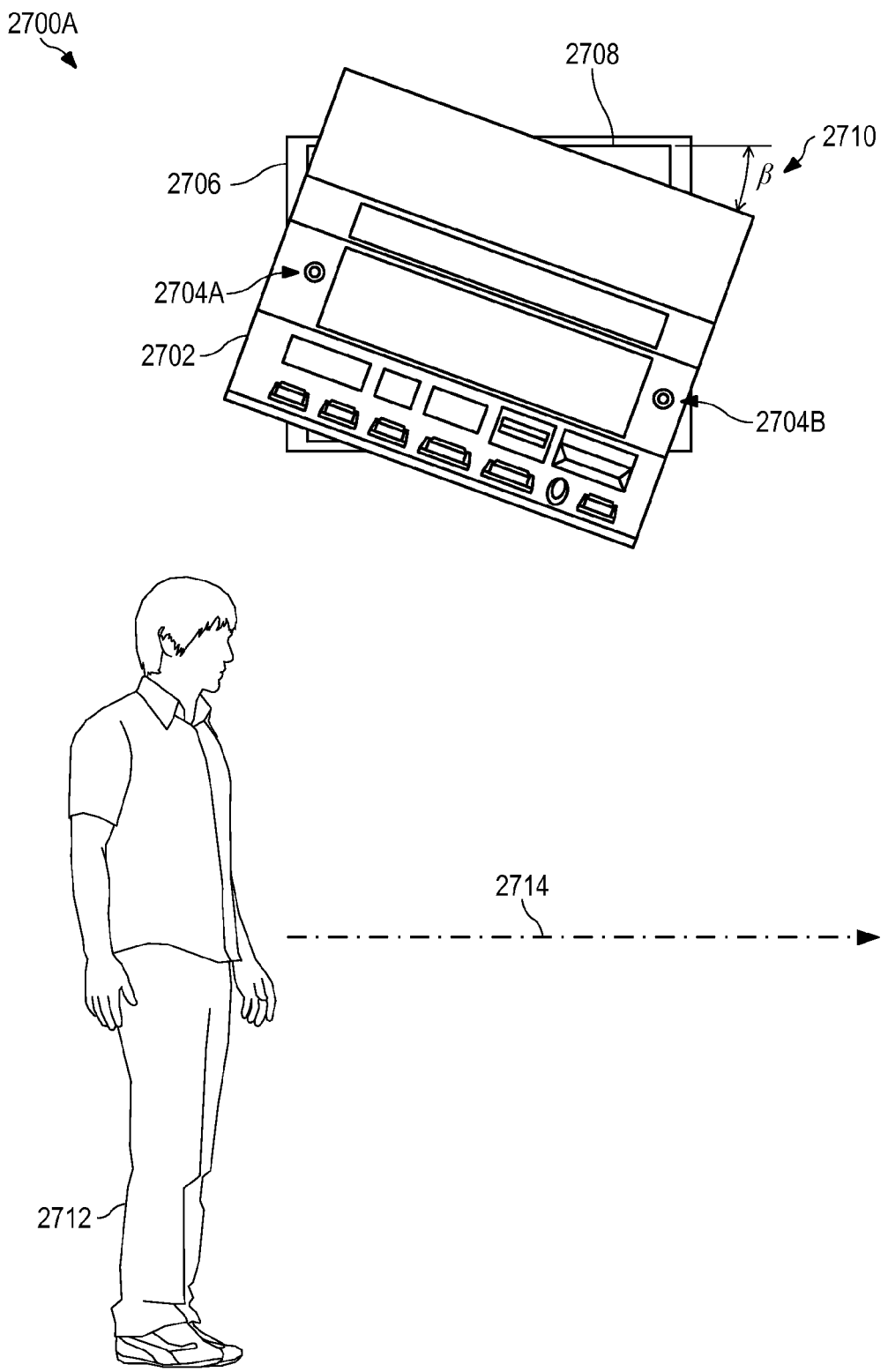
FIG. 27A is another illustration of an interface movement device, according to one embodiment.

In FIG. 27A, another illustration of an interface movement device is shown, according to one embodiment. In one example, the gaming device 2700A may include a back support 2706, a movement interface device 2708, and a display device 2702 (and/or a cabinet). In this example, a first sensor 2704A and a second sensor 2704B may be positioned on the gaming device, the display device 2702, the cabinet, an interface movement device, and/or the pedestal. Further, display device 2702 may be moved by a first angle 2710 (and/or any angle) and/or moved in any direction (e.g., left, right, up, down, backward, and/or forward). In this example, as a potential player moves in a first path 2714, electronic gaming device may initiate an attraction mode. In the attraction mode, the gaming device may generate one or more presentations (e.g., audio and/or video and/or movement presentations) to get the player to play gaming device. The display device 2702 may position itself to face the player 2712 in a first position.

Figure 27B:
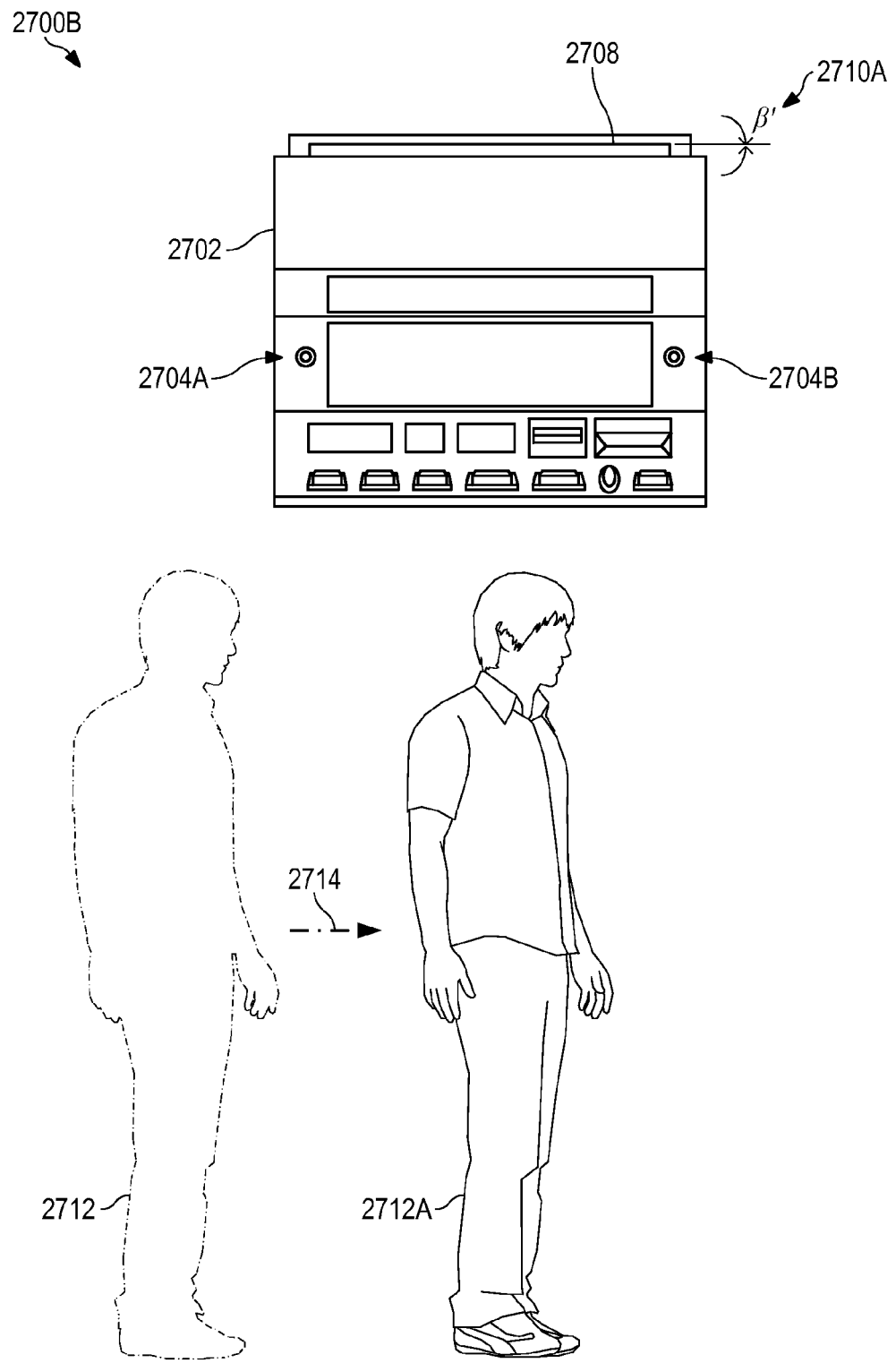
FIG. 27B is another illustration of an interface movement device, according to one embodiment.

In FIG. 27B, another illustration of an interface movement device is shown, according to one embodiment. In one example, once the player moves from a first position to a second position 2712A along the first path 2714, the display device 2702 may be positioned to align display device 2702 with the player 2712 in second position 2712A.

Figure 27C:
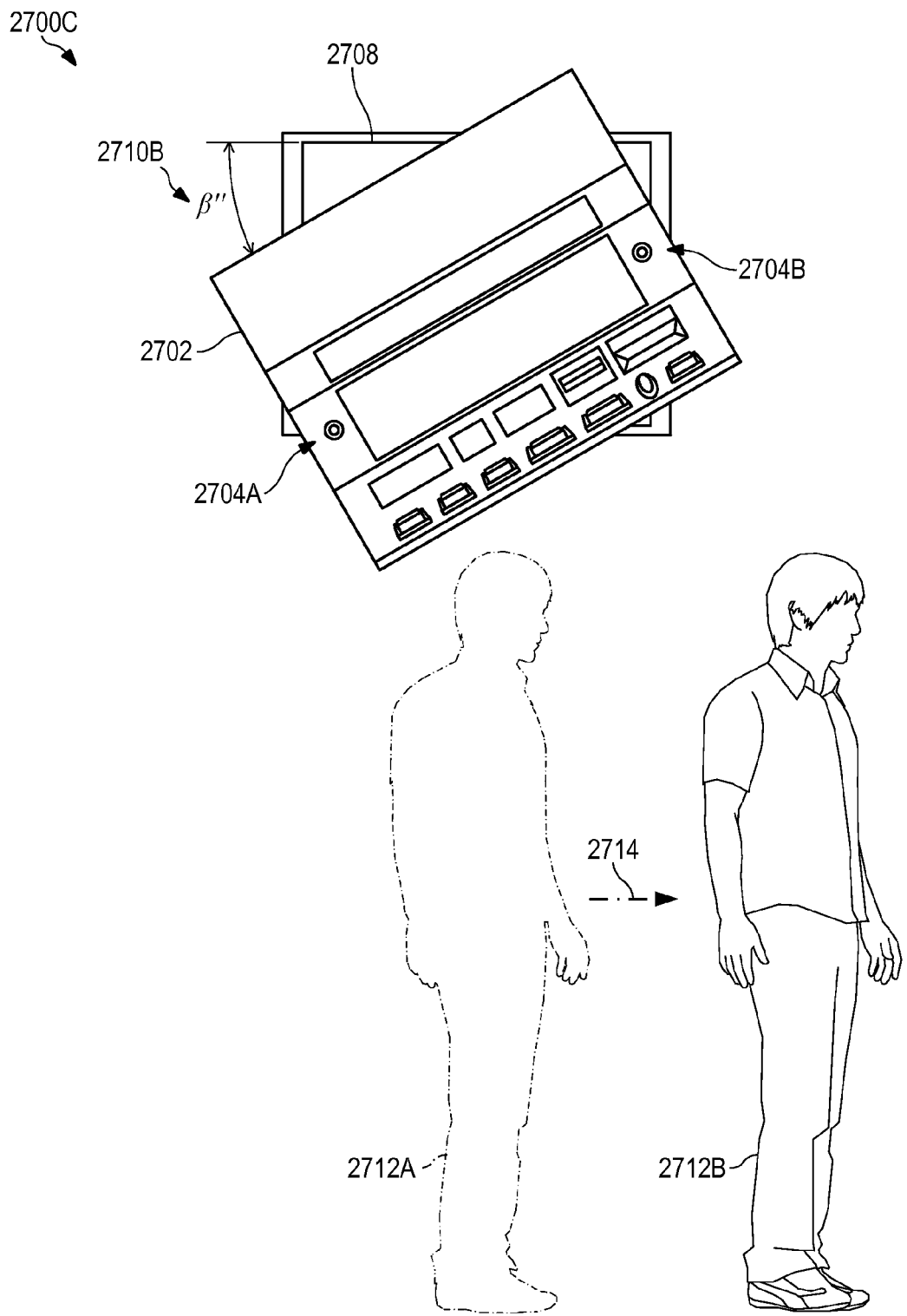
FIG. 27C is another illustration of an interface movement device, according to one embodiment.

In FIG. 27C, another illustration of an interface movement device is shown, according to one embodiment. In one example, once the player moves from second position 2712A to a third position 2712B along the first path 2714, the display device 2702 may be positioned to align display device 2702 with the player 2712 in third position 2712B.

Figure 28A:
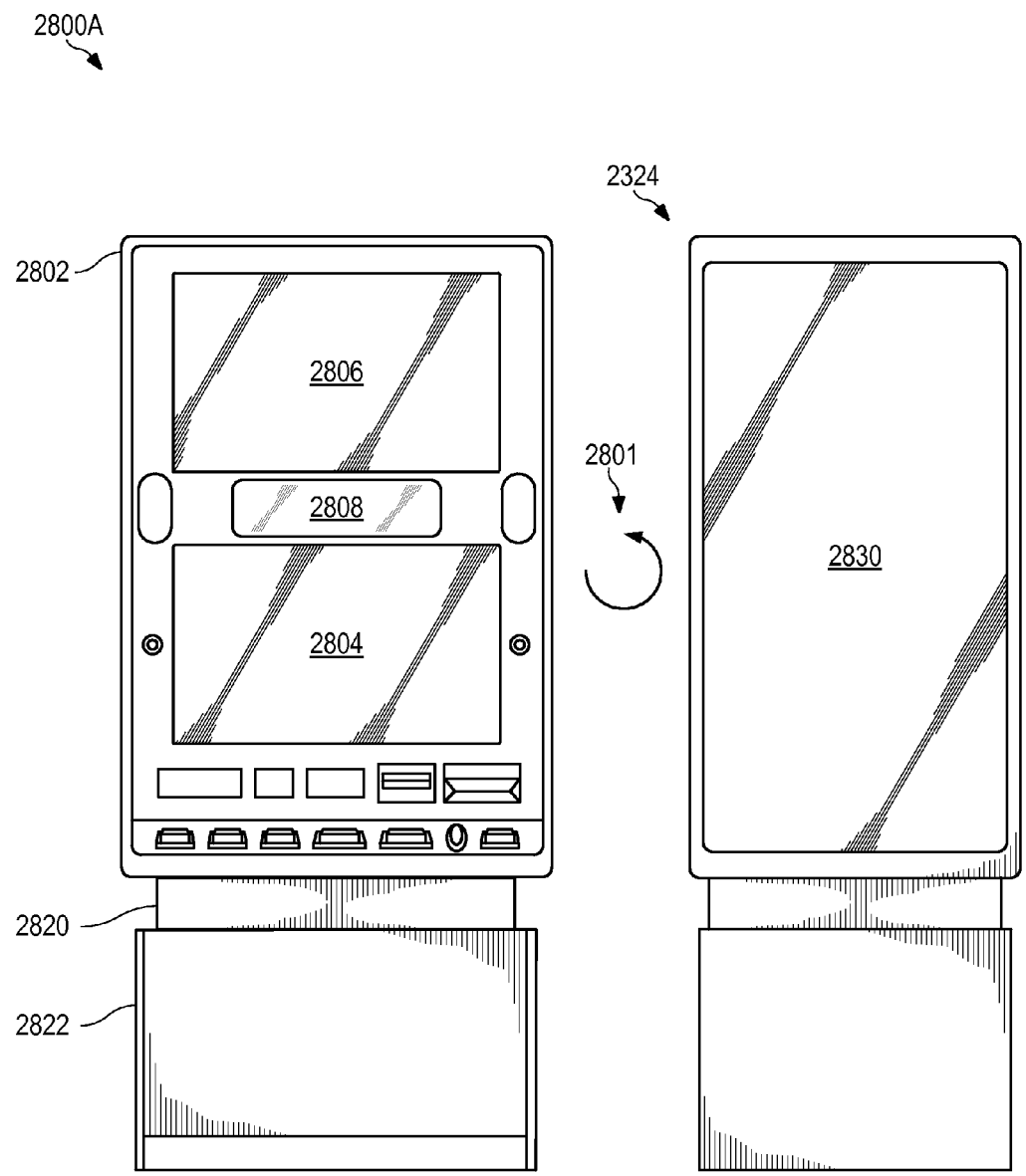
FIG. 28A is another illustration of an interface movement device, according to one embodiment.
Figure 28B:
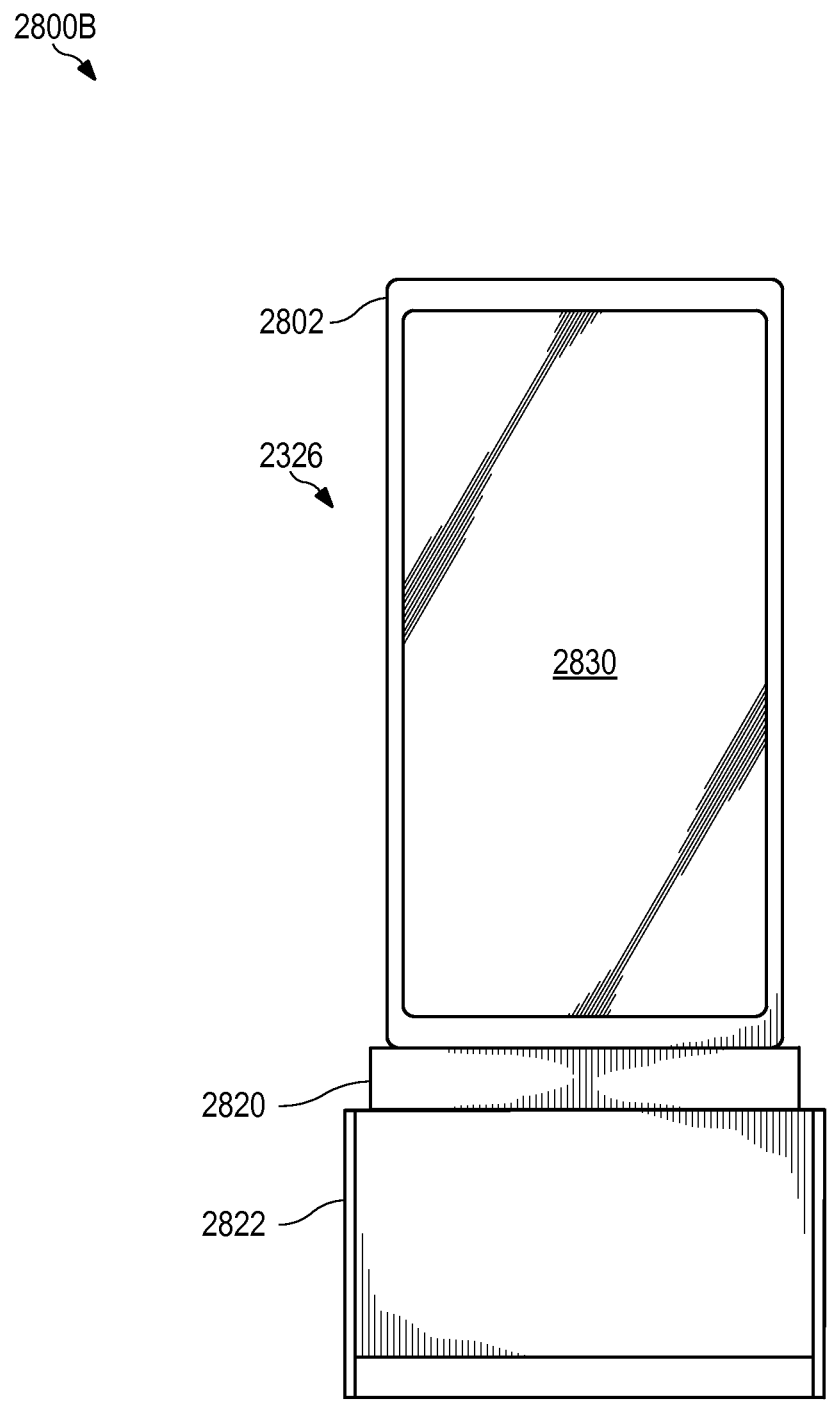
FIG. 28B is another illustration of an interface movement device, according to one embodiment.

In FIG. 28A, another illustration of an interface movement device is shown, according to one embodiment. In one example, the gaming device 2800A may include a cabinet 2802, a movement interface device 2820, and a pedestal 2822. The gaming device 2800A may include a first display area 2804, a second display area 2806, and a third display area 2808 which may be utilized for a first game play type. In one example, once a triggering event occurs a rotation procedure 2801 occurs which rotates the gaming device from a first exterior area (e.g., first display area 2804, second display area 2806, and third display area 2808) to a second exterior area (e.g., a fourth display area 2830) where second exterior area 2830 is utilized for a second game play type (see FIG. 28B). For example, a first type of game play (e.g., base game) which utilizes a pirate theme may be played on the first exterior area but a second type of game play (e.g., bonus game) may be played on the second exterior area. In this example, the bonus game may be a treasure hunt. Further, the base game may be video reel where the bonus game is mechanical reels.

Figure 29A:
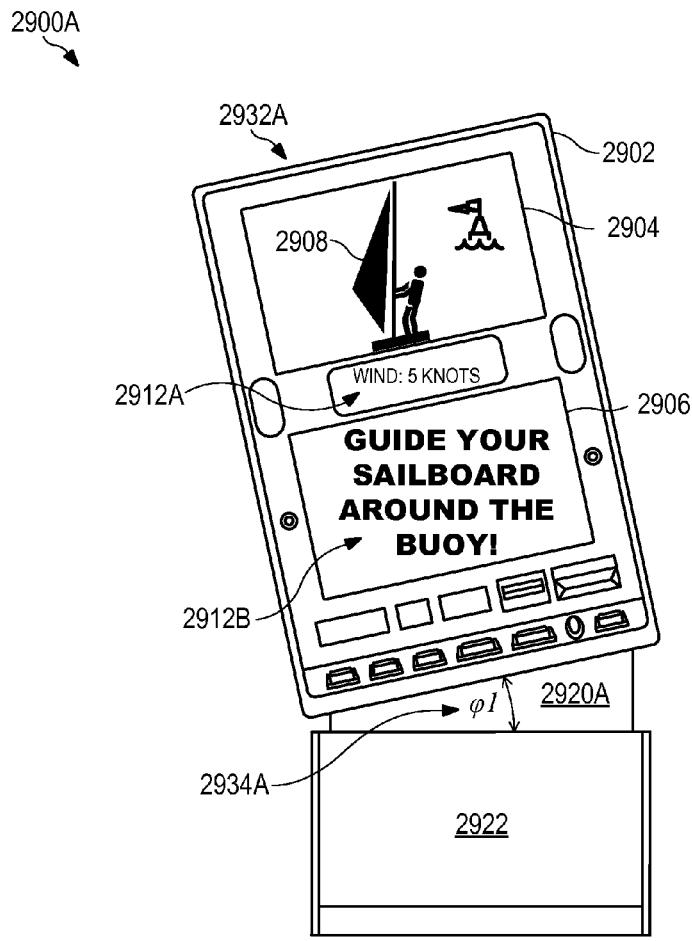
FIG. 29A is another illustration of an interface movement device, according to one embodiment.

In FIG. 29A, another illustration of an interface movement device is shown, according to one embodiment. In one example, an electronic gaming device 2900A may include a cabinet 2902, an interface 2920, and a pedestal 2922. In one example, cabinet 2902 may be moved into a first position 2932A and have a first angle 2934A relative to pedestal 2922 via a movement of the interface 2920A. Further, a first display area 2904 may include one or more images 2908. In addition, a second display area 2906 may include a first message 2912B while a third display area may include a second message 2912A. In this example, one or more images 2908 may move based on the movement (and/or path taken by) of cabinet 2902 to first position 2932A.

Figures 29B, 29C:
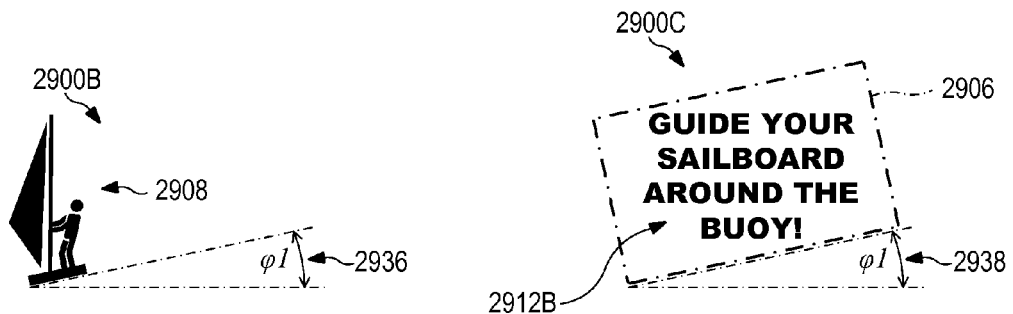
FIG. 29B is another illustration of an interface movement device, according to one embodiment.
FIG. 29C is another illustration of an interface movement device, according to one embodiment.

In FIG. 29B, another illustration of an interface movement device is shown, according to one embodiment. In this example, a first image 2908 moves with and/or in synchronized motion with cabinet 2902. In this example, a first angle 2934A may be the same as image angle 2936. In another example, image angle 2936 may not be identical to but may be related to first angle 2934A of the cabinet, interface movement device, and/or pedestal.

In FIG. 29C, another illustration of an interface movement device is shown, according to one embodiment. In this example, second display area 2906 may shift by a second display area angle 2938 whereas second message 2912B may be shifted so that the text rotates to be easily read by the player.

In FIG. 29D, another illustration of an interface movement device is shown, according to one embodiment. In another example, an electronic gaming device 2900D may include cabinet 2902, interface 2920, and pedestal 2922. In one example, cabinet 2902 may be moved into a second position 2932B and have a second angle 2934B relative to pedestal 2922 via a movement of the interface 2920B. Further, first display area 2904 may include one or more images 2910. In addition, second display area 2906 may include a first message 2912C while a third display area may include a second message 2912D. In this example, one or more images 2910 may move based on the movement (and/or path taken by) of cabinet 2902 to second position 2932B.

In FIG. 29E, another illustration of an interface movement device is shown, according to one embodiment. In this example, a first image 2910 moves with and/or in synchronized motion with cabinet 2902. In this example, a first angle 2934B may be the same as image angle 2940. In another example, image angle 2940 may not be identical to but may be related to first angle 2934B of the cabinet, interface movement device, and/or pedestal.

In FIG. 29F, another illustration of an interface movement device is shown, according to one embodiment. In this example, second display area 2906 may shift by a second display area angle 2942 whereas second message 2912D may be shifted so that the text rotates to be easily read by the player. In these examples, the cabinet, interface movement device, and/or pedestal may move in a pattern based on a game theme and/or player input. For example, one or more devices may rock back and forward for a ship theme. In another example, the one or more devices may go up and down for a plane theme. In another example, the one or more devices may shift with the player in a combat themed game play. Further, the one or more devices may shake based on an earthquake themed game play. The one or more devices may climb based on a climbing themed game play.

Figure 30A:
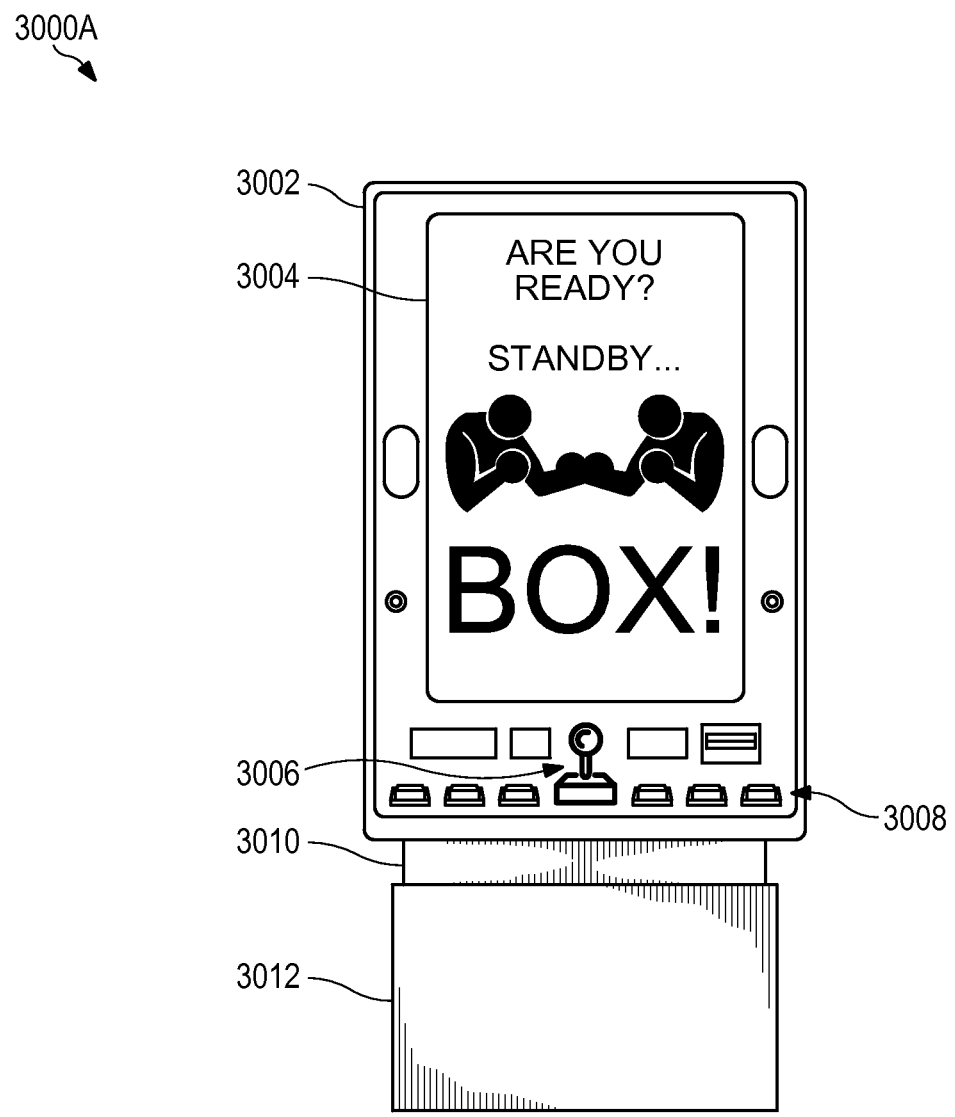
FIG. 30A is another illustration of an interface movement device, according to one embodiment.

In FIG. 30A, another illustration of an interface movement device is shown, according to one embodiment. In this example, a gaming device 3000A may include a cabinet 3002, a display area 3004, a control stick 3006, one or more input devices 3008, a movement interface device 3010, and a pedestal 3012.

Figure 30B:
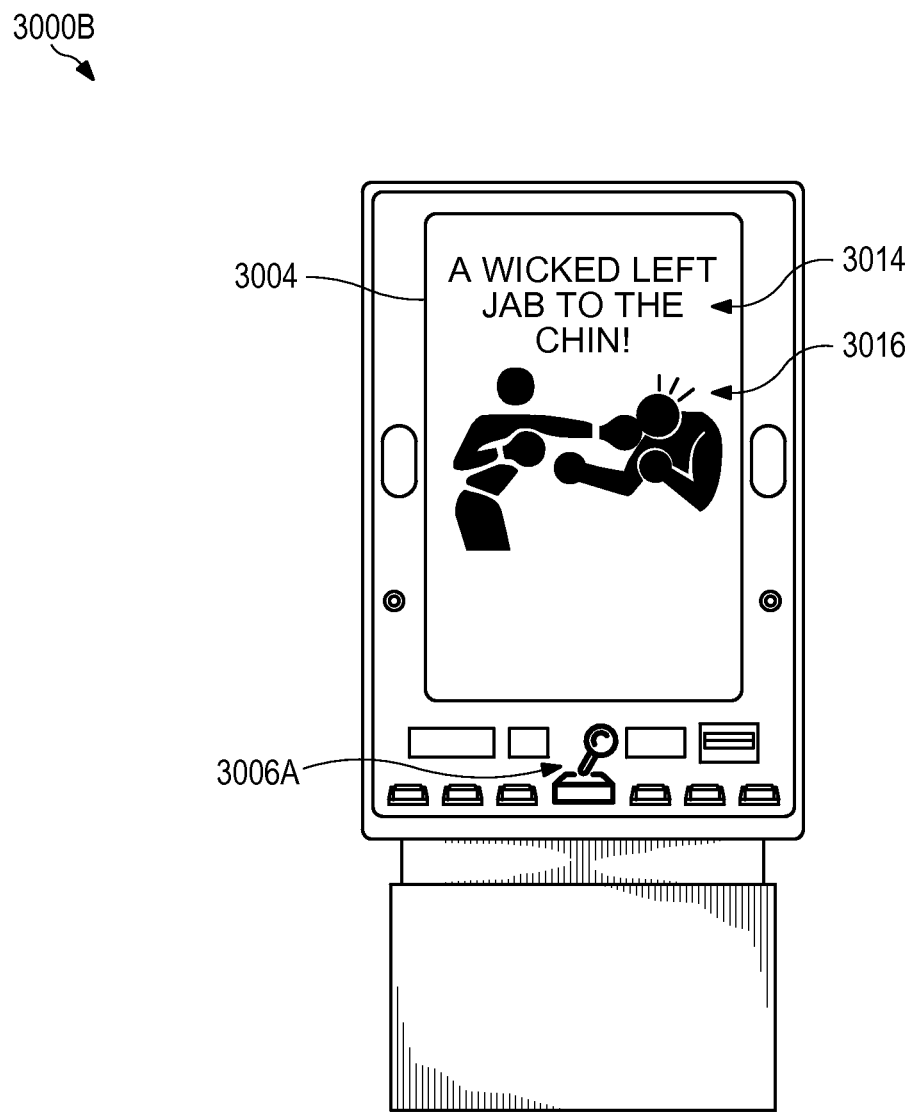
FIG. 30B is another illustration of an interface movement device, according to one embodiment.
Figure 30C:
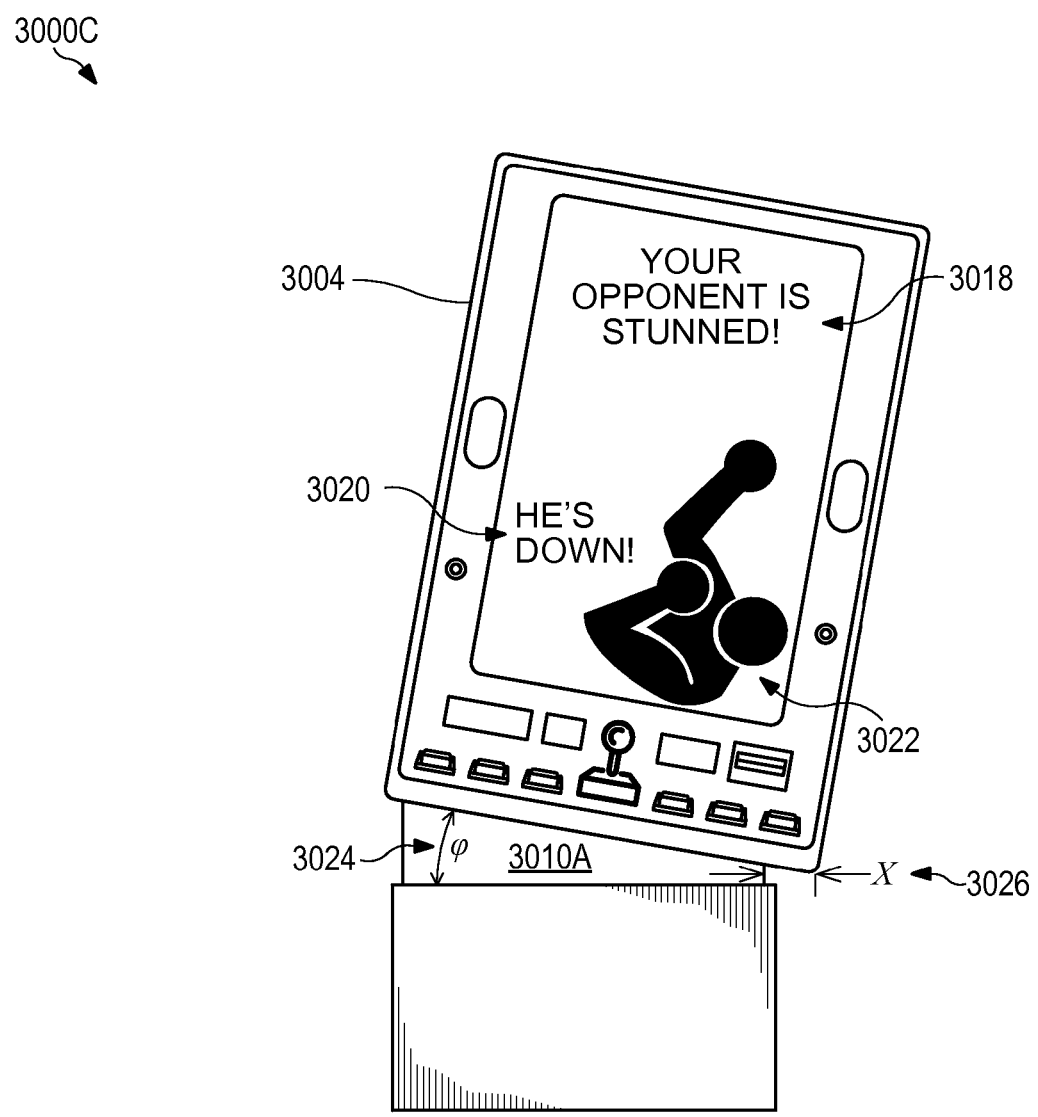
FIG. 30C is another illustration of an interface movement device, according to one embodiment.

In FIG. 30B, another illustration of an interface movement device is shown, according to one embodiment. In this example, the player may move control stick into a first position 3006A which controls an image on the screen (e.g., boxer—"a wicked left jab to the chin!). Based on the player knocking down the opponent (e.g., image 3022), the cabinet moves to the left and simulates that the opponent has been knocked down (see FIG. 30C). A first message 3018 and a second message may state "YOUR OPPONENT IS STUNNED! . . . HE'S DOWN!"

Figure 31A:
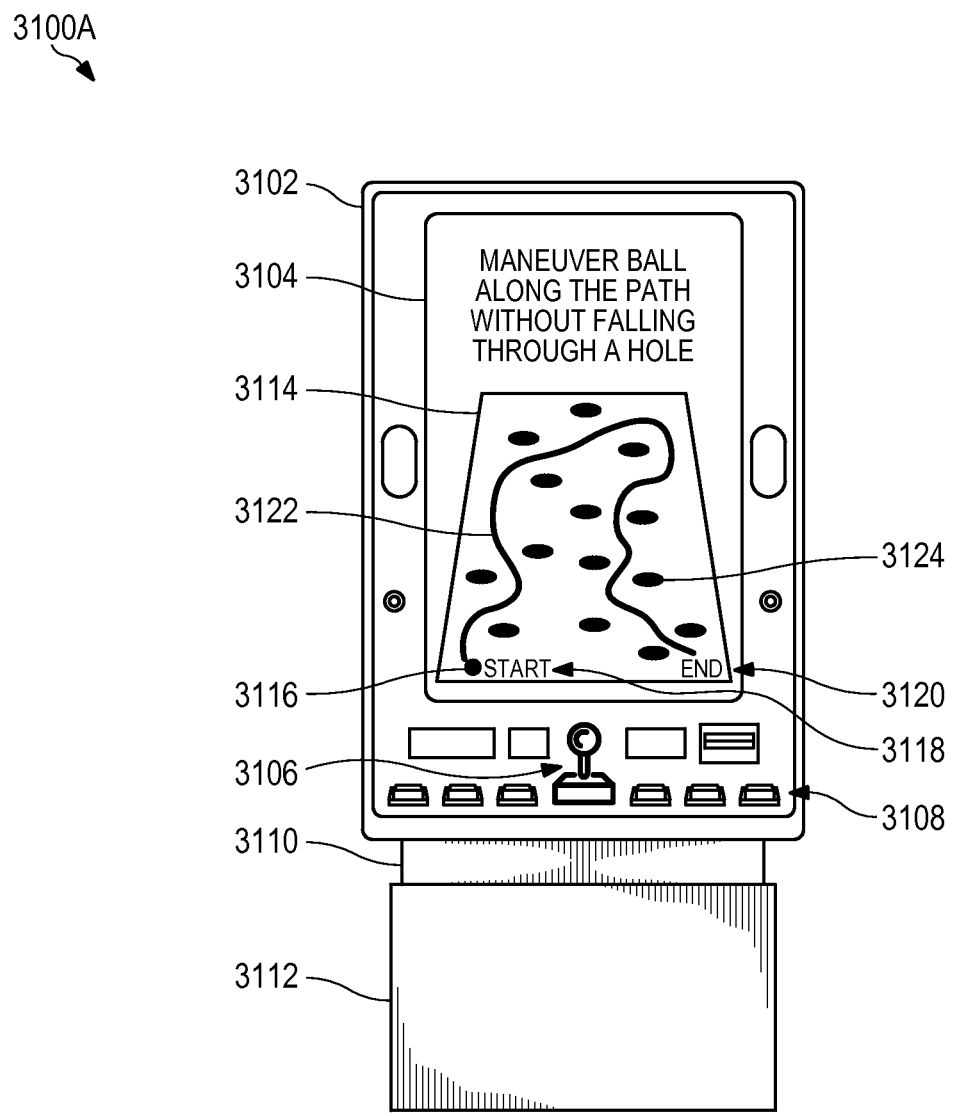
FIG. 31A is another illustration of an interface movement device, according to one embodiment.

In FIG. 31A, another illustration of an interface movement device is shown, according to one embodiment. In this example, a skill game and/or semi-skilled game may be initiated which moves a cabinet in sync with game play. In this example, a player is required to maneuver a ball along the path without falling through a hole. In this example, a game board 3114 may include a winning path, one or more holes 3124, a starting position 3116, and an ending position 3120. Further, gaming device may include a cabinet 3102, a display area 3104, a joy stick 3106, one or more input devices 3108, one or more movement interfaces 3110, and a pedestal 3112.

Figure 31B:
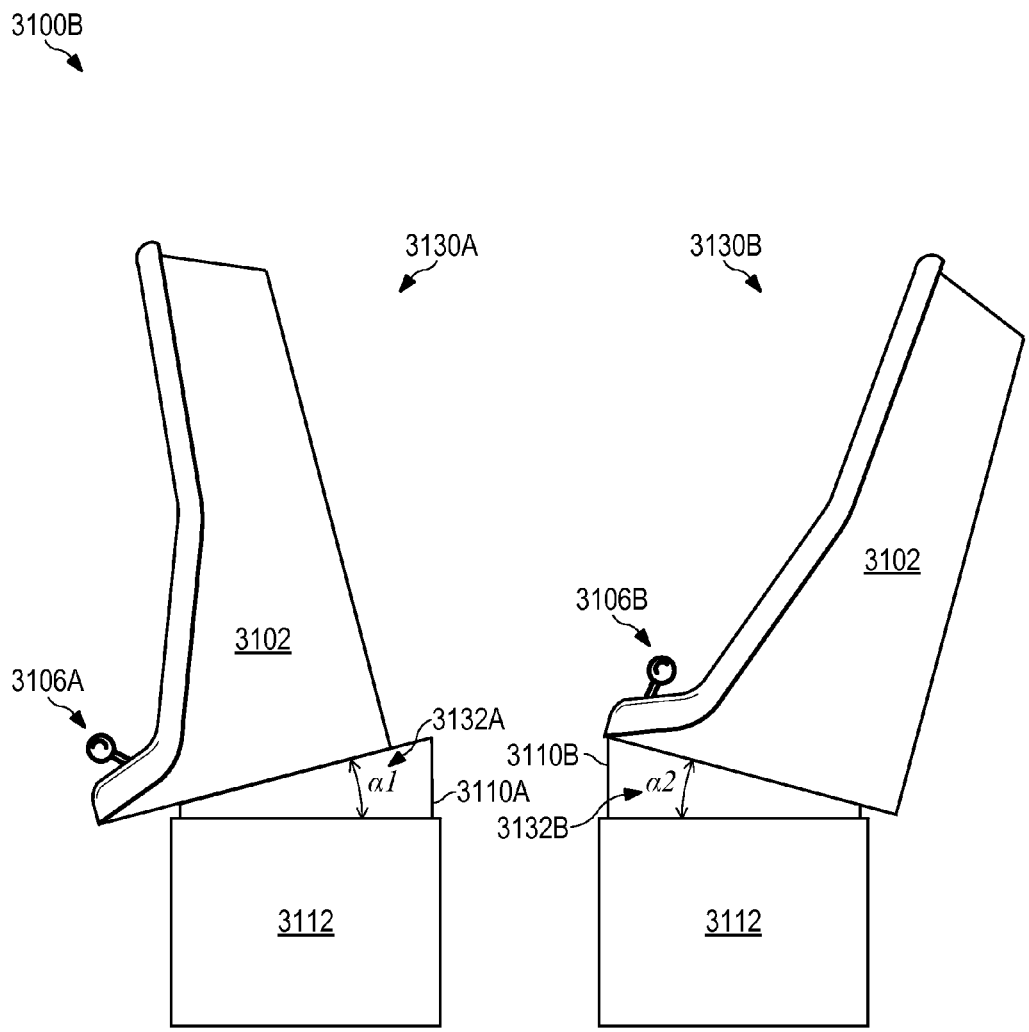
FIG. 31B is another illustration of an interface movement device, according to one embodiment.

In FIG. 31B, another illustration of an interface movement device is shown, according to one embodiment. In one example, a player may move a joy stick to a first position 3106A which moves cabinet 3102 to a first position 3130A via movement devices to a first angle 3132A via a movement interface position 3110A relative to pedestal 3112. Further, a player may move a joy stick to a second position 3106B which moves cabinet 3102 to a second position 3130B via movement devices to a second angle 3132B via a movement interface position 3110B relative to pedestal 3112.

Figure 31C:
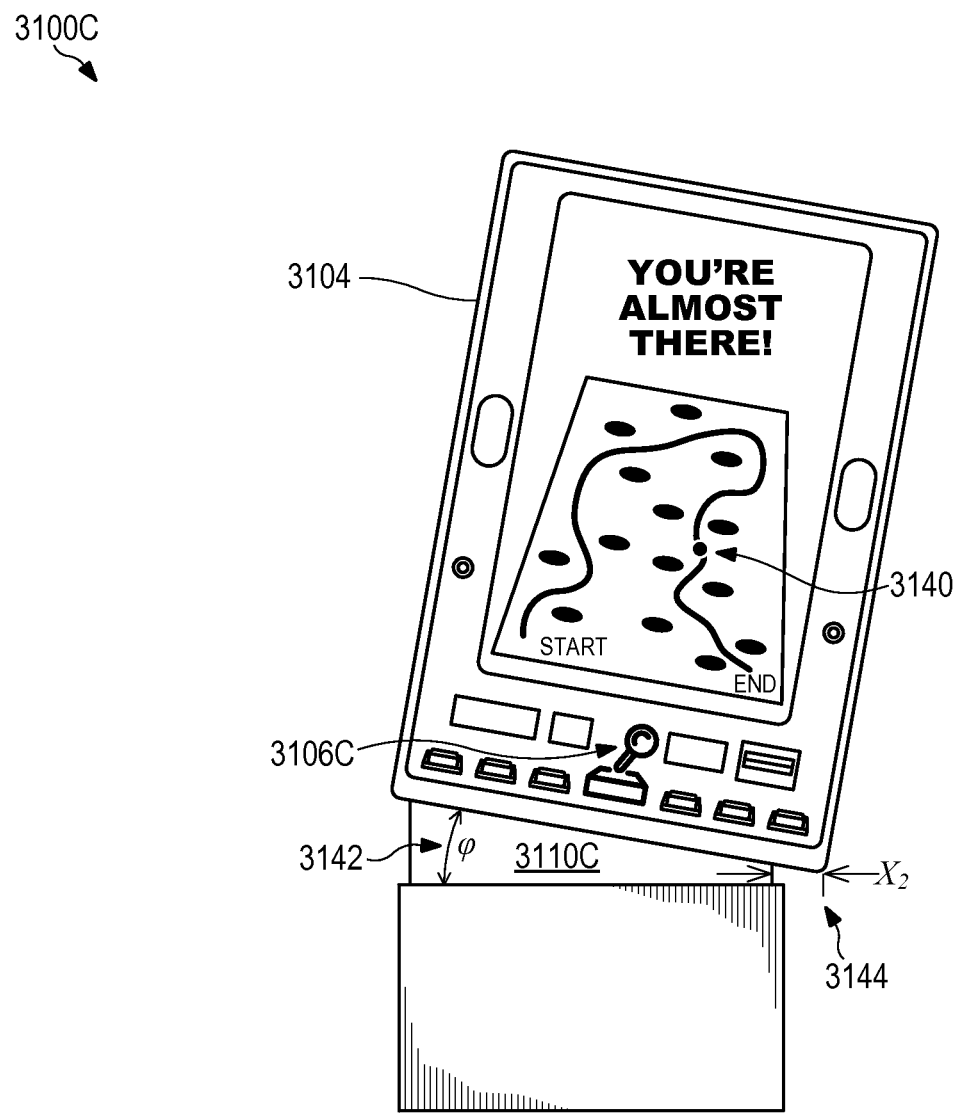
FIG. 31C is another illustration of an interface movement device, according to one embodiment.

In FIG. 31C, another illustration of an interface movement device is shown, according to one embodiment. In this example, the player moves joy stick to various positions (e.g., 3106A, 3106B, 3106C, etc.) to move a ball 3140 around game board 3114 while cabinet 3104 moves (e.g., various positions and/or various angles, etc.) based on the joy stick movements.

Figure 32:
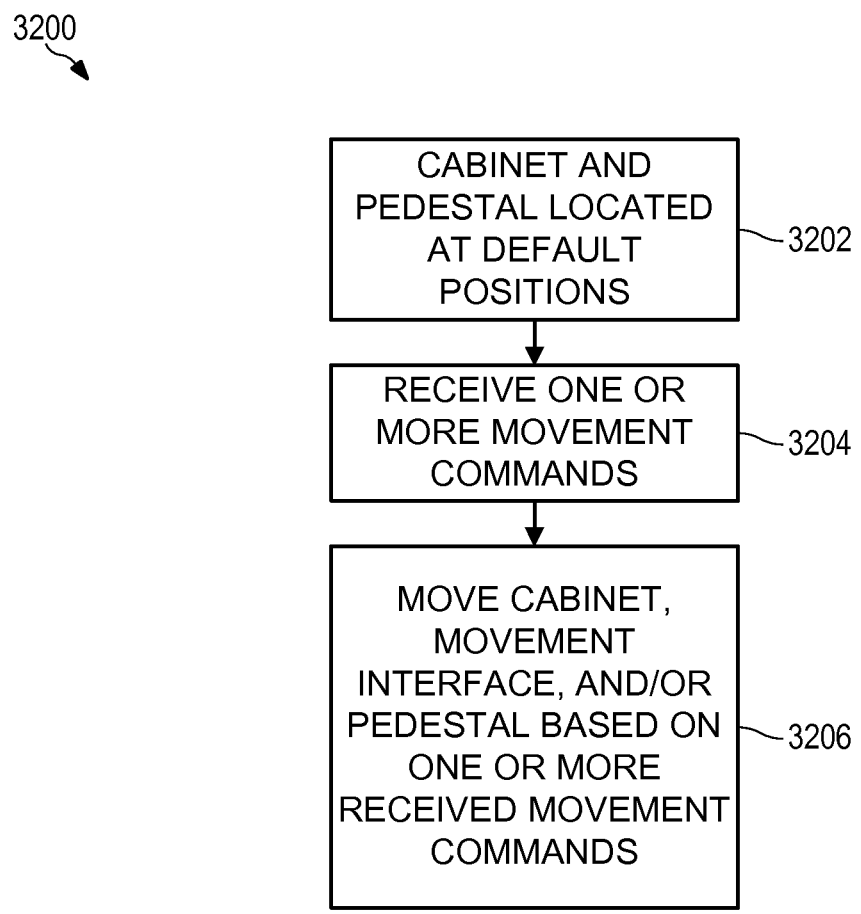
FIG. 32 is a flow diagram of game play, according to one embodiment.

In FIG. 32, a flow diagram of game play is shown, according to one embodiment. The method may include the cabinet and/or the pedestal being located in a default position (step 3202). The method may include one or more processors receiving one or more movement commands (step 3204). The method may include moving the cabinet, the movement interface, and/or the pedestal based on the one or more received movement commands (step 3206). In one example, the received movement commands are based on a game theme. In this example, the building may be collapsing in a game play which sends commands to shake one or more gaming devices. In another example, the received commands are based on a player's input. In this case, the player's input may be to move to the right to avoid a punch which corresponds to one or more gaming devices moving to the right.

Figure 33:
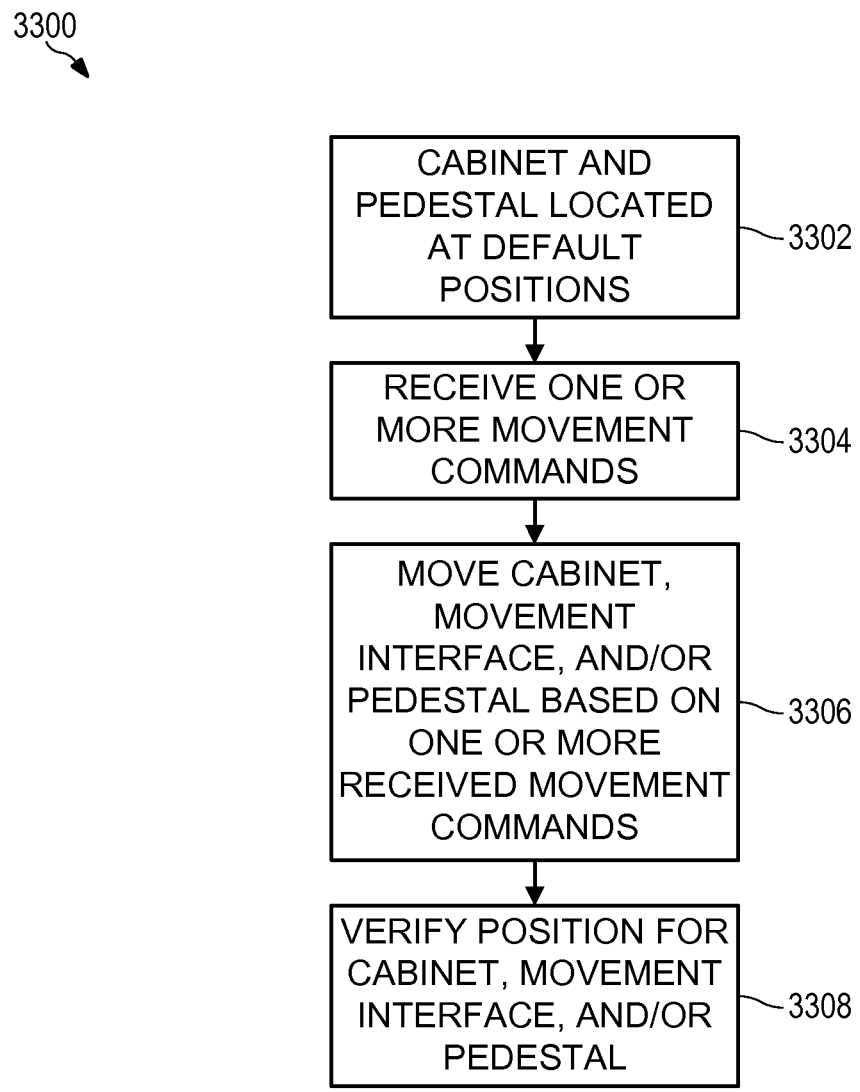
FIG. 33 is a flow diagram of game play, according to one embodiment.

In FIG. 33, a flow diagram of game play is shown, according to one embodiment. The method may include the cabinet and/or the pedestal being located in a default position (step 3302). The method may include one or more processors receiving one or more movement commands (step 3304). The method may include moving the cabinet, the movement interface, and/or the pedestal based on the one or more received movement commands (step 3306). The method may include verifying positional data for the cabinet, the movement interface device, and/or the pedestal (step 3308).

Figure 34:
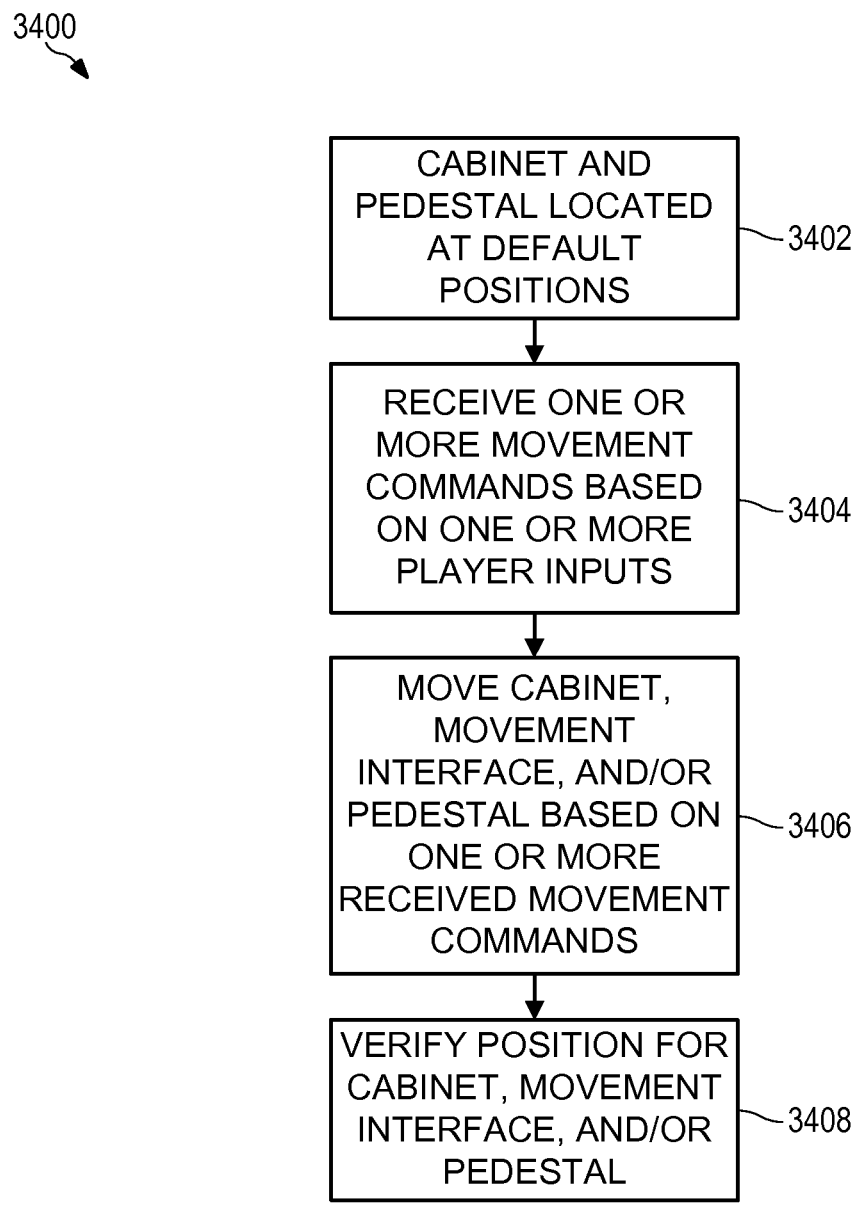
FIG. 34 is a flow diagram of game play, according to one embodiment.

In FIG. 34, a flow diagram of game play is shown, according to one embodiment. The method may include the cabinet and/or the pedestal being located in a default position (step 3402). The method may include one or more processors receiving one or more movement commands based on one or more player inputs (step 3404). The method may include moving the cabinet, the movement interface, and/or the pedestal based on the one or more received movement commands (step 3406). The method may include verifying positional data for the cabinet, the movement interface device, and/or the pedestal (step 3408). For example, a player may be motioning to climb (via 3D sensors) during a bonus round to reach the top of the mountain. In this example, the gaming device may expand to indicate that the player is climbing.

Figure 35:
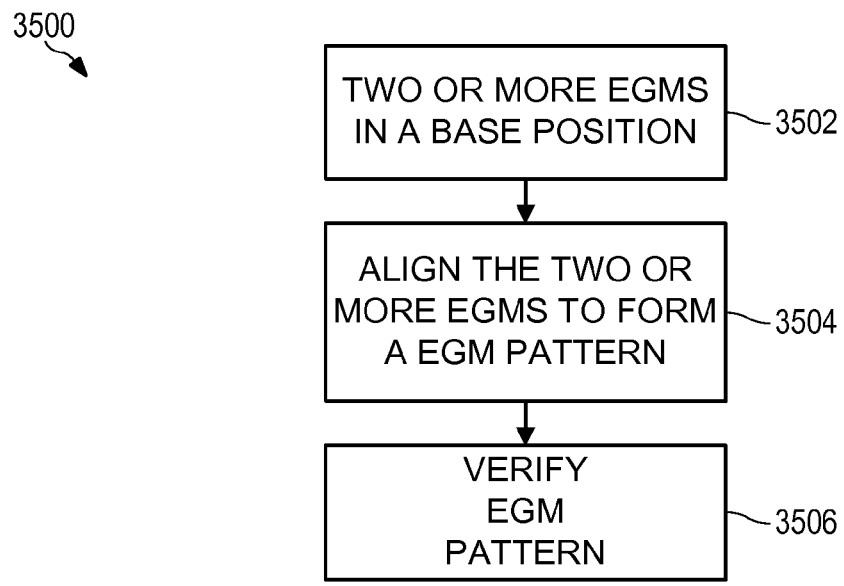
FIG. 35 is a flow diagram of game play, according to one embodiment.

In FIG. 35, a flow diagram of game play is shown, according to one embodiment. The method may include two or more electronic gaming devices being in a base position (step 3502). The method may include aligning the two or more electronic gaming devices to form a movement pattern for two or more gaming devices (step 3504). The method may include verifying the movement pattern for the two or more gaming devices (step 3506). In one example, the gaming devices may be moving to form a wave formation. For this example, the system may verify each step to ensure that the presentation is synchronized.

Figure 36:
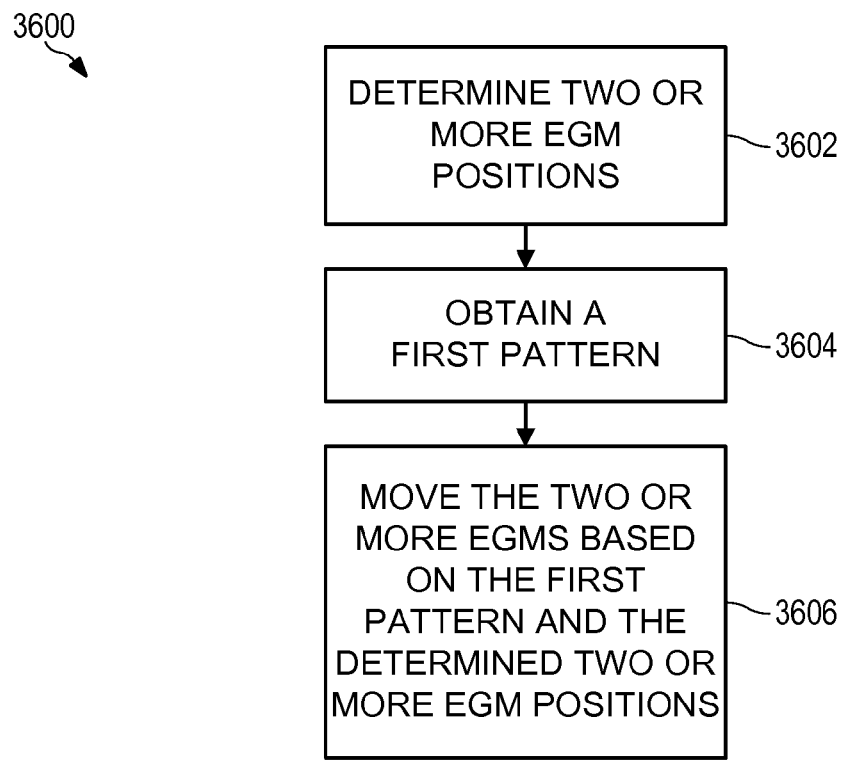
FIG. 36 is a flow diagram of game play, according to one embodiment.

In FIG. 36, a flow diagram of game play is shown, according to one embodiment. The method may include determining two or more gaming device positions (step 3602). The method may include obtaining a first pattern profile (step 3604). The method may include moving the two or more gaming devices based on the first pattern profile and the determined two or more gaming device positions (step 3606).

Figure 37:
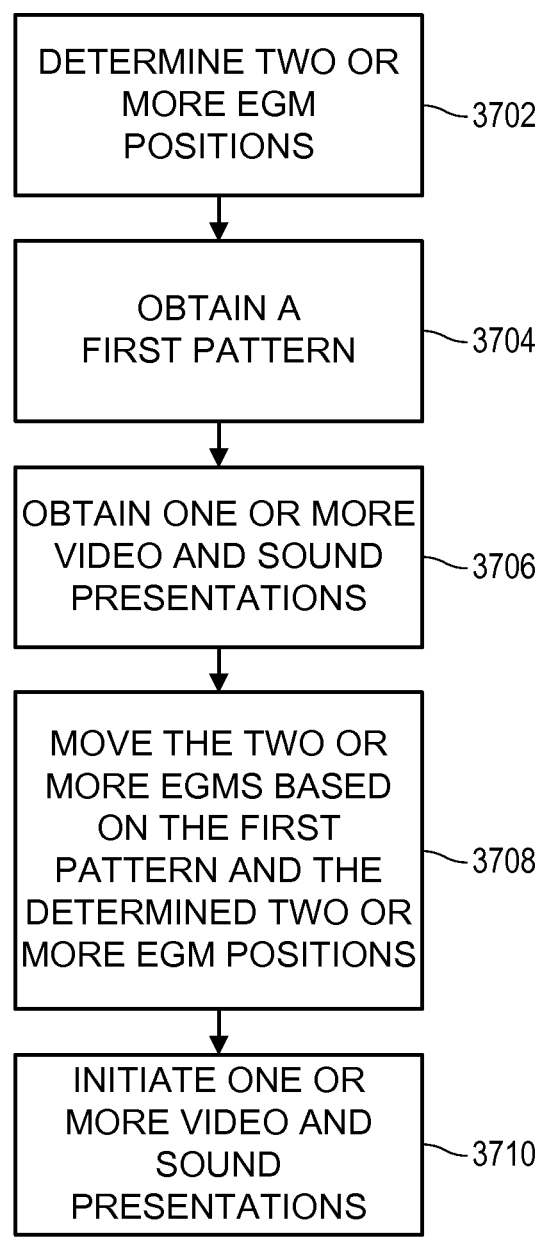
FIG. 37 is a flow diagram of game play, according to one embodiment.

In FIG. 37, a flow diagram of game play is shown, according to one embodiment. The method may include determining two or more gaming device positions (step 3702). The method may include obtaining one or more video and/or sound presentations (step 3704). The method may include obtaining a first pattern profile (step 3706). The method may include moving the two or more gaming devices based on the first pattern profile and the determined two or more gaming device positions (step 3708). The method may include initiating one or more video and/or sound presentations (step 3710). In this example, the movement pattern, the video presentation, and the sound presentation may be theme based (e.g., ships rocking back and forth, etc.).

Figure 38:
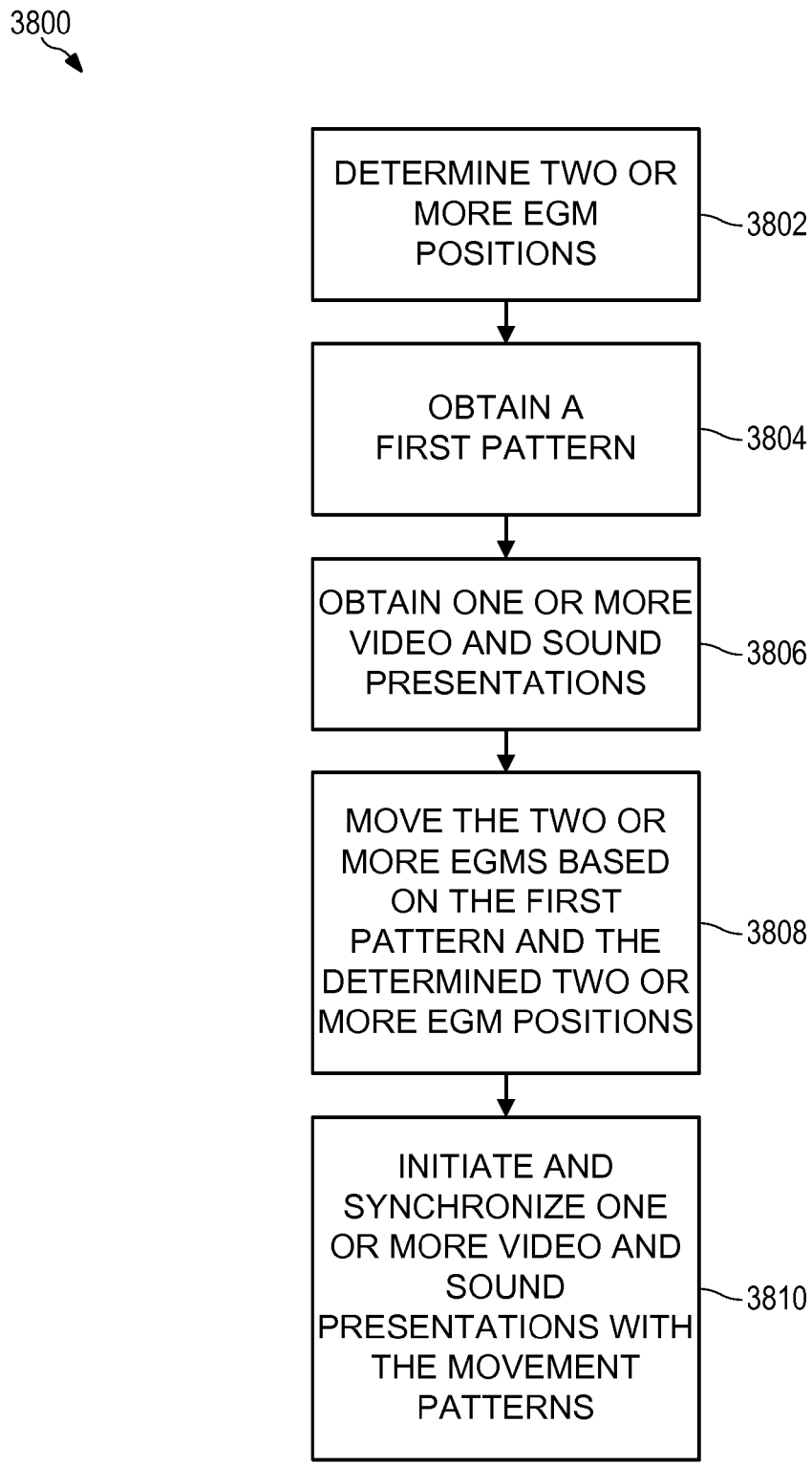
FIG. 38 is a flow diagram of game play, according to one embodiment.

In FIG. 38, a flow diagram of game play is shown, according to one embodiment. The method may include determining two or more gaming device positions (step 3802). The method may include obtaining one or more video and/or sound presentations (step 3804). The method may include obtaining a first pattern profile (step 3806). The method may include moving the two or more gaming devices based on the first pattern profile and the determined two or more gaming device positions (step 3808). The method may include initiating one or more video and/or sound presentations and synchronizing the one or more video and/or audio presentations with the movement patterns (step 3810). In this example, the movement pattern, the video presentation, and the sound presentation may be theme based (e.g., ships rocking back and forth, etc.) and synchronized.

Figure 39:
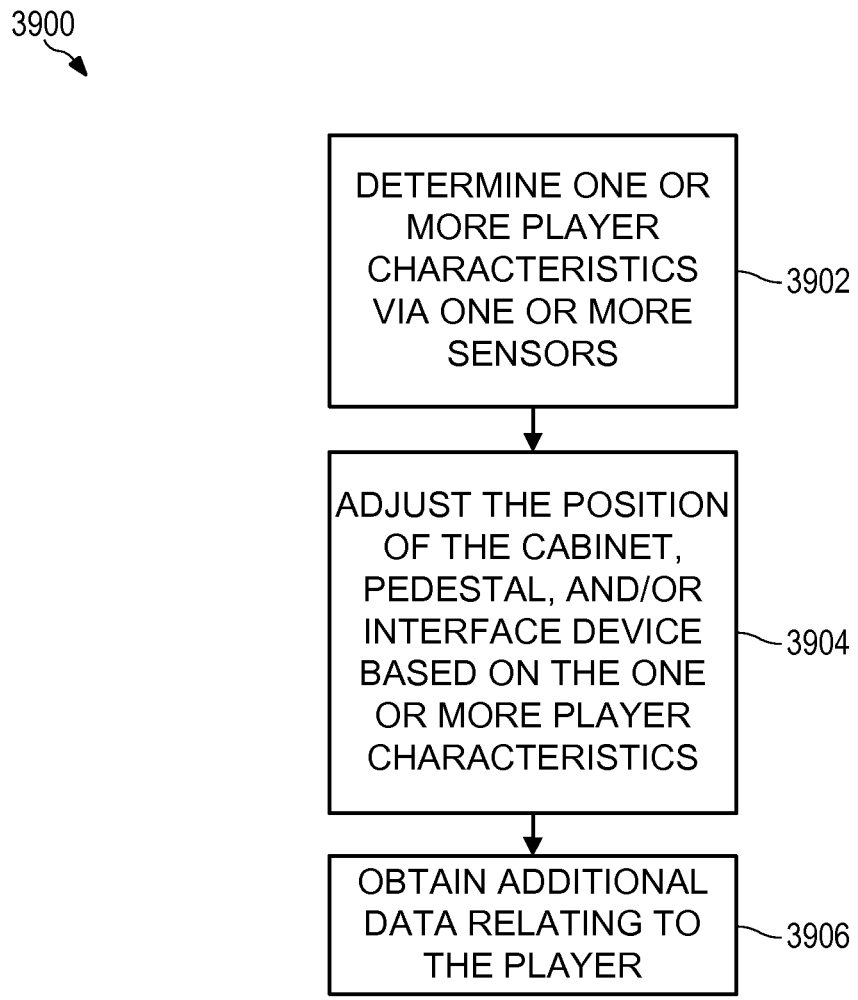
FIG. 39 is a flow diagram of game play, according to one embodiment.

In FIG. 39, a flow diagram of game play is shown, according to one embodiment. The method may include determining one or more player characteristics via one or more sensors (step 3902). The method may include adjusting the position of the cabinet, the pedestal, and/or the interface movement device based on the one or more player characteristics (step 3904). The method may include obtaining additional data relating to the player (step 3906) and then returning to step 3904. For example, a player may be standing and the gaming device is at level X. Once the player sits, the gaming device is moved to a level lower than X.

Figure 40:
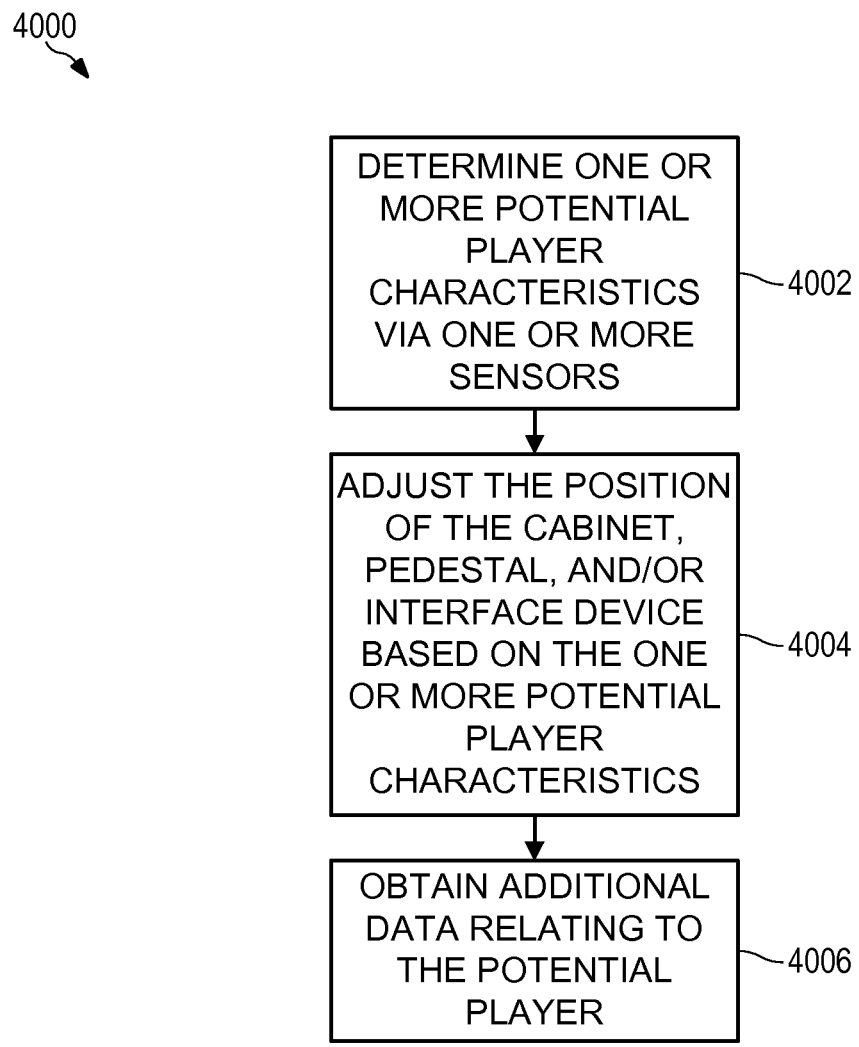
FIG. 40 is a flow diagram of game play, according to one embodiment.

In FIG. 40, a flow diagram of game play is shown, according to one embodiment. The method may include determining one or more potential player characteristics via one or more sensors (step 4002). The method may include adjusting the position of the cabinet, the pedestal, and/or the interface movement device based on the one or more potential player characteristics (step 4004). The method may include obtaining additional data relating to the potential player (step 4006) and then returning to step 4004. For example, a player may be standing and the gaming device is at level X. Once the player sits, the gaming device is moved to a level lower than X. Thereafter, the player stands and the gaming device goes back to a level close to X depending on where the player is standing and/or how far away from the gaming device.

Figure 41:
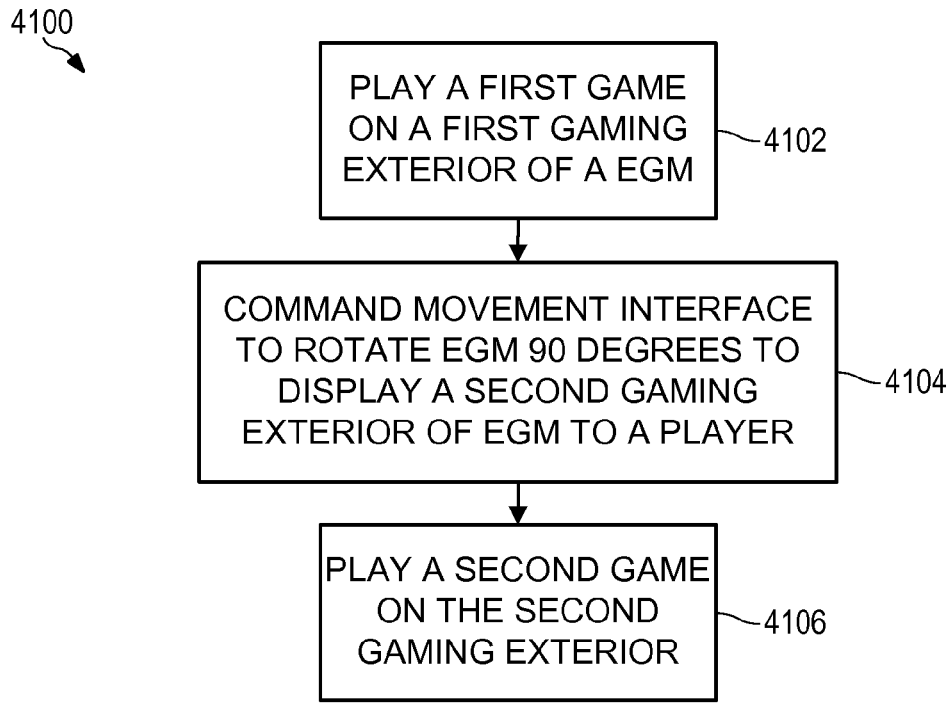
FIG. 41 is a flow diagram of game play, according to one embodiment.

In FIG. 41, a flow diagram of game play is shown, according to one embodiment. The method may include playing a first game on a first gaming device exterior surface (step 4102). The method may include moving the gaming device to display a second gaming device exterior surface to a player (step 4104). The method may include playing a second game on a second gaming device exterior surface (step 4106). In one example, a base game may be based on video reel which are on the first exterior surface and a second type of game play may be on the second exterior surface which may be based on mechanical reels.

Figure 42:
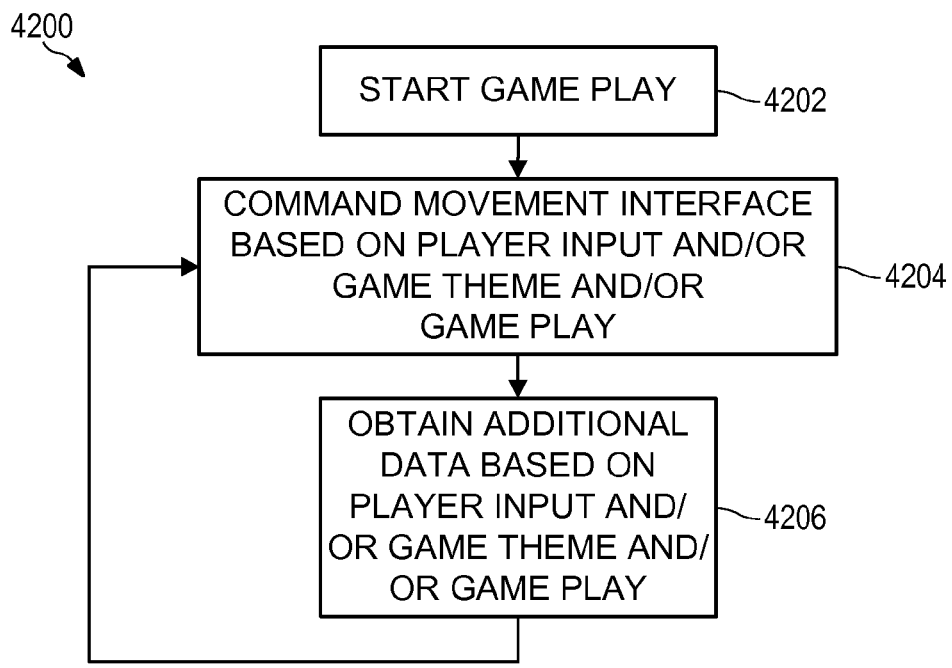
FIG. 42 is a flow diagram of game play, according to one embodiment.

In FIG. 42, a flow diagram of game play is shown, according to one embodiment. The method may include starting a game play (step 4202). The method may include moving the gaming device based on a player's input, a game theme, and/or game play (step 4204). The method may include obtaining additional data based on the player's input, game theme, and/or game play (step 4206) and returning to step 4204.

In one embodiment, on the top surface of the pedestal there can be a spring loaded and/or ball mounted plate (and/or any other lifting, shifting, moving mechanism) that the cabinet is secured to via fasteners (and/or any other securing device). In one example, the purpose of the plate is to give the cabinet a range of motion by allowing rotation and swivel in all directions. The spring loaded ball mounted plate (and/or any other movement device) is tightly secured to the pedestal so that there is no relative motion between the pedestal and the plate. When the cabinet is fully secured to the plate, the cabinet will not be at risk of falling off the pedestal. In one example, the reason for allowing the cabinet to move relative to the pedestal is to create special gaming effects. The cabinet will have an internal mechanism(s) that may cause vibration, rocking, twisting, etc. types of motion that may be game dependent. For example, when a bonus is scored the machine's internal mechanism will vibrate enough for the entire cabinet to shake and create an exciting special effect for the user. The internal mechanism causing the movement can be an electric motor with an asymmetric weight mounted on the shaft, a hydraulic or pneumatic system, linear actuators driven by electric motors, etc.

In another embodiment, a second reason for allowing the cabinet to have a range of motion is to provide more ease and flexibility in aligning cabinets in different geometric arrangements. The cabinets may be arranged in a straight line, in a triangular arrangement, in a diamond shape or grouped in multiple numbers to create varying angular position between cabinets. For example, a group of 3 would be arranged in a triangle, a group of 6 in a hexagon and a group of 8 would be arranged in a hexagon. The angle between the sides of the cabinet in the triangle may be 60°, in a hexagon the angle may be 120° and in an octagon the angle may be 135°.

In one embodiment, the electronic gaming device may include: a cabinet; a pedestal; and a movement interface, the movement interface including one or more interconnection areas, the movement interface including one or more attachment areas; and/or an electrical interface, the electrical interface including one or more cabinet electrical interconnection areas and one or more pedestal electrical interconnection areas. The movement interface may be attached to one of the cabinet and the pedestal via the one or more attachment areas and the movement interface may be attached to one of the cabinet and the pedestal via the one or more interconnection areas. In addition, the electrical interface may be electrically coupled the cabinet and the pedestal via the one or more cabinet electrical interconnection areas and the one or more pedestal electrical interconnection areas.

In addition, the electronic gaming device may include one or more processors. Further, the electronic gaming device may include one or more sensors which may measure positional data relating to the cabinet and/or the pedestal. Further, the one or more sensors may transmit one or more positional data relating to the cabinet and the pedestal to the one or more processors. In addition, the one or more processors may compare the one or more positional data to one or more references. Further, the one or more processors may move the cabinet via the movement interface based on game data. In addition, the one or more processors may move the cabinet via the movement interface based on a player input. In one example, the one or more processors may move the cabinet via the movement interface based on an attraction mode.

In another embodiment, the method of manufacturing an electronic gaming device may include: attaching a movement interface to a pedestal; aligning a cabinet with at least one of the pedestal and the movement interface; placing the cabinet into one or more interface connection points; connecting one or more cabinet electrical interconnection areas to one or more pedestal electrical interconnection areas; placing the cabinet into one or more lock positions on the movement interface; and locking one or more locking devices.

In addition, the method may include measuring positional data relating to an electrical interface, the one or more cabinet electrical interconnection areas, and the one or more pedestal electrical interconnection areas. Further, the method may include transmitting one or more positional data relating to the electrical interface, the one or more cabinet electrical interconnection areas, and the one or more pedestal electrical interconnection areas. In addition, the method may include comparing the one or more positional data to one or more references. In one example, the method may include transmitting one or more warnings based on a comparison of the one or more positional data to one or more references. Further, the method may include transmitting one or more statuses based on a comparison of the one or more positional data to one or more references.

In another embodiment, a movement interface for an electronic gaming device may include: a bottom surface including one or more attachment areas, the one or more attachment areas being configured to attach to a pedestal via one or more securing devices; a top surface including one or more interconnection areas, and the one or more interconnections areas being configured to attach to a cabinet via an interaction locking mechanism; and/or an electrical interface configured to connect one or more cabinet electrical interconnection areas with one or more pedestal electrical interconnection areas.

In addition, the movement interface may move the cabinet. Further, the movement interface may include one or more processors configured to measure positional data relating to at least one of the cabinet, the pedestal, and the movement interface. In one example, the movement interface may move the cabinet based on game data. In another example, the movement interface may move the cabinet based on a player input. Further, the movement interface may move the cabinet based on an attraction mode.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. A method of manufacturing an electronic gaming device comprising:
   attaching a movement interface to a pedestal;
   aligning a cabinet with at least one of the pedestal and the movement interface;
   placing the cabinet into one or more interface connection points;
   connecting one or more cabinet electrical interconnection areas to one or more pedestal electrical interconnection areas;
   placing the cabinet into one or more lock positions on the movement interface;
   locking one or more locking devices; and
   measuring positional data relating to an electrical interface, the one or more cabinet electrical interconnection areas, and the one or more pedestal electrical interconnection areas
   wherein the movement interface is configured to move during a gaming device activity.

2. The method of claim 1, further comprising transmitting one or more positional data relating to the electrical interface, the one or more cabinet electrical interconnection areas, and the one or more pedestal electrical interconnection areas.

3. The method of claim 1, further comprising comparing the one or more positional data to one or more references.

4. The method of claim 3, further comprising transmitting one or more warnings based on the comparison of the one or more positional data to the one or more references.

5. The method of claim 4, further comprising transmitting one or more statuses based on the comparison of the one or more positional data to the one or more references.

* * * * *